United States Patent
Okano et al.

(10) Patent No.: US 9,493,620 B2
(45) Date of Patent: Nov. 15, 2016

(54) OPTICAL FILM, ANTI-REFLECTION FILM, POLARIZING PLATE AND LIQUID CRYSTAL DISPLAY DEVICE

(75) Inventors: Satoshi Okano, Tokyo (JP); Nobuo Kubo, Tokyo (JP); Daisuke Doi, Hyogo (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 511 days.

(21) Appl. No.: 13/060,235

(22) PCT Filed: Aug. 10, 2009

(86) PCT No.: PCT/JP2009/064120
§ 371 (c)(1),
(2), (4) Date: Feb. 22, 2011

(87) PCT Pub. No.: WO2010/024115
PCT Pub. Date: Mar. 4, 2010

(65) Prior Publication Data
US 2011/0151146 A1    Jun. 23, 2011

(30) Foreign Application Priority Data

Aug. 29, 2008 (JP) .................................. 2008-221056
Sep. 22, 2008 (JP) .................................. 2008-242248

(51) Int. Cl.
*C08J 5/18* (2006.01)
*C08J 7/04* (2006.01)
*G02B 1/10* (2015.01)
(Continued)

(52) U.S. Cl.
CPC ................. *C08J 7/04* (2013.01); *G02B 1/105* (2013.01); *G02B 1/111* (2013.01); *G02B 5/3025* (2013.01); *G02F 1/133502* (2013.01); *G02F 1/133528* (2013.01); *B32B 2457/202* (2013.01); *C08J 2301/08* (2013.01); *C08J 2331/00* (2013.01);
(Continued)

(58) Field of Classification Search
None
See application file for complete search history.

(56) References Cited

U.S. PATENT DOCUMENTS

2006/0216437 A1* 9/2006 Murakami ..................... 428/1.3

FOREIGN PATENT DOCUMENTS

| JP | 05-119217 | 5/1993 |
| JP | 05-306344 | 11/1993 |

(Continued)

OTHER PUBLICATIONS

English translation of JP Office Action, Application No. P2010-526643, issue date: Jul. 16, 2013.
(Continued)

*Primary Examiner* — Ellen S Wood
*Assistant Examiner* — Anthony J Frost
(74) *Attorney, Agent, or Firm* — Lucas & Mercanti, LLP

(57) ABSTRACT

Disclosed is an optical film that has excellent adhesion and surface hardness between the film substrate and a hard coat layer or other functional layer, has improved brittleness, is transparent, and has low moisture absorption and high heat resistance. Additionally disclosed are an antireflective film, a polarizing plate, and a display device using the same. The optical film has at least a hard coat layer or a back coat layer as a functional layer containing a resin on a film substrate, and is characterized in that said film substrate contains a thermoplastic acrylic resin (A) and a cellulose ester resin (B), with the content ratio by mass of said thermoplastic acrylic resin (A) and said cellulose ester resin (B) being in a range thermoplastic acrylic resin (A):cellulose ester resin (B)=95:5 to 50:50.

17 Claims, 1 Drawing Sheet

(51) Int. Cl.
*G02B 1/111* (2015.01)
*G02B 5/30* (2006.01)
*G02F 1/1335* (2006.01)

(52) U.S. Cl.
CPC ......... *Y10T 428/105* (2015.01); *Y10T 428/254* (2015.01); *Y10T 428/31786* (2015.04)

(56) References Cited

FOREIGN PATENT DOCUMENTS

| | | | |
|---|---|---|---|
| JP | 11049920 A * | 2/1999 | ............ C08L 33/12 |
| JP | 2001-83327 | 3/2001 | |
| JP | 2002-12728 | 1/2002 | |
| JP | 2002-356658 | 12/2002 | |
| JP | 2005-070744 | 3/2005 | |
| JP | 2005-70744 | 3/2005 | |
| JP | 2005-146084 | 6/2005 | |
| JP | 2005-338550 | 12/2005 | |
| JP | 2007-237483 | 9/2007 | |
| JP | 2007237483 A * | 9/2007 | |
| JP | 2008-088417 | 4/2008 | |
| JP | 2008-88417 | 4/2008 | |
| JP | 2008088417 A * | 4/2008 | |
| JP | 2008-120011 | 5/2008 | |

OTHER PUBLICATIONS

Japanese Office Action, Application No. P2010-526643, issue date: Jul. 16, 2013.

Office Action dated May 14, 2015 from the corresponding Korean Patent Application No. 10-2011-7004250.

English translation of the Office Action dated May 14, 2015 from the corresponding Korean Patent Application No. 10-2011-7004250.

* cited by examiner

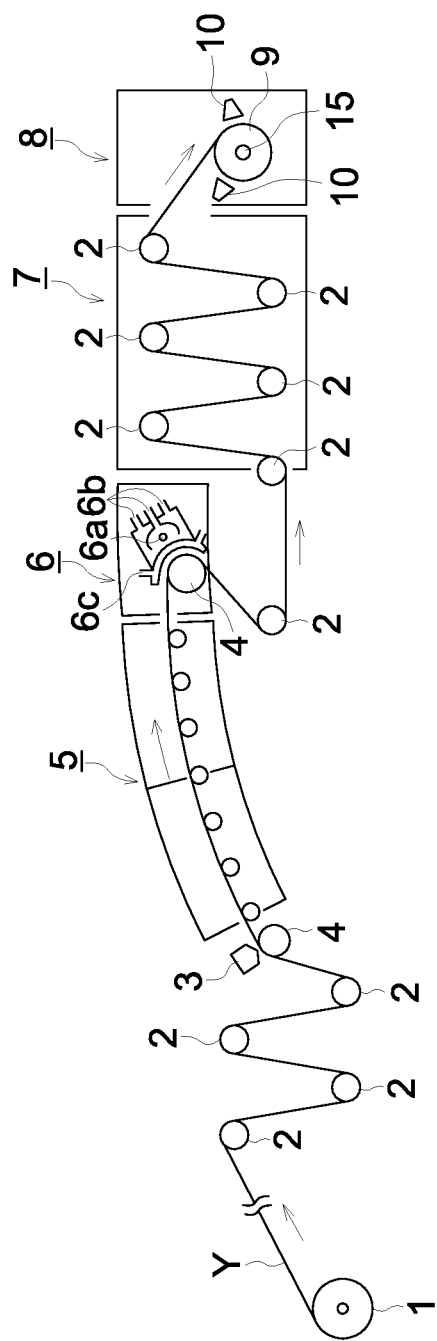

OPTICAL FILM, ANTI-REFLECTION FILM, POLARIZING PLATE AND LIQUID CRYSTAL DISPLAY DEVICE

This is a 371 of PCT/JP2009/064120 filed Aug. 10, 2009 which in turn claimed the priority of Japanese Patent Applications Nos. 2008-221056 filed Aug. 29, 2008 and 2008-242248 filed Sep. 22, 2008, all three applications are incorporated by reference herein.

FIELD OF THE INVENTION

The present invention relates to an optical film, an anti-reflection film, a polarizing plate, and a liquid crystal display device.

BACKGROUND

An optical film having a hard coat layer (hereafter referred to a hard coat film) is provided on an outermost surface protection of display devices such as a cathode ray tube display device (CRT), plasma display (PDP), electroluminescence display (ELD) and a liquid crystal display device (LCD) for the purpose of improving surface protection, generally. The hard coat film is produced by providing a hard coat layer composed of a photopolymerizable resin, thermosetting resin or UV ray curable resin on a transparent film substrate such as a cellulose acetate based resin (triacetylcellulose in majority) and poly ethylene terephthalate.

The hard coat film usually requires to have certain quantity of thickness of a hard coat layer from a view point of mechanical strength (such as pencil hardness, anti-abrasion property), and recently, film having high pencil hardness (high hardness) is desired. However, there is a problem when thickness is increased to impart high hardness, while pencil hardness is improved, adhesive properties between a hard coat layer and transparent film substrate is not obtained.

Particularly in case of a liquid crystal display which is frequently used outdoors, it is required to also have a property not to deteriorate due to environmental change in addition to a high hardness (resistance to abrasion). However, adhesive properties between a hard coat layer and transparent film substrate are hard to obtain and further surface hardness decreases markedly in the condition supposing outdoor use in particular (light irradiation after a durability test such as a cyclic thermo test).

For the above described problem, an optical multi-layer material is disclosed, which is composed of a hard coat layer provided on a light transmissible resin substrate, wherein the above described hard coat layer is a layer hardened by containing (1) a resin having a weight average molecular weight between 1000 and 100,000, as well as at least two radical polymerizable functional groups, and (2) a resin having a weight average molecular weight between 100 and 1,000, as well as at least one cationic polymerizable functional group, and further, the above described resin (2) is penetrated into the above described light transmissible resin substrate and is hardened (see, Patent Document 1).

According to the above described technology, reflection at interface and interference pattern are prevented, as well as shrink wrinkling of light transmissible resin substrate in inhibited, visibility is improved and further, curing is inhibited, sufficient an anti-abrasion property is maintained, and adhesive properties between a light transmissible resin substrate and a hard coat layer is excellent However, according to the above described technology, adhesive properties after a durability test such as a cyclic thermo test are insufficient and decrease of surface hardness is large.

The liquid crystal display device is usually composed of a liquid crystal cell having transparent electrodes, liquid crystal layer, a color filter and the like between glass plates and two polarizing plates provide on both sides of the liquid crystal cell, and each of polarizing plates is composed of a polarizer (referred to also a polarizing membrane or a polarizing film) being placed between two optical films (a polarizing plate protecting film). Cellulose triacetate film is usually used for the polarizing plate protecting film.

However, it is difficult to obtain sufficient resistance to humidity by the cellulose ester film such as cellulose triacetate film used hitherto. And there is a problem that an optical influence becomes large when the thickness is raised to obtain high resistance to humidity. Further, it is problem that the polarizing plate itself becomes thicker since thinning device is required in recent years.

On the other side, polymethyl methacrylate (PMMA), which is a representative acrylic resin and exhibits excellent transparency and dimensional stability in addition to low moisture absorptive performance, is suitably used in the optical film as material for a low moisture absorptive optical film.

However, format size of a liquid crystal display device is enlarged as described above and usage is expanded to outdoor. According to these circumstances light quantity of the back light is required to increase to sufficiently observe image outdoors, and heat resistance at high temperature or heat resistance for longer time is required due to usage in a severe condition.

However, PMMA film is poor in heat resistance and problems is caused because shape changes due to use at high temperature or longtime.

This is a problem of physical property of film it self as well as a significant problem in a polarizing plate or a display device using the film. That is, a problem that a panel as whole bents is caused when a polarizing plate bents according to deformation of a film in a liquid crystal display device. The problem due to film deformation is also problematic on the back light side, and further, there are problems that design phase difference changes due to deformation, causing fluctuation of view angle and hue change in case it is used at a position of observing surface side.

Further, the acrylic resins film has fragile and brittle property in comparison with cellulose ester film etc. and is difficult to handle, and particularly, is difficult to manufacture an optical film for a large format liquid crystal display device stably.

For the above described problem a method to add polycarbonate (referred to PC) to acrylic resins to improve resistance to humidity and heat is proposed, however it is difficult to use for an optical film since applicable solvents are limited, miscibility between resins is insufficient and easily cause white turbid (see, for example, Patent Document 2).

There are other methods to improve heat resistance of introduce an alicyclic alkyl group as an acrylic resin copolymer component, forming a cyclic structure on a main chain of a molecule by intramolecular cycle forming reaction (see, for example, Patent Document 3 and 4).

However, heat resistance can be improved, but brittleness of a film is insufficient, and it is difficult to manufacture an optical film for a large format liquid crystal display device by these methods. Further, when brittleness is insufficient, an optical film enhance panel deformation, as its result, change of phase difference cannot be inhibited and further, problems of variation of view angle and hue are caused.

As a technology to improve resistance to humidity and heat, resin in which anti-impulsive acryl rubber-methylmethacrylate copolymer or butyl modified acetyl cellulose are combined with acrylic resins is proposed (for example, Patent Document 5).

However, improvement of sufficient brittleness cannot be obtained and handling property is not insufficient for manufacturing an optical film for a large format liquid crystal display device by this method. Further, haze generates due to blended component, a problem of reducing image contrast was found when used outdoors where higher contrast is required.

Further, a technology to blend a resin such as poly vinyl acetate or PMMA with a conventional cellulose ester film to control an optical property (for example, Patent Document 6).

However, according to this method, heat resistance or transparency can be obtained, wettability to aqueous adhesive composed of mainly polyvinylalcohol (referred to PVA) is not good during manufacturing process of an optical film in comparison with conventional cellulose ester, adhesive properties to a polarizer is supposed to reduce, and there is a possibility to cause peeling from a polarizer particularly allowed to be exposed to environment, of high temperature and high moisture for long time.

Further, saponification treatment is required during preparation of a polarizing plate by pasting an optical film to a polarizer in the conventional art disclosed in Patent Document 6, hydrophilic process by saponification is not accelerated in comparison with an optical film composed of cellulose ester resin, there is a problem that adhesive properties between a polarizer and an optical film deteriorate in durability test.

For solving the problem, a measure to improve wettability of adhesive by provide a back coat layer and thereafter saponification is conducted is taken to insure adhesive properties between a polarizer and an optical film.

However, refractive index of a back coat layer reduces when the saponification is conducted whereby difference of refractive index from an optical film is generated and an optical two layer-construction is formed. When the optical film is arranged on outermost surface side of the image device (observation side), visual appearance of a product is not preferable because an optical two layer-construction due to refractive index difference induces interference unevenness. Further, since adhesive properties between a back coat layer and film substrate is not sufficient, and strength is weak, there is a defect to be easily damaged when an optical film provided with a back coat layer is conveyed via rolls.

Under the above described circumstances, problems of the optical film such as low moisture absorptive property, transparency, high heat resistive, brittleness, adhesive property with a polarizer becomes more and more remarkable in accordance with enlargement of usage of recent liquid crystal display device, and improvement is required.

Therefore solution of various problems in relation to an optical film substrate composed of mainly cellulose ester is desired.

PRIOR ART DOCUMENT

Patent Document

Patent Document 1: JP-A 2007-237483
Patent Document 2: JP-A H5-306344
Patent Document 3: JP-A 2002-012728
Patent Document 4: JP-A 2005-146084
Patent Document 5: JP-A H05-119217
Patent Document 6: JP-A 2008-088417

SUMMARY OF THE INVENTION

Problem to be Solved by the Invention

The present invention is performed in view of the above described problems and circumstances, and the problems to be solved are to provide an optical film which is excellent in adhesive properties between a film substrate and a functional layer such as a hard coat layer and surface hardness, brittleness is improved, and is transparent, low moisture absorptive and high heat resistive. And the problem is to further provide an anti-reflection film, a polarising plate and a display device employing it. That is to provide an optical film suitably used for a polarizing plate protecting film, particularly, in a large format liquid crystal display device or a liquid crystal display device used outdoors.

Means to Solve the Problems

The above described problems in relation to the invention are solved by means described below.
1. In an optical film having at least one of a hard coat layer or a back coat layer as a functional layer containing a resin on a film substrate, the optical film is characterized in that the film substrate contains a thermoplastic acrylic resin (A) and a cellulose ester resin (B), content ratio by mass of thermoplastic acrylic resin (A) to the cellulose ester resin (B) being in a range of thermoplastic acrylic resin (A)/the cellulose ester resin (B)=95/5 to 50/50.
2. In an optical film described in 1 which has at least one of a hard coat layer on a substrate, the optical film is characterized in that the film substrate contains a thermoplastic acrylic resin (A) and a cellulose ester resin (B), content ratio by mass of thermoplastic acrylic resin (A) to the cellulose ester resin (B) being in a range of thermoplastic acrylic resin (A)/the cellulose ester resin (B)=95/5 to 50/50, and at least one layer of hard coat layer contains the thermoplastic acrylic resin.
3. The optical film described in 1 or 2, which is characterized in that a weight average molecular weight of the thermoplastic acrylic resin (A) contained in the film substrate is in a range of 110,000 to 500,000.
4. The optical film described in any one of 1 to 3, which is characterized in that the film substrate contains acrylic particles, and content ratio by mass of the acrylic particles to total mass of thermoplastic acrylic resin (A) and the cellulose ester resin (B) is in a range of total mass of the acrylic particles/thermoplastic acrylic resin (A) and the cellulose ester resin (B)=0.5/100 to 30/100.
5. The optical film described in any one of 1 to 4, which is characterized by having the above described hard coat layer, wherein a weight average molecular weight of thermoplastic acrylic resin contained in hard coat layer is in a range of 80,000 to 500,000.
6. The optical film described in any one of 1 to 5, which is characterized in that a weight average molecular weight of the thermoplastic acrylic resin contained in the hard coat layer is in a range of 110,000 to 500,000.
7. The optical film described in any one of 1 to 6, which is characterized in that the above described hard coat layer comprises the thermoplastic acrylic resin and a radical polymerization compound, wherein content ratio by mass of the thermoplastic acrylic resin to the radical polymerization compound is in a range of thermoplastic acrylic resin/radical polymerization compound=0.50/100 to 20/100.

8. The optical film described in any one of 1 to 7, which is characterized in that the thermoplastic acrylic resin contained in the above described hard coat layer exists more in quantity at neighborhood around interface between the film substrate and the hard coat layer than the hard coat layer surface.

9. The optical film described in any one of 1 to 8, which is characterized in that the above described hard coat layer is composed of a multi-layer material, wherein the hard coat layer adjacent to the film substrate comprises the thermoplastic acrylic resin.

10. The optical film described in any one of claims 1 to 9, which is characterized by having the above described back coat layer and satisfying the following requirements;
(1) the film substrate contains the thermoplastic acrylic resin (A) and the cellulose ester resin (B), wherein
   (i) content ratio by mass of the thermoplastic acrylic resin (A) to the cellulose ester resin (B) is in a range of 95/5 to 50/50,
   (ii) a weight average molecular weight of the thermoplastic acrylic resin (A) is in a range of 80,000 to 1,000,000,
   (iii) a weight average molecular weight of the cellulose ester resin (B) is in a range of 75,000 to 300,000,
   (iv) the above described cellulose ester resin (B) has a total substitution degree of an acyl group in a range of 2.0 to 3.0 and a substitution degree of an acyl group having 3 to 7 carbon atoms in a range of 1.2 to 3.0,
and
(2) the above described back coat layer contains cellulose ester resin (C), wherein a weight average molecular weight of the cellulose ester resin (C) is in a range of 10,000 to 200,000.

11. The optical film described in 10, which is characterized in that the above described cellulose ester resin (C) has a total substitution degree of an acyl group in a range of 2.0 to 3.0 and a substitution degree of an acyl group having 3 to 7 carbon atoms in a range of 0 to 2.2.

12. The optical film described in 10 or 11, which is characterized in that the above described back coat layer comprises the above described cellulose ester resin (C) and a thermoplastic acrylic resin (D), wherein a weight average molecular weight of the thermoplastic acrylic resin (D) is in a range of 30,000 to 1,000,000, and a content ratio by mass the cellulose ester resin (C) to the thermoplastic acrylic resin (D) is in a range of 95/5 to 50/50.

13. The optical film described in any one of 1 to 12, which is characterized in that the above described back coat layer contains acrylic particles in a range of 0.1 to 50% by mass with respect to total mass of the a back coat layer composing resin.

14. The optical film described in 13, which is characterized in that an average particle diameter of the above described acrylic particles contained in the above described back coat layer is in a range of 0.1 to 1 µm.

15. An anti-reflection film produced by employing the optical film described in any one of 1 to 14, which is characterized by having a hard coat layer, wherein a low refractive index layer is laminated on the hard coat layer directly or via another layer.

16. The anti-reflection film described in 15, which is characterized in that the above described low refractive index layer contains a cationic polymerization compound.

17. A polarizing plate which is characterized by employing the optical film described in any one of 1 to 14 or the anti-reflection film described in 15 or 16.

18. A liquid crystal display device which is characterized by employing the optical film described in any one of 1 to 14 or the anti-reflection film described in 15 or 16.

Advantage of the Invention

An optical film can be provided by the invention above described technical means, which is excellent in adhesive properties between a film substrate and a functional layer such as a hard coat layer and surface hardness, with improved brittleness, as well as is transparent, low moisture absorptive and high heat resistive. Further, an anti-reflection film, a polarizing plate and a display device employing the same can be provided.

BRIEF DESCRIPTION OF THE DRAWING

FIG. 1: Schematic diagram showing process of heat treatment conducted continually after actinic ray irradiation according to the invention.

EMBODIMENT PRACTICING THE INVENTION

The optical film according to the invention is characterized in that, in an optical film having at least one of a hard coat layer or a back coat layer as a functional layer containing a resin on a substrate, the film substrate contains a thermoplastic acrylic resin (A) and a cellulose ester resin (B), content ratio by mass of thermoplastic acrylic resin (A) to the cellulose ester resin (B) is in the range of thermoplastic acrylic resin (A)/the cellulose ester resin (B)=95/5 to 50/50. The characteristics is a technical characteristics common to the invention relating to claims 1 to 18.

In an practical embodiment of the invention, in an optical film having at least one of a hard coat layer on a substrate, the film substrate contains a thermoplastic acrylic resin (A) and a cellulose ester resin (B), content ratio by mass of thermoplastic acrylic resin (A) to the cellulose ester resin (B) is in the range of cellulose ester resin (B)=95/5 to 50/50, and it is a preferable embodiment that at least one layer of the hard coat layer contains a thermoplastic acrylic resin.

Further, in the invention, in view of exhibiting benefit of the invention, it is preferable that a weight average molecular weight of thermoplastic acrylic resin (A) contained in the film substrate is in the range of 110,000 to 500,000. Further, it is preferable that the film substrate contains acrylic particles, and content ratio by mass of the acrylic particles to total mass of thermoplastic acrylic resin (A) and the cellulose ester resin (B) is in the range of total mass of the acrylic particles/thermoplastic acrylic resin (A) and the cellulose ester resin (B)=5/100 to 30/100.

In the invention, in case of having the above described hard coat layer, it is preferable that a weight average molecular weight of thermoplastic acrylic resin contained in hard coat layer is in the range of 80,000 to 500,000. Further, it is preferable that a weight average molecular weight of thermoplastic acrylic resin contained in hard coat layer is in the range of 110,000 to 500,000. Further, it is preferable that the above described hard coat layer comprises a thermoplastic acrylic resin and a radical polymerization compound, wherein content ratio by mass of thermoplastic acrylic resin to the radical polymerization compound is in the range of thermoplastic acrylic resin/radical polymerization compound=0.50/100 to 20/100.

In the invention, a preferable embodiment is that thermoplastic acrylic resin contained in above described hard coat layer exist more quantity at neighborhood around interface between the film substrate and the hard coat layer than the hard coat layer surface. Further, it is preferable that the above described hard coat layer is composed of a multi-layer material, wherein a hard coat layer adjacent to the film substrate comprises a thermoplastic acrylic resin.

In the invention, it is also a preferable embodiment of the optical film having the above described back coat layer and satisfying the following requirements;
(1) the film substrate contains thermoplastic acrylic resin (A) and the cellulose ester resin (B), wherein
  (i) content ratio by mass of thermoplastic acrylic resin (A) to the cellulose ester resin (B) is in the range of 95/5 to 50/50,
  (ii) a weight average molecular weight of thermoplastic acrylic resin (A) is in the range of 80,000 to 1,000,000,
  (iii) a weight average molecular weight of the cellulose ester resin (B) is in the range of 75,000 to 300,000,
  (iv) above described cellulose ester resin (B) has a total substitution degree of the acyl group in the range of 2.0 to 3.0, a substitution degree of an acyl group having 3 to 7 carbon atoms in the range of 1.2 to 3.0,
and
(2) the above described back coat layer contains cellulose ester resin (C), wherein a weight average molecular weight of the cellulose ester resin (C) is in the range of 10,000 to 200,000.

Further, it is a preferable embodiment that the above described cellulose ester resin (C) has a total substitution degree of the acyl group in the range of 2.0 to 3.0, and a substitution degree of an acyl group having 3 to 7 carbon atoms in the range of 0 to 2.2. Further, it is preferable that the above described back coat layer comprises above described cellulose ester resin (C) and a thermoplastic acrylic resin (D), wherein a weight average molecular weight thermoplastic acrylic resin (D) is in the range of 30,000 to 1,000,000, and a content ratio by mass the cellulose ester resin (C) to thermoplastic acrylic resin (D) is in the range of 95/5 to 50/50. Further, it is preferable that the above described back coat layer contains acrylic particles in the range of 0.1 to 50% by mass with respect to total mass of the back coat layer composing resin. In this instance, it is preferable that an average particle diameter of the above described acrylic particles contained in the above described back coat layer is in the range of 0.1 to 1 μm.

The optical film according to the invention, in case of having the hard coat layer, can be suitably used for an anti-reflection film of an embodiment that a low refractive index layer laminated on the hard coat layer directly or via another layer. In this instance, it is a preferable embodiment that the low refractive index layer contains a cationic polymerization compound.

The optical film or an anti-reflection film according to the invention can be suitably used for a polarizing plate, a liquid crystal display device and the like.

The invention and composing components, and form and an embodiment to practice the invention are described in detail.
(Hard Coat Layer)

It is one of features that the hard coat layer contains a thermoplastic acrylic resin in an optical film, particularly an optical film having the hard coat layer (hard coat film) according to the invention.

The inventors have found that the above described problems of adhesive properties, surface hardness and brittleness after a durability test can be improved by a film substrate employing thermoplastic acrylic resin and cellulose ester resin in a specific ratio, and incorporation of thermoplastic acrylic resin in a hard coat layer, and the invention is attained.

An optical film employing thermoplastic acrylic resin and cellulose ester resin in a specific ratio for a display device is disclosed in JP-A 2008-88417. This technology is to improve transparency and heat resistance of the optical film, and transparency and heat resistance of the optical film are improved in certain degree, however, there is no description to provide a hard coat layer to enhance surface hardness, and there is no description or suggestion on a technology regarding deterioration of adhesive properties after a durability test surface hardness or preventing surface hardness in high hardening.

It is revealed that coefficient of elasticity of the hard coat film is improved by employing film substrate to which a cellulose ester resin and a thermoplastic acrylic resin are incorporated in a specific ratio, and further, coefficient of elasticity of the hard coat layer is also improved by incorporating a thermoplastic acrylic resin to the hard coat layer, and high surface hardness can be obtained by synergistic effect of these, as a result of study by the inventors. Further, it revealed that an adhesive property to the film substrate is improved by incorporating a thermoplastic acrylic resin in a hard coat layer, and high durability can be obtained. As a result of further study, deterioration of adhesive properties or reducing surface hardness due to light irradiation after a durability test such as a cyclic thermo test can be inhibited, and further, it is excellent in brittleness of the hard coat film, the invention is attained. That is, the invention can provide a hard coat film excellent in all items of an adhesive property, surface hardness and brittleness after a durability test. Hereafter, respective composing components are described.
(Thermoplastic Acrylic Resin)

Thermoplastic acrylic resins according to the present invention (referred also to simply acrylic resins) include methacrylic resins. These resins are not particularly limited, and preferred resins include those which are composed of methyl methacrylate units of 50 to 99% by mass and other monomer units of 1 to 50% by mass which are copolymerizable with the above.

Other copolymerizable monomers include α,β-unsaturated acids such as alkyl methacrylate, in which the number of carbon atoms of the alkyl group is 2 to 18, alkyl acrylate, in which the number of carbon atoms of the alkyl group is 1 to 18, acrylic acid, or methacrylic acid; unsaturated groups containing divalent carboxylic acids such as maleic acid, fumaric acid, or itaconic acid; aromatic vinyl compounds such as styrene or α-methylstyrene; and α,β-unsaturated nitriles such as acrylonitrile or methacrylonitrile; as well as maleic anhydride, maleimide, N-substituted maleimide, and glutaric anhydride. These may be employed individually or in combinations of at least two types.

Of these, in view of heat-decomposition resistance and fluidity of copolymers, preferred are methyl acrylate, ethyl acrylate, n-propyl acrylate, n-butyl acrylate, s-butyl acrylate, and 2-ethylhexyl acrylate, and methyl acrylate and n-butyl acrylate are particularly preferred to be employed.

The weight average molecular weight (Mw) of acrylic resin employed in the present invention is preferably 80,000 to 500,000 in view of exhibiting the benefit of the invention and improvement of transparency when compatibly solubility in the hard coat layer, and the weight average molecular weight (Mw) is more preferably in the range of 110,000 to 600,000, in view of exhibiting the benefit of the invention more.

It is possible to determine the weight average molecular weight of acrylic resins of the present invention via gel permeation chromatography. Measurement conditions are as follows.

Solvent: methylene chloride
Columns: SHODEX K806, K805 and K803G (produced by Showa Denko K. K, three columns were employed via connections)
Column temperature: 25° C.
Sample concentration: 0.1% by mass
Detector: RI Model 504 (produced by GL Sciences Inc.)
Pump: L6000 (produced by Hitachi Ltd.)
Flow rate: 1.0 ml/minute
Calibration curve: A calibration curve prepared by employing 13 samples of standard polystyrene STK (produced by Tosoh Corp.) was employed. It is preferable to employ the 13 samples at nearly equal intervals.

The manufacturing methods of acrylic resins in the present invention are not particularly limited, and employed may be any of the conventional methods such as suspension polymerization, emulsion polymerization, bulk polymerization, or solution polymerization. As a polymerization initiator, employed may be common peroxide based and azo based ones. Further, redox based ones may be included. With regard to polymerization temperature, the suspension or emulsion polymerization may be carried out between 30 and 100° C., while the bulk or solution polymerization may be carried out between 80 and 160° C. In order to control the reduction viscosity of the resulting copolymer, polymerization may be carried out employing alkylmercaptan as a chain transfer agent.

As the acrylic resins according to the present invention, also employed may be commercial ones. Examples thereof include DELPET 60N and 80N (both produced by Asahi Kasei Chemicals Co., Ltd.), DIANAL BR52, BR80, BR83, BR85, and BR88 (all produced by Mitsubishi Rayon Co., Ltd.), and KT75 (produced by Denki Kagaku Kogyo K. K.). Acrylic resins may be employed in combinations of at least two types.

It is preferable to increase containing ratio of the acrylic resin in an area of the film substrate adjacent to the hard coat layer, because adhesive properties to film substrate further is improved and benefit of the invention is displayed.

Methods to increase containing ratio of the acrylic resin in an area of the film substrate adjacent to the hard coat layer include a method in which preparing a hard coat layer coating composition employing a solvent dissolving acrylic resins, and forming the hard coat layer by coating the coating composition, whereby containing ratio of the acrylic resin in an area of the film substrate adjacent to the hard coat layer can be increased by extraction from the film substrate to the hard coat layer, a method forming by multi-layer coating of the acrylic resin-containing coating composition and the hard coat layer coating composition so as to compose film substrate/acrylic resin layer/a hard coat layer, and so on, however they are not limited to these. The solvent dissolving acrylic resins includes ketones (such as acetone, methylethylketone and methylisobutyl ketone), esters (such as methyl acetate, ethyl acetate and methyl lactate).

Further, it is particularly preferable to add a thermoplastic acrylic resin in a component of a coating composition of the hard coat layer so that the hard coat layer contains thermoplastic acrylic resin in the invention. On the other side, an effect of the invention is obtained by a method to incorporate thermoplastic acrylic resin in the hard coat layer by employing a solvent dissolving the above described thermoplastic acrylic resin for a solvent of coating composition of the hard coat layer, and thermoplastic acrylic resin in the film substrate is allowed to elute into the coating composition of the hard coat layer, in a state of a hard coat layer being coated. It is most preferable to add thermoplastic acrylic resin to coating composition of the hard coat layer, and to use a solvent dissolving above described thermoplastic acrylic resin for a coating composition of the hard coat layer.

An amount of the acrylic resins is preferably between 0.01% by mass and 20% by mass in the solid substance of the hard coat composition in view of stability of the hard coat composition and transparency of the hard coat layer, and further preferable between 0.05% by mass and 10% by mass. Further, it is preferable that content ratio of the acrylic resins to radical polymerization compounds forming the hard coat layer is acrylic resins/radical polymerization compound=0.50/100 to 20/100 by mass to obtain the benefit of the invention well.

The hard coat layer according to the invention is a layer composed of at least one of radical polymerization compounds or cationic polymerization compounds describe later, having a thickness (dry thickness) thickness of 0.25 to 30 μm in an average, and preferably 0.30 to 20 μm in view of film forming.

(Radical Polymerization Compound)

Radical polymerization compounds employed in the invention are compounds fanning a resin by radical polymerization caused by irradiation of an energy actinic ray and the like, and further, practical radical polymerization compounds include a compound having ethylenically unsaturated group such as (meth)acryloyl group, a vinyl oxy group, a styryl group and an allyl group, and particularly a compound having a (meth)acryloyl group is preferable. Further, the radical polymerizable compound preferably contains a polyfunctional monomer which contains two or more radical polymerizable groups in a molecule. Preferable examples include polyfunctional acrylate, in particular, polyfunctional acrylate such as pentaerythritol polyfunctional acrylate, dipentaerythritol polyfunctional acrylate, pentaerythritol polyfunctional methacrylate, and dipentaerythritol polyfunctional methacrylate. Monomers of polyfunctional acrylate includes, for example, ethylene glycol diacrylate, diethylene glycol diacrylate, 1,6-hexanediol diacrylate, neopentyl glycol diacrylate, trimethylolpropane triacrylate, trimethylolethane triacrylate, tetramethylol methane triacrylate, tetramethylol methane tetraacrylate, pentaglycerol triacrylate, pentaerythritol diacrylate, pentaerythritol triacrylate, pentaerythritol tetraacrylate, glycerin triacrylate, dipentaerythritol triacrylate, dipentaerythritol tetraacrylate, dipentaerythritol pentaacrylate, dipentaerythritol hexaacrylate, tris(acryloyloxyethyl) isocyanulate, ethylene glycol dimethacrylate, diethylene glycol dimethacrylate, 1,6-hexanediol dimethacrylate, neopentyl glycol dimethacrylate, trimethylolpropane trimethacrylate, trimethylolethane trimethacrylate, tetramethylol methane trimethacrylate, tetramethylol methane tetramethacrylate, pentaglycerol trimethacrylate, pentaerythritol dimethacrylate, pentaerythritol trimethacrylate, pentaerythritol tetramethacrylate, glycerin trimethacrylate, dipentaerythritol trimethacrylate, dipentaerythritol tetramethacrylate, dipentaerythritol pentamethacrylate, dipentaerythritol hexamethacrylate and isoboronyl acrylate. These compounds each are utilized alone or in combination of at least two types. Further, oligomer such as dimmer or trimer of the above-described monomer may also be utilized.

Polyfunctional crosslinking agent acrylate available on the market includes ADEKAOPTOMER KR, and BY Series such as KR-400, KR-410, KR-550, KR-566, KR-567 and BY-320B (produced by Adeka Corp.); KOEIHARD A-101-KK, A-101-WS, C-302, C-401-N, C-501, M-101, M-102, T-102, D-102, NS-101, FT-102Q8, MAG-1-P20, AG-106 and M-10'-C (produced by Koei Chemical Co., Ltd.); SEIKABEAM PHC2210(S), PHC X-9(K-3), PHC2213, DP-10, DP-20, DP-30, P1000, P1100, P1200, P1300, P1400, P1500, P1600, and SCR900 (produced by Dainichiseika Color & Chemicals Mfg. Co., Ltd.); KRM7033, KRM7039, KRM7130, KRM7131, UVECRYL29201 and UVECRYL29202 (produced by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (produced by DIC Corp.); AULEX No. 340 CLEAR (produced by Chugoku Marine Paints, Ltd.); SANRAD H-601, RC-750, RC-700, RC-600, RC-500, RC-611 and RC-612 (produced by Sanyo Chemical Co., Ltd.); SP-1509 and SP-1507 (produced by Showa Highpolymer Co., Ltd.); RCC-15C (produced by Grace Japan Co., Ltd.), ARONIX M-6100, M-8030 and M-8060 (produced by Toagosei Co., Ltd.) and B420 (produced by Shin-Nakamura Chemical Co., Ltd.).

An amount to add of radical polymerization compound is preferably 15% by mass or more and less than 70% by mass of the solid substance for the stability of a hard coat composition in the hard coat composition.

Radical Polymerization Accelerator

It is preferable to use photo-polymerization initiator in combination with radical polymerization compounds for the purpose of acceleration of hardening radical polymerization compounds. It is preferable to use photo-polymerization initiator and radical polymerization compound in mass ratio of 20:100 to 0.01:100 in case that photo-polymerization initiator is used in combination with radical polymerization compounds.

Specific examples of a photo-polymerization initiator include such as acetophenone, benzophenone, hydroxy benzophenone, Michler's ketone, α-amyloxime ester and thioxanthone; and derivatives thereof, however, are not limited thereto.

Cationic Polymerization Compound

The cationic polymerization compounds employed in the invention is a compound forming a resin causing cationic polymerization via irradiation of actinic ray or heat, and includes, concretely, a compound having epoxy group, cyclic ether group, cyclic acetal group, cyclic lactone group, cyclic thioether group, a spiro orthoester compound, a vinyl oxo group and the like. Among these it is preferably to used a compound having a functional group such as epoxy group and vinyl ether group. Examples of cationic polymerization compounds having epoxy group or vinyl ether group include, for example, phenyl glycidyl ether, ethyleneglycol diglycidyl ether, glycerin diglycidyl ether, vinylcyclohexene dioxide, limonene dioxide, 3,4-epoxycyclohexylmethyl-3', 4'-epoxycycloexanecarboxylate, bis-(6-methyl-3,4-epoxycyclohexyl)adipate, epoxycyclohexyl)ethyltrimethoxysilane, diethyleneglycol divinyl ether, poly ethyleneglycol divinyl ether, 1,4-cycloexane dimethanol divinyl ether and the like. Further, polymer compound can be used as the epoxy compound, which can be synthesized by a method disclosed in, for example, JP-A H7-247313.

Further, oxetane compound is cited as the cationic polymerization compound. The oxetane compound is possibly a compound having at least one oxetane ring in a molecule. Various compounds can be uses as the oxetane compounds, examples of preferable compound is a compound represented by Formula (I), Formula (II), Formula (III) described below.

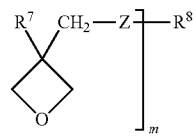

Formula (I)

(In the formula, $R^7$ represents hydrogen, fluorine, alkyl group, fluoroalkyl group, allyl group, aryl group or furyl group, m represents 1 to 4, Z represents oxygen or sulfur, and $R^8$ represents an organic group of 1 to 4 valents according to value of m.)

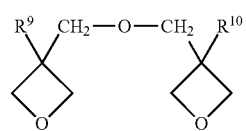

Formula (II)

(In the formula, $R^9$ and $R^{10}$ independently represents hydrogen, fluorine, alkyl group, fluoroalkyl group, allyl group, aryl group or furyl group.)

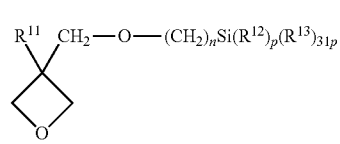

Formula (III)

(In the formula, $R^{11}$ represents hydrogen, fluorine, alkyl group, fluoroalkyl group, allyl group, aryl group or furyl group, $R^{12}$ represents hydrogen or an inactive mono valent organic group, le represents functional groups capable of hydrolysis, n is an integer of 1 to 5, p is an integer of 0 to 2.)

In the Formulas (I) to (III) above described, in case that $R^7$, $R^9$, $R^{10}$, $R^{11}$ are alkyl group, the number of carbon atoms may be about 1 to 6, and concretely, includes methyl, ethyl, propyl, butyl and the like. The number of carbon atoms of the fluoroalkyl group may be about 1 to 6. Further the aryl group is typically phenyl or naphthyl, which may be substituted with other groups.

Further, an organic group represented by $R^8$ in the above described Formula (I) is not particularly limited, and includes, for example, alkyl group, phenyl group and the like in case of in being 1, a straight or branched alkylene group, straight or branched poly(alkyleneoxy) group having a number of the carbon atoms of 1 to 12 and the like in case of m being, and similar polyfunctional groups in case of m being 3 or 4.

In the above described Formula (II), the inactive mono valent an organic group represented by $R^{12}$ includes, alkyl group having a number of the carbon atoms of 1 to 4, typically, and the functional groups capable of hydrolysis represented by $R^{13}$ include, for example, alkoxy group having 1 to 5 carbon atoms including methoxy and ethoxy groups, halogen atoms such as chlorine atom or bromine atom.

Further, (co)polymer containing monomer having a hydrogen bond forming group may be used which is a reactive polymer containing an oxetanyl group in main chain or side chain and having a number average molecular weight of not less than 20,000, according to necessity.

Further, a fluorine containing vinyl ether compound shown by the formula below may be used.

$$CH_2=CH-O-(CH_2)_a-O-(CH_2)_b-Rf-(CH_2)_b-O-(CH_2)_a-O-CH=CH_2$$

(In the formula, Rf is a fluorine containing alkyl group, a and b is an integer of 1 to 2, 0 to 3, respectively. Rf may be straight of branched alkyl group.)

Practical compounds include the followings.

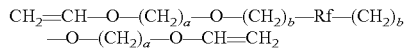

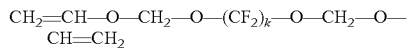

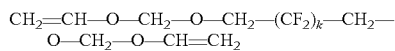

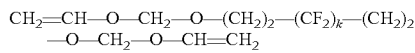

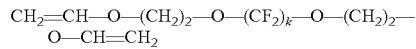

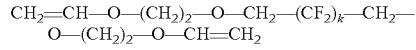

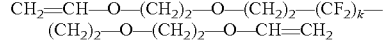

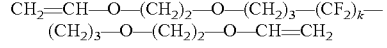

In the above formulas, k is preferably an integer from 2 to 12, and more preferably k is from 4 to 10.

The above described fluorine containing vinyl ether compound can be produced by reacting a vinyl ether having fluorine containing dialcohol body and a halogen group in the presence of an alkaline catalyst.

Also, fluorine containing epoxy compound may be contained, and for example, compounds of Formula (1) to (4) described in JP-A H11-309830 can be used. Practically, fluorine containing epoxy compounds 1 to 4 can be cited, but is not limited to these.

Fluorine containing epoxy compound 1

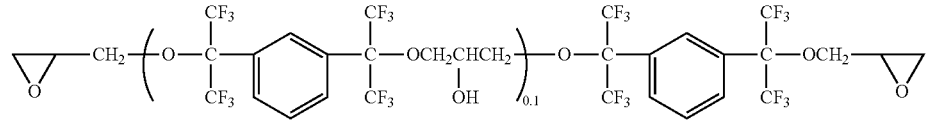

Fluorine containing epoxy compound 2

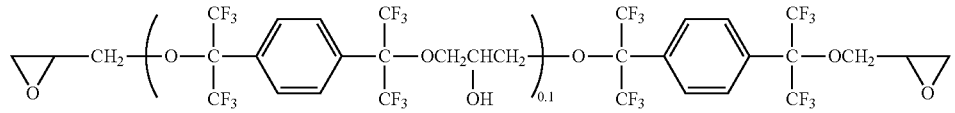

Fluorine containing epoxy compound 3

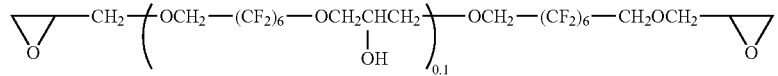

Fluorine containing epoxy compound 4

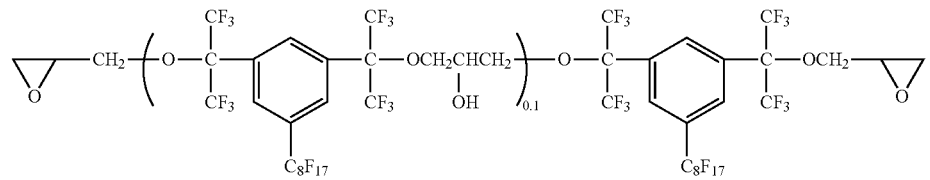

In addition thereto, compounds described in paragraphs of [0116] to [0126] of JP-A 2007-254650 can be cited. Further, epoxy group-containing silicon compounds can be cited. Compounds described in paragraphs of [0007] to [0015] of JP-A 2004-256609, concretely.

Amount of the cationic polymerization compounds described above is preferably from 15% by mass to 70% by mass of the solid substance in a hard coat composition, for the stability of the hard coat composition.

The cationic polymerization compounds and radical polymerization compounds described above may be used in combination, and it is preferable that a content ratio by mass of the radical polymerization compounds to the cationic polymerization compounds is radical polymerization compounds/cationic polymerization compounds of in the range of 85/15 to 98/2 for a stability of the hard coat layer.

Further, the hard coat layer according to the invention exhibits advantage when it is composed of the radical polymerization compounds, and it is used in the content ratio of thermoplastic acrylic resin to the radical polymerization compounds described above in mass ratio of, (thermoplastic acrylic resin)/(cationic polymerization compounds) in the range of 0.50/100 to 20/100.

Others

A hydrophilic resin such as known thermoplastic resin, thermosetting resin, gelatin and the like can be added to the hard coat layer as a binder. Tit is preferable that these resins have a polar group in a molecule. Examples of the polar group include —COOM, —OH, —NR$_2$, —NR$_3$X, —SO$_3$M, —OSO$_3$M, —PO$_3$M$_2$, —OPO$_3$M and the like (wherein M is a hydrogen atom, an alkali metal or ammonium group, X is an acid to form amine salt, and R is hydrogen atom and alkyl group).

The hard coat layer may contain inorganic or organic microparticles in order to adjust scratch resistance, lubrication property or refractive index.

Examples of inorganic microparticles used in the hard coat layer include silicon oxide, titanium oxide, aluminum oxide, tin oxide, indium oxide, ITO, zinc oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide and magnesium oxide are specifically preferable.

Examples of organic particles to be add include UV ray curable resin composition such as polymethacrylic acid methylacrylate resin powder, acryl-styrene based resin powder, polymethyl methacrylate resin powder, silicon based resin powder, polystyrene based resin powder, polycarbonate resin powder, benzoguanamine based resin powder, melamine based resin powder, polyolefin based resin powder, polyester based resin powder, polyamide based resin powder, polyimide based resin powder and polyfluorinated ethylene based resin powder. Specifically preferable organic microparticles include, for example, microparticles of cross-linked polystyrene (such as SX-130H, SX-200H and SX-350H produced by Soken Chemical & Engineering Co., Ltd.) and polymethyl methacrylate (such as MX150 and MX300 produced by Soken Chemical & Engineering Co., Ltd.) and fluorine containing acrylic resin microparticles. Examples of the fluorine containing acrylic resin microparticles includes include FS-701 and the like, produced by Nippon Paint Co., Ltd. in the market. Examples of acrylic particles include S-4000, produced by Nippon Paint Co., Ltd. and acryl-styrene particles include S-1200, MG-251 and the like, produced by Nippon Paint Co., Ltd.

The average particle diameter of the microparticles is preferably from 0.01 to 5 μm and specifically preferably from 0.1 to 5.0 μm and particularly 0.1 to 4.0 μm is preferable. The microparticle content of the hard coat layer is preferably from 0.1 to 30 weight parts per 100 weight parts of the UV-curable resin composition.

It is possible to use anti-oxidants by selecting one which does not inhibit photo-curing reaction so as to enhance heat resistance of a hard coat layer. Examples include hindered phenol derivatives, thin propionic acid derivatives, phosphite derivatives and the like. Concretely, for example, 4,4'-thiobis(6-tert-3-methylphenol), 4,4'-butylidnenbis(6-tert-butyl-3-methylphenol), 1,3,5-tris(3,5-di-tert-butyl-4-hydroxybenzyl)isocyanurate, 2,4,6-tris(3,5-di-tert-butyl-4-hydroxybenzyl)mesitylene, dioctadecyl-4-hydroxy-3,5-di-tert-butylbenzyl phosphate and the like are cited. A coating composition of the hard coat layer may contain a solvent, which may be optionally a mixture or diluted according to necessity. The organic solvent contained in the coating composition is used by selecting from, for example, hydrocarbons (toluene and xylene), alcohols (methanol, ethanol, isopropanol, butanol and cyclohexanol), ketones (acetone, methylethylketone and methylisobutyl ketone), esters (methyl acetate, ethyl acetate and methyl lactate), glycol ethers, and other organic solvent, or mixing them. It is preferable to use organic solvent containing the propyleneglycol mono alkyl ether (a number of carbon atoms of alkyl group being 1 to 4) or propyleneglycol mono alkyl ether acetic acid ester (a number of carbon atoms alkyl group being 1 to 4) and the like are used preferably 5% by mass or more, and more preferably 5 to 80% by mass or more.

Moreover it is preferable to incorporate silicon type surfactant or a polyoxyether compound in the hard coat layer. Polyether modified silicon is preferable for the silicon type surfactant, concretely, BYK-UV3500, BYK-UV3510, BYK-333, BYK-331, BYK-337 (produced by BYK Japan KK), TSF4440, TSF4445, TSF4446, TSF4452, TSF4460 (produced by GE Toshiba Silicone), KF-351, KF-351A, KF-352, KF-353, KF-354, KF-355, KF-615, KF-618, KF-945, KF-6004 (polyether modified silicon oil; produced by Shin-Etsu Chemical Co., Ltd.) and the like are cited, without limitation.

Among these polyoxy-ether compounds, preferable is polyoxyethylene oleyl ether compound and a compound generally represented by Formula (A).

$$C_{18}H_{35}\text{—}O(C_2H_4O)n H \qquad \text{Formula (A)}$$

In the Formula, n represents 2 to 40.

An average additive number (n) of ethylene oxide to an oleyl portion is 2 to 40, preferably 2 to 10. The compound represented by Formula (A) can be obtained by a process of reacting ethylene oxide and oleyl alcohol.

Examples of specific commercial products include EMULGEN 404 (polyoxyethylene(4) oleylether), EMULGEN 408 (polyoxyethylene(8) oleylether), EMULGEN 409P (polyoxyethylene(9) oleylether), EMULGEN 420 (polyoxyethylene(13) oleylether), EMULGEN 430 (polyoxyethylene (30) oleylether) produced by Kao Corp., and NOFABLEEAO-9905 (polyoxyethylene (5) oleylether) produced by NOF Corp.

The number in parenthesis ( ) indicates "n". The polyoxyether compound may be used singly or two or more in combination.

These compounds enhance the coating performance and it is preferable to add within the range of 0.01 to 3% by mass with respect to solid component of the coating composition.

Further, fluorine-siloxane graft polymer may be incorporated in the hard coat layer.

The fluorine-siloxane graft polymer is a copolymer which is obtained by grafting polysiloxane and/or organo polysiloxane containing siloxane and/or organosiloxane to a fluorine resin. The fluorine-siloxane graft polymer on the market includes ZX-022H, ZX-007C, ZX-049 and ZX-047-D, produced by FUJI KASEI KOGYO CO., LTD. These compounds may be used in mixture. These may be used by mixture in combination. It is preferable to use the fluorine-siloxane graft polymer with actinic ray curable resin in content ratio by mass of fluorine-siloxane graft polymer: actinic ray curable resin=0.05:100 to 5.00:100 for stability of coating composition.

The hard coat layer may have multi-layer structure composed of two or more layers. It is preferable that the hard coat layer is composed of a multi-layer material, and the hard coat layer film adjacent to substrate contains a thermoplastic acrylic resin because that the effect of the invention is exhibited in the several test condition in the invention.

Furthermore, one layer or whole layers are composed of so called electroconductive layer containing for example, electroconductive microparticles, π conjugated electroconductive polymer, or, ionic polymer. Examples of π conjugated electroconductive polymer include polythiophene, poly(3-methylthiophene), poly(3-ethylthiophene), poly(3-propylthiophene), poly(3-butylthiophene), poly(3-hexylthiophene), poly(3-octylthiophene), poly(3-decylthiophene), poly(3-dodecylthiophene), poly(3-bromothiophene), poly(3-chlorothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-octyloxythiophene), poly(3-decyloxythiophene), poly(3-dodecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polypyrrole, poly(N-methylpyrrole), poly(3-methylpyrrole), poly(3-ethylpyrrole), poly(3-N-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), polyaniline, poly(2-methylaniline), poly(3-isobutylaniline), poly(2-aniline sulfonic acid), poly(3-anilinesulfonic acid) and the like. These may be used singly or a copolymer composed of two species adequately.

It is possible to incorporate a color adjusting agent such as a die or a pigment having a color adjusting function as a color compensating filter for various display element. It is preferable to incorporate an electromagnetic wave shielding agent or an infrared absorbing agent to give their respective function.

As for coating method of coating composition of the hard coat layer one described previously can be used. Coating amount is suitably 0.1 to 40 μm and preferably 0.5 to 30 μm in wet thickness. Dry thickness is described previously.

It is preferred that the hard coat layer may be a clear hard coat layer having a center-line average roughness (Ra prescribed by JIS B 0601) of 0.01 to 0.1 μm or an anti-glare layer having an Ra value of from 0.1 to 1 μm to which microparticles or the like are added. The center-line average roughness (Ra) is preferably measured by means of a surface roughness meter using interference of light, for example, WYKO non-contact surface micro profile measuring apparatus NT-2000NT-2000 produced by WYKO Co., Ltd.

Coating Process

It is preferable to include a process wherein the hard coat layer is subjected to light irradiation and after that heat treatment after coating and drying in a hard coat layer forming process.

It is necessary to conduct the heat treatment process at a place wherein temperature and moisture can be controlled, and preferably in a clean room free from dust.

Preferable temperature in the heat treatment is at least 80° C., more preferably at least 120° C. Further, period of heat treatment is preferably 20 or less. When heat treatment is conducted for 20 minutes or longer, the improving effect is the same but visual appearance such as discoloration or deformation of the film due to heat occurs easily.

The period of heat treatment is a time maintained desirable temperature constantly, and does not include a time for raising or descending temperature.

It is preferable that the maintaining temperature is within a range of ±5° C. of setting temperature. The heat treatment process may be conducted in plural rooms. Temperature of each room can be designed to change respectively in this instance.

FIG. 1 is a schematic diagram showing the process continuously conducting heat treatment after irradiation. Continuous film Y is unwound from taking out roll 1, is conveyed by conveying roller 2, and a hard coat layer is coated thereon by an extrusion coater 3. Here, a hard coat layer may be composed of a single layer or plural layers. The continuous film Y on which a hard coat layer is coated is subjected to drying at drying zone 5. It is preferable that temperature at drying zone 5 is in the range of 50 to 150° C. Drying is conducted by blowing temperature and moisture controlled warm air to front surface or back surface or both surfaces of continuous film Y. After drying, coated layer is hardened by irradiating UV ray or the like via air-cooling actinic ray lamp 6a in light beam irradiation lamp unit 6. Alternatively, the layer can be in a half cure state by controlling irradiation quantity or irradiation condition of the actinic ray. The actinic ray irradiation may be conducted in a state that continuous film Y is wound on counter roll 4, temperature of which is controlled preliminary at 20 to 120° C.

It is preferable to blow cooling air through air vent hole 6b for air-cooling to adjust temperature of actinic ray irradiation portion in this instance, further, it is also preferable to provide nitrogen gas to accelerate curing the hard coat layer through nitrogen gas supplying chamber.

Light irradiating sources includes, for example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. An air-cooling or water cooling types light source is used preferably. The preferable irradiation quantity of light may vary depending on the types of a lamp, however, it is preferably from 5 to 500 mJ/cm², and more preferably from 5 to 150 mJ/cm². Further, it is preferable to reduce oxygen concentration to 0.01% to 5% at the irradiation portion by nitrogen purge.

Subsequently, it is subjected to heat treatment at heating zone 7 after light irradiation. Continuous film Y is subjected to heat treatment at heating zone 7 via conveying rollers 2 arranged upper and lower at predetermined temperature for predetermined period.

It is preferable that the heat treatment step is conducted while imparting tension in conveying direction or width direction of the, wherein tension to impart is preferably 50 to 500 N/m, and more preferably 250 to 500 N/m. Flatness of the film is difficult to maintain when exceeding 500 N/m. A method to impart tension is not particularly limited, and it may be conducted on free span, back roll or the like. Further, it is effective to impart tension at width direction employing wide regulation device, and a film excellent in anti-blocking property can be obtained by not more than 3.0% stretching, and more preferably 0.05% to 1.0%, stretching.

The continuous film Y subjected to heat treatment is wound as wind roll 9 in winding room 8. It is preferable to blow warm air with predetermined temperature from blow out opening 10 in this instance. It is preferable that above described warm air is adjusted within a range of relative humidity of 10 to 70% RH, preferably 20 to 70% RH, and particularly 40 to 60% RH for anti-static and preventing dust adhesion. Further, warm air is preferably ionic-wind, and it is preferable to provide a static eliminating device or an air cleaner in neighborhood of winding portion. The heat treatment may be conducted in a heat treatment room.

It is preferable to gradually at the heat treatment in the heat treatment room, to prevent large temperature difference between inside and outside of the film roll and generation of wrinkle near the winding core due to sudden rise in temperature. Concretely, heat-up or heat-down rate is preferable 0.3 to 5° C./hour.

Further, it is preferable to conduct knurling treatment for preventing blocking, or maintaining good winding appearance. The knurling treatment is sufficiently conducted on at least one side of the film, or on both sides. It is preferable that a thickness of knurling portion is thicker than a thickness of the hard coat layer, and it is preferable that knurling portion is in the range of 5 to 30 µm and preferably in the range of 10 to 25 µm.

Further, the winding core of the hard coat film to wind in a roll shape is made of any material as far as it is a cylindrical core, and preferably is a hollow plastic core. Any heat resistance plastic to endure heat treatment temperature can be used as a plastic material, and includes, resins such as phenol resin, xylene resin, melamine resin, polyester resin, and epoxy resin. Further thermosetting resin reinforced by fillers such as glass fiber is preferable. The number of winding on the winding core is preferably 100 or more and more preferable 500 or more. Winding thickness is preferably at least 5 cm.

Further, when the hard coat film wound up in roll shape is subjected to above described heat treatment in a rolled state, it may be conducted while rotating the roll.

The rotation is preferably not more than once in a minute, and may be continuous or intermittent rotation. Further, it is preferable to rewind the roll at least once during thermal treatment.

It is preferable to provide a rotation table for a special use to rotate the long rolled hard coat film wound on the core during heat treatment in the heat treatment room. It is more preferable to rotate by setting the hard coat film on a carriage for exclusive use having heat resistance and rotating function during heat treatment in the heat room.

It is preferable that the roll of the hard coat film completing heat treatment is, for example, transported to rewinding process (not shown in the drawing), is cooled down to room temperature while rewinding the hard coat film, and rewinding roll is obtained. Further, it is preferable to pass through atmosphere of relative humidity of 10 to 70% RH, or to wind up in the atmosphere in the rewinding process. When the relative humidity is, preferably, 20 to 70% RH, particularly 40 to 60% RH, good hard coat film roll without static failure or collapse wind shape can be obtained. Rate of rewinding of the film is preferably 0.1 to 200 m/minute, more preferably in the range of 10 to 100 m/minute. It is preferable to wind up the film allowing to put into contact with at least one roller in a state of taking out the film to fall film temperature.

It is preferable to provide a static eliminating device or conducting in a clean room when the rotation or rewinding is conducted since there is a possibility of generating static failure or injury on the film and it is preferable to use the contacting roller for rewinding having surface with high smoothness. Blowing hot air, convection heating by heat roll, induction heating by micro wave, radiation heating by infrared ray heater and so on can be utilized as heating means used in the above described heat treatment step. An infrared ray heater, far infrared ceramic heaters such as electric, gas, oil or steam type can be utilized. An infrared ray heater on the market (produced by, for example, Noritake Co., Ltd.) may be used. The oil or steam infrared ray heater using oil or steam as a heating medium is preferable in view of preventing of explosion in co-existing atmosphere with organic solvent.

Further, film temperature during heating or heating temperature can be measured by a non-contact type infrared ray thermometer on the market. Further, feedback control can be applied to heating means for control temperature range.

The hard coat layer can be coated by known coating method such as a gravure coater, a dip coater, a reverse coater, a wire bar coater, a die coater and an inkjet method.

High hardness condition in the invention is 3H or higher in pencil hardness as the index of hardness, more preferably 4H or higher. It is hard to be injured in a polarizing plate preparing step of a liquid crystal display device, further, high layer strength is exhibited when it is used for surface protecting film of a large format liquid crystal display device or a liquid crystal display device for a digital signage frequently used in outdoor in case of 3H or higher. The pencil hardness is determined using a film sample which is subjected to a humidity conditioning under a condition of 23° C. and a relative humidity of 55% for 2 hours, and measured according to the method defined by JIS-K-5400, using a pencil of which hardness is defined by JIS-S-6006.

(Anti-Reflection Film)

An anti-reflection film provided with a low refractive index layer directly or via another layer on the hard coat layer the hard coat film of the invention exhibits a benefit of the invention. The low refractive index layer in the invention is a layer having lower refractive index than that of the film substrate. The anti-reflection layer of the anti-reflection film may be composed by combining a high refractive index layer having higher refractive index than that of the supporting body in addition to the low refractive index layer. Further, it may include a middle refractive index layer (a layer having higher refractive index than the supporting body, and lower refractive index than the high refractive index layer). Concrete examples of a layer arrangement of the anti-reflection film include those described below, but not limitative.

film substrate/hard coat layer/middle refractive index layer/low refractive index layer film substrate/hard coat layer/middle refractive index layer/high refractive index layer/low refractive index layer film substrate/hard coat layer/low refractive index layer film substrate/hard coat layer/an electroconductive layer/low refractive index layer film substrate/hard coat layer/high refractive index layer (electroconductive layer)/low refractive index layer film substrate/hard coat layer/an anti-glare layer/low refractive index layer back coat layer/film substrate/hard coat layer/low refractive index layer back coat layer/film substrate/hard coat layer/middle refractive index layer/low refractive index layer back coat layer/film substrate/hard coat layer/anti-glare layer/low refractive index layer back coat layer/film substrate/hard coat layer/electroconductive layer/low refractive index layer back coat layer/film substrate/a hard coat layer/high refractive index layer (electroconductive layer)/low refractive index layer Low Refractive Index Layer The low refractive index layer according to the invention is a layer having lower refractive index than that of the transparent film substrate. It is preferable specific refractive index is in the range of 1.20 to 1.45 at 23° C. and wavelength 550 nm, further preferably in the range of 1.25 to 1.40, and particularly preferably in the range of 1.30 to 1.37. Further, thickness of the low refractive index layer is preferably 5 nm to 0.5 nm, more preferably 10 nm to 0.3 nm and further preferably 30 nm to 0.2 μm in view of property of the optical interference layer.

It is preferable that the low refractive index layer in the invention is an embodiment containing hollow silica particles which have a cationic polymerization compound and an outer shell layer, and whose inside is porous or void.

The low refractive index layer is formed by an organic silicon compound and hydrolysis product or its polycondensation product, and, polyvinyl alcohol, polyoxy ethylene, polymethylmethacrylate, polymethylacrylate, diacetyl cellulose, triacetylcellulose, nitrocellulose, polyester, alkyd resin, fluoroacrylate, a fluorine containing polymer, and so on. The fluorine polymer includes, for example, fluoro olefins such as fluoro ethylene, vinylidene fluoride, tetrafluoro ethylene, perfluorooctyl ethylene, hexafluoropropylene and perfluoro-2,2-dimethyl-1,3-dioxole, and a partial or complete fluorinated alkyl ester derivatives of (meth)acrylic acid such as VISCOAT 6FM (produced by Osaka Organic Chemical Industry Ltd.) and M-2020 (produced by Daikin Industries, Ltd.), and partial or complete fluorinated vinylethers. Preferable among these is an organic silicon compound having number of the carbon atoms of 1 to 4, its hydrolysis product or its condensation polymer, concretely, includes tetramethoxysilane, tetraethoxysilane, tetrabutoxy silane and the like, and hydrolysis product or condensation polymer thereof (Cationic Polymerization Compound)

It is preferable that the low refractive index layer according to the invention contains a cationic polymerization compound in view of adhesive property.

Examples of cationic polymerization compounds employed preferably include known compounds such as epoxy compounds, phenol compounds, aldehyde compounds, vinyl ether compounds, styrene compounds, cyclic ether compounds, lactone compounds, an episulfide compounds, silicones and the like, and particularly fluorine containing epoxy compounds and fluorine containing oxetane compound are used preferably.

Cationic polymerization compounds having epoxy group or vinyl ether group include, for example, phenyl glycidyl ether, ethyleneglycol diglycidyl ether, glycerin diglycidyl ether, vinylcyclohexene dioxide, limonene dioxide, 3,4-epoxycyclohexylmethyl-3',4'-epoxycycloexanecarboxylate, bis-(6-methyl-3,4-epoxycyclohexyl)adipate, 2-(3,4-epoxycyclohexyl) ethyltrimethoxysilane, diethyleneglycol divinyl ether, polyethyleneglycol divinyl ether, and 1,4-cycloexane dimethanol divinyl ether. Further, epoxy polymer compounds can be used, which is synthesized by a method disclosed in, for example, JP-A H07-247313.

Further, oxetane compounds are cited as the cationic polymerization compounds. The oxetane compounds are allowed to have at least one oxetane ring in a molecule, various oxetane compounds can be used, and preferable examples are compounds of above described Formula (I) to Formula (III).

Compounds described in JP-A 2007-254650 paragraphs of [0116] to [0126] can be cited.

It is preferable that content of the cationic polymerization compounds described above is 15% by mass to 70% by mass in solid substance of the low refractive index layer composition for the stability of the low refractive index layer composition.

(Cationic Polymerization Accelerator)

Compounds accelerating polymerization of cationic polymerization include known acids and a photo acid-initiator. Examples of the photo acid-initiator include a photo initiator of cationic polymerization, known compound used in a light discoloring agent of dyes, a light discoloration agent or a micro resist or the like, and mixture thereof. Concretely, for example, onium compounds, organic halogen compounds and disulfon compounds are cited, and onium compounds are preferable. Diazonium salts, sulfonium salts, iodonium salts represented by the following Formulas and the like are preferably employed as the onium compounds.

$ArN_2^+Z^-$, $(R)_3S^+Z^-$, $(R)_2I^+Z^-$

In the formula, Ar is aryl group, R is aryl group or an alkyl group having a number of the carbon atoms of 1 to 20, which may be same or different in case of appearing twice or more in a molecule, $Z^-$ is a non basic and non nucleophilic anion.

In each of the above described formulas, Ar or R represented by aryl group is typically a phenyl or a naphthyl, which may be substituted with a suitable group. Further, anion represented by $Z^-$ includes concretely, tetrafluoro borate ion ($BF_4^-$), tetrakis (pentafluorophenyl) borate ion ($B(C_6F_5)_4^-$), hexafluorophosphate ion ($PF_6^-$), hexa fluoro arsenate ion ($AsF_6^-$), hexa fluoro antimonate ion ($SbF_6^-$), hexa chloro antimonate ion ($SbCl_6^-$), hydrogen ion sulfate ($HSO_4^-$), perchloric acid ion ($ClO_4^-$) and the like.

The other onium compound includes ammonium salt, iminium salt, phosphonium salt arsonium salt, selenonium salt, boric acid salt and compounds described in, for example, paragraphs of [0058] to [0059] of JP-A 2002-29162.

Diazonium salts, iodonium salts, sulfonium salts and iminium salt are preferable among these in view of stability of material of the compounds.

Concrete examples of the onium salt preferably employed include, for example, aluminated sulfonium salts disclosed in paragraph [0035] of JP-A H9-268205, diaryl iodonium salts and triaryl sulfonium salts disclosed in paragraphs [0010] to [0011] of JP-A 2000-71366, sulfonium salts of thiobenzoic acid S-phenyl ester disclosed in paragraph [0017] of JP-A 2001-288205, onium salts disclosed in paragraphs [0030] to [0033] of JP-A 2001-133696.

Other examples of the acid generating agents includes organo metal/organo halogenide disclosed in paragraphs [0059] to [0062] of JP-A 2002-29162, photo acid generating agent having o-nitrobenzyl type protecting group, compounds generating sulfonic acid via photodecomposition (such as imino sulfonate). Majority of these compounds are sold in a market and these can be employed. Initiators obtained from the market include, for example, "CYRA-CURE UVI-6990" sold by The Dow Chemical Japan (trade name), "ADEKA OPTOMER SP-150" (trade name) and ADEKA OPTOMER SP-300" (trade name), both sold by ADEKA Corp., "RHODORSIL PHOTOINITIAOR 2074" (trade name) sold by RHODIA Japan Corp.

Acid includes Bronsted acid such as inorganic acid such as hydrochloric acid, sulfuric acid, nitric acid and phosphoric acid, or an organic acid such as acetic acid, formic acid, methane sulfonic acid, trifluoro sulfonic acid and para toluenesulfonic acid, and Lewis acid such as dibutyl tin dilaurate, dibutyl tin diacetate, dibutyl tin dioctate, triisopropoxy aluminum, tetrabutoxy zirconium and tetrabutoxy titanate.

Also cited is an aromatic polyvalent carboxylic acid or its anhydride such as pyromellitic acid, pyromellitic acid anhydride, trimellitic acid, trimellitic acid, phthalic acid, and phthalic acid anhydride or its anhydride such as maleic acid, maleic anhydride, succinic acid and succinic acid anhydride.

The acid can be used singly or two or more in combination.

These acids or photo acid-initiators is preferably added in a ratio of 0.1 to 20 parts by mass with reference to 100 parts by mass cationic polymerization compounds, more preferably 0.5 to 15 parts by mass. It is preferable that the added amount is in the above described range, in view of stability of the curable compounds component, polymerization reactivity and so on.

Hollow Silica Microparticles

Hollow particles are (I) complex particles constituted of a porous particle and a cover layer arranged on the surface of said porous particle or (II) hollow particles, the interior of which is hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the interior of which is hollow, and the hollow is surrounded by a particle wall. The interior of the hollow is filled with the contents such as a solvent, a gas or a porous substance which have been utilized in preparation. The mean particle diameter of such hollow particles is preferably in a range of 5 to 300 nm and preferably of 10 to 200 nm. The mean particle diameter of hollow particles utilized is appropriately selected depending on the thickness of the formed transparent cover film and is preferably in a range of ⅔ to ⅒ of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1 to 20 nm and more preferably in a range of 2 to 15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in increase of refractive index of the interior, whereby an effect of a low refractive index may not be obtained. Further, when a thickness of the cover layer is over 20 nm, the aforesaid silicate monomer or oligomer never immerses into the interior, however, the porosity (a micro-pour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, $NaF$, $NaAlF_6$ and $MgF$. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$ and $WO_3$. In such a porous particle, mole ratio $MO_x/SiO_2$ is preferably in a range of 0.0001 to 1.0 and more preferably of 0.001 to 0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1 to 1.5 ml/g and more preferably of 0.2 to 1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased.

Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those containing single component or mixture of plural components.

As a manufacturing method of such hollow particles, a preparation method of complex oxide colloidal particles, disclosed in paragraph Nos. [0010] to [0033] of JP-A H07-133105, is suitably applied. Specifically the hollow microparticles are produced by the first to third processes described below in case that the composite particles are composed of silica and inorganic compound other than silica.

First Process: Preparation of Porous Particle Precursor

In the first process, alkaline aqueous solutions of a silica raw material and of an inorganic compound raw material other than silica are independently prepared or a mixed aqueous solution of a silica raw material and an inorganic compound raw material other than silica is prepared, in advance, and this aqueous solution is gradually added into an alkaline aqueous solution having a pH of not less than 10 while stirring depending on the complex ratio of the aimed composite oxide, whereby a porous particle precursor is prepared.

As a silica raw material, silicate of alkali metal, ammonium or organic base is used. As silicate of alkali metal, utilized are sodium silicate (water glass) and potassium silicate. Organic base includes quaternary ammonium salt such as tetraethylammonium salt; and amines such as monoethanolamine, diethanolamine and triethanolamine. Herein, an alkaline solution, in which such as ammonia, quaternary ammonium hydroxide or an amine compound is added to a silicic acid solution, is also included in silicate of ammonium or silicate of organic base.

Further, as a raw material of an inorganic compound other than silica, utilized is an alkali-soluble inorganic compound. Practical examples include oxo acid of an element selected from such as Al, B, Ti, Zr, Sn, Ce, P, Sb, Mo, Zn and W; alkali metal salt, alkaline earth metal salt, ammonium salt and quaternary ammonium salt of the oxo acid. More specifically, sodium aluminate, sodium tetraborate, ammonium zirconyl carbonate, potassium antimonite, potassium stannate, sodium aluminosilicate, sodium molybdate, cerium ammonium nitrate and sodium phosphate are suitable.

The pH value of a mixed aqueous solution changes simultaneously with addition of these aqueous solutions, however, operation to control the pH value into a specific range is not necessary. The aqueous solution finally takes a pH value determined by the types and the mixing ratio of inorganic oxide. The addition rate of an aqueous solution is not specifically limited in this instance. Further, dispersion of a seed particle may be also utilized as a starting material at the time of manufacturing of composite oxide particles.

Said seed particles are not specifically limited. Particles of inorganic oxide such as $SiO_2$, $Al_2O_3$, $TiO_2$ or $ZrO_2$ or composite oxide thereof are utilized, and generally sol thereof can be utilized. Further, a porous particle precursor dispersion prepared by the manufacturing method may be utilized as seed particle dispersion.

In the case of utilizing seed particle dispersion, after the pH of the seed particle dispersion is adjusted to not lower than 10, an aqueous solution of the compound is added into said seed particle dispersion while stirring. In this case pH control of dispersion is not necessarily required. By utilizing seed particles in this manner, it is easy to control the particle diameter of prepared porous particles and particles having a uniform particle size distribution can be obtained.

A silica raw material and an inorganic compound raw material, as described above, have a high solubility at alkaline area. However, when the both are mixed in pH range having this high solubility, the solubility of an oxo acid ion such as a silicic acid ion and an aluminic acid ion will decrease, resulting in precipitation of these complex products to form particles or to be precipitated on a seed particle causing particle growth. Therefore, pH control in a conventional method is not necessarily required at the time of precipitation and growth of particles.

In the first process, a complex ratio of silica and an inorganic compound other than silica is preferably in a range of 0.05 to 2.0 and more preferably of 0.2 to 2.0, based on mole ratio $MO_x/SiO_2$, when an inorganic compound other than silica is converted to oxide ($MO_x$). In this range, the smaller is the ratio of silica, increases the pore volume of porous particles. However, a pore volume of porous particles barely increases even when the mole ratio is over 2.0. On the other hand, a pore volume becomes small when the mole ratio is less than 0.05. In the case of preparing hollow particles, mole ratio of $MO_x/SiO_2$ is preferably in a range of 0.25 to 2.0.

Second Process: Removal of Inorganic Compounds Other than Silica from Porous Particles In the second process, at least a part of inorganic compounds other than silica (elements other than silica and oxygen) is selectively removed from the porous particle precursor prepared in the first process. As a specific removal method, inorganic compounds in a porous particle precursor are removed by dissolving them using such as mineral acid and organic acid, or by ion-exchanging being contacted with cationic ion-exchange resin.

A porous particle precursor prepared in the first process is a particle having a network structure in which silica and an inorganic compound element bond via oxygen. In this manner, by removing inorganic compounds (elements other than silica and oxygen) from a porous particle precursor, porous particles, which are more porous and have a large pore volume, can be prepared. Further, hollow particles can be prepared by increasing the removal amount of inorganic compound (elements other than silica and oxygen) from a porous particle precursor.

Further, in advance to removal of inorganic compounds other than silica from a porous particle precursor, it is preferable to form a silica protective membrane by adding a silicic acid solution which contains a silane compound having a fluorine substituted alkyl group, and is prepared by dealkalization of alkali metal salt of silica; or a hydrolyzable organosilicon compound, in a porous particle precursor dispersion prepared in the first process. The thickness of a silica protective membrane is 0.5 to 15 nm. Herein, even when a silica protective membrane is formed, since the protective membrane in this process is porous and has a thin thickness, the inorganic compounds other than silica can be removed from a porous particle precursor.

By forming such a silica protective membrane, the inorganic compounds other than silica can be removed from a porous particle precursor while keeping the particle shape as it is. Further, at the time of forming a silica cover layer described later, the pore of porous particles is not sealed by a cover layer, and thereby the silica cover layer described later can be formed without decreasing the pore volume. When the amount of inorganic compound to be removed is small, it is not necessary to form a protective membrane because the particles will not be broken.

It is preferable to form this silica protective membrane in the case of preparation of hollow particles. At the time of preparation of hollow particles, a hollow particle precursor comprising a silica protective membrane, a solvent and insoluble porous solid within said silica protective membrane, is obtained when inorganic compounds are removed.

The hollow particles are formed by forming cover layer described later is formed on said hollow particle precursor, and then the formed cover layer becomes particle wall.

The amount of a silica source added to form the silica protective membrane is preferably in a range so small as to maintain the particle shape. When the amount of a silica source is excessively large, it may become difficult to remove inorganic compounds other than silica from a porous particle precursor because a silica protective membrane becomes excessively thick. As a hydrolizable organosilicon compound utilized to form a silica protective layer, alkoxysilane represented by Formula may be utilized preferably.

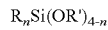

$R_nSi(OR')_{4-n}$

In the Formula R and R': each is a hydrocarbon group such as an alkyl group, an aryl group, a vinyl group or an acryl group; n is 0, 1, 2 or 3. Fluorine-substituted tetraalkoxysilane, such as tetramethoxysilane, tetraethoxysilane and tetraisopropoxysilane, is particularly preferably utilized.

As an addition method, a solution, in which a small quantity of alkali or acid as a catalyst is added into a mixed solution of these alkoxysilane, pure water and alcohol, is added into the dispersion of porous particles, and silicic acid polymer formed by hydrolysis of alkoxysilane is precipitated on the surface of inorganic oxide particles. Alkoxysilane, alcohol and a catalyst may be simultaneously added into the dispersion, in this instance. As an alkali catalyst, ammonia, hydroxide of alkali metal and amines can be utilized. Further, as an acid catalyst, various types of inorganic acid and organic acid can be utilized.

In the case that a dispersion medium of a porous particle precursor is water alone or has a high ratio of water to an organic solvent, it is also possible to form a silica protective membrane by use of a silicic acid solution. In the case of utilizing a silicic acid solution, a predetermined amount of a silicic acid solution is added into the dispersion and alkali is added simultaneously, to precipitate silicic acid solution on the porous particle surface. Herein, a silica protective membrane may also be formed by utilizing a silicic acid solution and the alkoxysilane in combination.

Third Process: Formation of Silica Cover Layer

In the third process, by addition of such as a hydrolyzable organosilicon compound containing a silane compound provided with a fluorine substituted alkyl group, or a silicic acid solution, into a porous particle dispersion (into a hollow particle dispersion in the case of hollow particles), which is prepared in the second process, the surface of particles is covered with a polymer substance of such as a hydrolyzable organosilicon compound or a silicic acid solution to form a silica cover layer.

As a hydrolizable organosilicon compound utilized to form a silica cover layer, alkoxysilane represented by Formula described above may be utilized preferably.

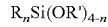

$R_nSi(OR')_{4-n}$

In the Formula R and R': each is a hydrocarbon group such as an alkyl group, an aryl group, a vinyl group or an acryl group; and n is 0, 1, 2 or 3. Fluorine-substituted tetraalkoxysilane, such as tetramethoxysilane, tetraethoxysilane and tetraisopropoxysilane, is particularly preferably utilized.

As an addition method, a solution, in which a small quantity of alkali or acid as a catalyst is added into a mixed solution of these alkoxysilane, pure water and alcohol, is added into the dispersion of porous particles, and silicic acid polymer formed by hydrolysis of alkoxysilane is added to a dispersion liquid of the above described porous particles (or precursor of the hollow particles in the case of hollow particles), and polymer of silicic acid produced by hydrolysis of alkoxysilane is deposited on the surface of the porous particles (or precursor of the hollow particles in the case of hollow particles). Alkoxysilane, alcohol and a catalyst may be simultaneously added into the dispersion, in this instance. As an alkali catalyst, ammonia, hydroxide of alkali metal and amines can be utilized. Further, as an acid catalyst, various types of inorganic acid and organic acid can be utilized.

The cover layer may be formed by employing a silicic acid solution in case that the dispersion medium of the porous particles (or precursor of the hollow particles in the case of hollow particles) is water solely or mixture medium of water with an organic solvent, and content of water is high in ratio to the organic medium. The silicic acid solution is an aqueous solution of lower polymer of silicic acid which is formed by ion-exchange and dealkalization of an aqueous solution of alkali metal silicate such as water glass.

The silicic acid solution is added to dispersion liquid of the porous particles (or the precursor of the hollow particles in the case of hollow particles), and low polymerized product of the silicic acid is deposited on the surface of the porous particles (or the precursor of the hollow particles in the case of hollow particles) by addition of alkali simultaneously. In this instance the silicic acid liquid may be employed for forming the cover layer in combination with the above described alkoxysilane. The addition amount of an organosilicon compound or a silicic acid solution, which is utilized for cover layer formation, is as much as to sufficiently cover the surface of colloidal particles and the solution is added into a dispersion of porous particles (a hollow particle precursor in the case of hollow particles) at an amount to make a thickness of the finally obtained silica cover layer of 1 to 20 nm. An organosilicon compound or a silicic acid solution is added at an amount to make a thickness of the total of a silica protective membrane and a silica cover layer of 1 to 20 nm, in the case that the silica protective membrane is formed.

Next, a dispersion of particles provided with a cover layer is subjected to a heat treatment. By the heat treatment, in the case of porous particles, a silica cover layer, which covers the surface of porous particles, becomes minute to prepare a dispersion of composite particles comprising porous particles covered with a silica cover layer. Further, in the case of a hollow particle precursor, the formed cover layer becomes minute to form a hollow particle wall, whereby a dispersion of hollow particles provided with a hollow, the interior of which is filled with a solvent, a gas or a porous solid, is prepared.

Heat treatment temperature at this time is not specifically limited provided being so as to seal micro-pores of a silica cover layer, and is preferably in a range of 80 to 300° C. At the heat treatment temperature of lower than 80° C., a silica cover layer may not become minute to completely seal the micro-pores or the treatment time may become long. Further, when a prolonged treatment at a aging treatment temperature of higher than 300° C. is performed, particles may become minute and an effect of a low refractive index may not be obtained.

A refractive index of inorganic particles prepared in this manner is as low as less than 1.42. It is assumed that the refractive index becomes low because such inorganic particles maintain porous property in the interior of porous particles or the interior is hollow. The hollow silica microparticles obtained in the market provided by JGC C&C can be used preferably.

Content of hollow silica microparticles with porous or void interior and having outer shell layer in low refractive index layer is preferably 10 to 50% by mass. To obtain the effect by virtue of the low refractive index 15% by mass or more is preferable, and film strength becomes insufficient when exceeding 50% by mass because binder component becomes little. Content of 20 to 50% by mass is particularly preferable.

As for the adding method to the low refractive index layer, for example, mixture liquid of the above described tetraalkoxysilane, deionized water and alcohol to which a small quantity of alkali or acid is added as a catalyst is added to a dispersion of the above described hollow silica microparticles, silica polymer formed by hydrolysis of tetraalkoxysilane is deposited on the surface of the hollow silica microparticles. It is possible to add the tetraalkoxysilane, alcohol and catalyst into the dispersion simultaneously, in this instance. Ammonia, hydroxide of alkali metal or amines can be used as the alkaline catalyst. Further, various types of inorganic acids and organic acids can be used as the acid catalyst. Further, silica based microparticles produced by a method disclosed in WO2007/099814 can be used.

(Binder)

Further, it is preferable that the low refractive index layer contains a cationic polymer compound as a binder in view of exhibiting better effect or anti-abrasion properly. It is possible to use compounds described in terms of the hard coat layer as the cationic polymer compound. In addition thereto it is preferable to use above described acids or agents generating acid by light as a compound accelerating polymerization of cationic polymerization compounds. These acids or agents generating acid by light are added preferably in an amount of 0.1 to 20 parts by mass based on 100 parts by mass of cationic polymerization compounds, and more preferably 0.5 to 15 parts by mass for stability in the low refractive index layer forming composition, polymerization reactivity, and the like.

Further, it is possible to used radical polymerization compounds as a binder. The compounds described in terms of hard coat layer as described above can be used as the radical polymerization compounds.

It is preferable to use a photo-polymerization initiator to accelerate hardening the radical polymerization compounds, and preferably to contain the photo-polymerization initiator and the radical polymerization compound in mass ratio of 20:100 to 0.01:100.

Further, the fluorine-substituted alkyl group-containing silane compound expressed by following Formula (OSi-2) may be contained.

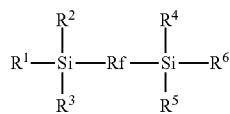

The following describes the fluorine-substituted alkyl group-containing silane compound expressed by aforementioned Formula (OSi-2).

In Formula, $R^1$ to $R^6$ denotes the alkyl group having 1 to 16 carbon atoms, preferably 1 to 4; the halogenated alkyl group having 1 to 6 carbon atoms, preferably 1 to 4; the aryl group having 6 to 12 carbon atoms, preferably 6 to 10; the alkylaryl group and aryl alkyl group having 7 to 14 carbon atoms, preferably 7 to 12; the alkenyl group having 2 to 8 carbon atoms, preferably 2 to 6; or alkoxy group, having 1 to 6 carbon atoms, preferably 1 to 3, hydrogen atom or halogen atom.

Rf represents —$(C_aH_bF_c)$—, wherein "a" is an integer of 1 to 12, "b+c" is 2a, "b" is an integer of 0 to 24, and "c" is an integer of 0 to 24. A group containing the fluoro alkylene group and alkylene group is preferably used as Rf. Examples of the fluorine-containing silicone compound concretely include methoxy disilane compound such as $(MeO)_3SiC_2H_4C_2F_4C_2H_4Si(MeO)_3$, $(MeO)_3SiC_2H_4C_4F_8C_2H_4Si(MeO)_3$, $(MeO)_3SiC_2H_4C_6F_{12}C_2H_4Si(MeO)_3$, $(H_5C_2O)_3SiC_2H_4C_4F_8C_2H_4Si(OC_2H_5)_3$, $(H_5C_2O)_3SiC_2H_4C_6F_{12}C_2H_4Si(OC_2H_5)_3$.

When the binder contains a fluorine-substituted alkyl group-containing silane compound, intrusion of water contents or acidic or alkaline chemicals into the transparent film is placed under control, even when the transparent film is porous without sufficiently made compact and contains cracks or voids since the transparent film per se to be formed is hydrophobic. Further, the metals and other microparticles on the substrate surface or contained in the conductive layer as a lower layer do not react with water contents or acidic or alkaline chemicals. This arrangement provides a transparent film characterized by an excellent resistance to chemicals.

When the fluorine-substituted alkyl group-containing silane compound is contained as a binder, the aforementioned hydrophobicity as well as excellent sliding property (low contact resistance) are ensured. Thus, a transparent film characterized by superb scratch strength is provided. Further, if the binder contains the fluorine-substituted alkyl group-containing silane compound having such a constituent unit, the shrinkage rate of the binder is equal to or close to that of the conductive layer when a conductive layer is formed on the lower layer. This makes it possible to form a transparent film characterized by very close adhesion with the conductive layer. Further, this arrangement prevents the conductive layer being separated due to the difference in the shrinkage rate, and a portion without electrical contact from occurring to the transparent conductive layer, when the transparent film is subjected to heat treatment. Therefore, this arrangement ensures a sufficient conductivity as the entire film.

The transparent film containing the fluorine-substituted alkyl group-containing silane compound, and the hollow silica based particles having the aforementioned outer shell layer with porous or void interior is characterized by excellent strength; it has a high degree of scratch strength, film strength that is evaluated in terms of eraser strength or nail strength and high pencil hardness.

The low refractive index layer may contain a silane coupling agent. Examples of the silane coupling agent include methyltrimethoxysilane, methyltriethoxysilane, methyltrimethoxyethoxy silane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxy ethoxysilane, phenyltrimethoxysilane, phenyltriethoxysilane, phenyltriacetoxy silane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxy propyltrimethoxysilane, γ-methacryloyloxypropyltrmethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane and β-cyanoethyltriethoxysilane.

Further, examples of silane coupling agents having an alkyl group of 2-substitution for silicon include, dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiemethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane and methylvinyldiethoxysilane.

Of these, preferred are those having a double bond in a molecule such as vinyltrimethoxysilane, vinyltriethoxysilane, vinyltriacetoxysilane, vinyltrimethoxyethoxysilane, γ-acryloyloxypropyltrimethoxysilane and γ-methacryloyloxypropyltrimethoxysilane; those having an alkyl group of 2-substitution for silicon such as γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, methylvinyldimethoxysilane and methylvinyldiethoxysilane; and particularly preferable are γ-acryloyloxypropyltrimethoxysilane and γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane and γ-methacryloyloxypropylmethyldiethoxysilane.

Two or more types of coupling agents may simultaneously be employed. In addition to the above silane coupling agents, other silane coupling agents may be employed. Listed as other silane coupling agents are alkyl ester of orthosilicic acid (for example, methylorthosilicate, ethylorthosilicate, n-propylorthosilicate, i-propylorthosilicate, n-butylorthosilicate, sec-butylorthosilicate and t-butylorthosilicate) and their hydrolysis products.

Further, a silicon compound represented by $CF_3(CF_2)_n CH_2CH_2Si(OR^1)_3$ may be incorporated in the low refractive index layer. (In the formula, $R^1$ is an alkyl group having 1 to 5 carbon atoms, and n is an integer of 0 to 12.) The practical compounds include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane and heptadecafluorodecyltriethoxysilane, these may be used singly or two or more in combination. Further it is possible to contain a silicon compound having ureido group ($H_2NCONH$—) at the end, represented by $H_2NCONH(CH)mSi(OR^2)_3$. (In the formula, $R^2$ is an alkyl group having 1 to 5 carbon atoms, m is an integer of 1 to 5.) Practical compounds include γ-ureido propyltrimethoxysilane, γ-ureido propyltriethoxysilane, γ-ureido propyltripropoxysilane and the like. Of these particularly preferable is γ-ureido propyltrimethoxysilane, γ-ureido propyltriethoxysilane.

Further a binder can be use polyvinylalcohol, polyoxyethylene, polymethyl methacrylate, polymethylacrylate, fluoroacrylate, triacetylcellulose, triacetylcellulose, nitrocellulose, polyester, alkyd resin and the like for the low refractive index layer.

The other compounds for the binder include polyvinylalcohol, polyoxyethylene, polymethyl methacrylate, polymethylacrylate, fluoroacrylate, triacetylcellulose, triacetylcellulose, nitrocellulose, polyester and alkyd resin.

It is preferable that the low refractive index layer contains a binder of 5 to 80% by mass as a whole. The binder has a function to maintain a structure of low refractive index layer containing voids. An amount of binder to be used is adjusted adequately so as to maintain the strength of the low refractive index layer without filling voids.

(Solvent)

It is preferable that a coating composition forming the layer of low refractive index contains an organic solvent. Practical examples of the organic solvent include alcohols (such as methanol, ethanol, isopropanol, butanol, benzyl alcohol), ketone (such as acetone, methylethyl ketone, methylisobutyl ketone, cyclohexanone), esters (such as methyl acetate, ethyl acetate, propyl acetate, butyl acetate, methyl formate, ethyl formate, propyl formate, butyl formate), halogenated hydrocarbon (such as methylene chloride, chloroform, carbon tetrachloride), aromatic hydrocarbon (such as benzene, toluene, xylene), amides (such as dimethylformamide, dimethylacetoamide, n-methylpyrrolidone), ether (such as diethylether, dioxane, tetrahydrofuran), ether alcohols (such as 1-methoxy-2-propanol), propyleneglycol monomethyl ether and propyleneglycol monomethyl ether acetate. Among them, toluene, xylene, methyl ethyl ketone, methyl isobutyl ketone, cyclohexanone, and butanol are particularly preferable.

The solid substance concentration in the low refractive index layer coating composition is preferably 1 to 4% by mass. When the solid substance concentration is less than 4% by mass, it becomes difficult to generate coating unevenness, and load for drying is reduced in case of more than 1% by mass.

The low refractive index layer can be formed by coating the above described coating composition to form the low refractive index layer by means of known methods such as gravure coater, dip coater, reverse coater, wire bar coater, die coater, an inkjet method, after coating it is dried by heat, and, is subjected to hardening treatment according to necessity A coating amount is suitably 0.05 to 100 μm in terms of wet thickness, and 0.1 to 50 μm is preferable. Further, solid substance concentration of the coating composition is controlled so that dry thickness has the above described layer thickness.

Further, it is possible to include a process of heat treatment conducting at a temperature of 50 to 160° C. after forming the low refractive index layer. Period of heat treatment is optionally decided according to setting temperature, and, for example, 3 days or more to not more than 30 days is preferable at 50° C., and the range of 1 minute or more to less than 1 day is preferable at 100° C. Methods for hardening include a method by heating, a method by irradiating light such as UV ray, and the like. Temperature of heating is preferably at 50 to 300° C., more preferably at 60 to 250° C., and further preferably at 80 to 150° C., in case of hardening by heat. Exposure amount of irradiation light is preferably 10 mJ/cm² to 10 J/cm², and more preferably 100 mJ/cm² to 500 mJ/cm² in case of hardening by light irradiation.

Here wavelength range of irradiation light is not particularly limited, and light having wavelength in the UV ray region is preferably employed. For example, such as a low pressure mercury lamp, a medium pressure mercury lamp, a high pressure mercury lamp, an ultrahigh pressure mercury lamp, a carbon arc lamp, a metal halide lamp and a xenon lamp can be utilized. The irradiation condition may differ depending on each lamp; however, irradiation quantity of actinic rays may be usually 5 to 500 mJ/cm$^2$, preferably 5 to 150 mJ/cm$^2$, and particularly preferably 20 to 100 mJ/cm$^2$.

High Refractive Index Layer

The anti-reflection layer may have a high refractive index layer described below in addition to the above described low refractive index layer.

It is preferable that metal oxide microparticles are incorporated in the high refractive index layer. The type of metal oxide microparticles is not specifically limited and metal oxide having at least one element selected from Ti, Zr, Sn, Sb, Cu, Fe, Mn, Pb, Cd, As, Cr, Hg, Zn, Al, Mg, Si, P and S can be utilized and these metal oxide microparticles may be doped with a tiny amount of an atom such as Al, In, Sn, Sb, Nb, a halogen element and Ta. In this invention, at least one type of metal oxide microparticles selected from zirconium oxide, antimony oxide, tin oxide, zinc oxide, indium-tin oxide (ITO), antimony doped tin oxide (ATO) and zinc antimonate is preferably utilized as a primary component and indium-tin oxide (ITO) and zinc antimonate are specifically preferable.

A mean particle size of primary particles of these metal oxide microparticles is preferably in a range of 10 to 200 nm and more preferably 10 to 150 nm. A mean particle size of primary particles of metal oxide microparticles can be measured from an electron microscopic photography by means of such as a scanning electron microscope. Aggregation is easily caused at the particle size of less than 10 nm to deteriorate dispersibility. It is not preferable because of remarkable increase of haze when the particle size exceeds 200 nm. The form of metal oxide microparticles is preferably a rice grain shape, a spherical shape, a cubic shape, a spindle shape, a needle shape or an irregular shape.

A refractive index of a high refractive index layer is specifically not lower than a refractive index of transparent resin film as a support and is preferably in a range of 1.50 to 1.70 based on a measurement at 23° C. and a wavelength of 550 nm. A refractive index of metal oxide microparticles is preferably 1.80 to 2.60 and more preferably 1.85 to 2.50 because a means to adjust a refractive index of a high refractive index layer is controlled by a type and an addition amount of metal oxide microparticles.

Metal oxide microparticles may be subjected to a surface treatment by an organic compound. By surface modification of the surface of metal oxide microparticles with an organic compound, dispersion stability in an organic solvent is improved and control of a dispersed particle size becomes easy as well as aggregation by aging can be restrained. Therefore, a preferable surface modifying amount with an organic compound is 0.1 to 5% by mass against metal oxide microparticles and more preferably 0.5 to 3% by mass. Examples of an organic compound utilized for the surface treatment include polyol, alkanol amine, stearic acid, a silane coupling agent and a titanate coupling agent. Among them, silane coupling agent described later is preferable. Surface treatments of at least two types may be combined.

Thickness of a high refractive index layer containing the aforesaid metal oxide microparticles is preferably 5 nm to 1 μm, more preferably 10 nm to 0.2 μm and most preferably 30 nm to 0.1 μm.

A ratio of metal oxide microparticles utilized to a binder such as ionization radiation curable resin, which will be described later, differs depending on a type and a particle size of metal oxide microparticles, however, is preferably around 2/1 to 1/2 based on a volume ratio.

A using amount of metal oxide microparticles utilized in this invention is preferably 5 to 85% by mass, more preferably 10 to 80% by mass and most preferably 20 to 75% by mass, in a high refractive index layer. The effects of this invention can not be achieved when the using amount is less, while such as deterioration of film strength may be caused when it is excessive.

The above-described metal oxide microparticles are supplied, as a state of dispersion comprising the particles having been dispersed in a medium, to a coating solution for formation of a high refractive index layer. As a dispersion medium for metal oxide particles, a liquid having a boiling point of 60 to 170° C. is preferably utilized. Specific examples of a dispersion medium include water, alcohol (for example, methanol, ethanol, isopropanol, butanol and benzyl alcohol), ketone (for example, acetone, methyl ethyl ketone, methyl isobutyl ketone and cyclohexanone), ketone alcohol (for example, diacetone alcohol), ester (for example, methyl acetate, ethyl acetate, propyl acetate, butyl acetate, methyl formate, ethyl formate, propyl formate and butyl formate), aliphatic hydrocarbon (for example, hexane and cyclohexane), hydrocarbon halogenide (for example, methylene chloride, chloroform and tetrachloro carbon), aromatic hydrocarbon (for example, benzene, toluene and xylene), amide (for example, dimethyl formamide, dimethyl acetamide and n-methylpyrrolidone), ether (for example, diethyl ether, dioxane and tetrahydrofuran) and ether alcohol (for example, 1-methoxy-2-propanol). Among them, toluene, xylene, methyl ethyl ketone, methyl isobutyl ketone, cyclohexanone and butanol are specifically preferable.

Further, metal oxide microparticles can be dispersed in a medium by use of a homogenizer. Examples of a homogenizer include a sand grinder mill (such as a pin attached beads mill), a high speed impeller mill, a pebble mill, a roller mill, an attritor mill and a colloidal mill. A sand grinder mill and a high speed impeller mill are specifically preferable. Further, a preliminary dispersion process may be provided. Examples of a homogenizer employed for a preliminary dispersion process include a ball mill, a three-roll mill, a kneader and an extruder.

Metal microparticles having a core/shell structure may be further incorporated. One layer of a shell may be formed around a core or plural shell layers may be formed to improve light fastness. A core is preferably covered completely by a shell.

As a core, such as titanium oxide (such as a rutile type, an anatase type and an amorphous type), zirconium oxide, zinc oxide, selenium oxide, indium oxide doped with tin and tin oxide doped with antimony can be utilized, and titanium oxide of a rutile type may be utilized as a primary component.

The shell preferably contains an inorganic compound other than titanium oxide as a primary component and is preferably comprised of oxide or sulfide of metal. For example, utilized is an inorganic compound containing such as silicon dioxide (silica), aluminum oxide (alumina), zirconium oxide, zinc oxide, tin oxide, antimony oxide, indium oxide, iron oxide and zinc sulfide as a primary component. Among them, alumina, silica and zirconia (zirconium oxide) are preferable. Further, a mixture thereof may be also utilized.

A covering amount of a shell against a core is 2 to 50% by mass, preferably 3 to 40% by mass and more preferably 4 to 25% by mass, based on a mean covering amount A refractive index of microparticles is decreased when a covering amount of a shell is excessive, while light fastness is deteriorated when it is excessively less. At least two types of inorganic microparticles may be utilized in combination.

As titanium oxide to make a core, those prepared by a liquid phase method or a gas phase method can be utilized. Further, as a method to form a shell around a core, such as a method described in U.S. Pat. No. 3,410,708; Examined Japanese Patent Application Publication No. 58-47061; U.S. Pat. Nos. 2,885,366 and 3,437,502; British Patent No. 1,134, 249; U.S. Pat. No. 3,383,231; British Patent Nos. 2,629,953 and 1,365,999 can be utilized.

In a high refractive index layer or a low refractive index layer described above, a compound, which is represented by following formula (CL1), or a chelate compound thereof is incorporated to improve physical property such as hardness.

$$A_n MB_{x-n} \quad \text{Formula (CL1)}$$

In the formula, M is a metal atom; A is a functional group capable of hydrolysis or a hydrocarbon group having a functional group capable of hydrolysis; and B is an atomic group which is covalent bonded or ionic bonded to metal atom M. x is an atomic valence of a metal atom and n is an integer of not less than 2 and not more than x.

Functional group A capable of hydrolysis includes such as an alkoxy group, a halogen atom such as a chlorine atom, an ester group and an amide group. A metal compound belonging to above formula (2) includes alkoxide, having not less than two alkoxy groups which directly bonds to a metal atom, and a chelate compound thereof. Preferable metal compounds include titanium alkoxide, zirconium alkoxide and chelate compounds thereof. Titanium alkoxide has a rapid reaction rate and a high refractive index as well as easy handling characteristics, however, deteriorates light fastness due to a photo-catalytic function when a great amount thereof is added. Zirconium alkoxide exhibits a high refractive index; however, it is necessary to pay attention with respect to such as dew point control at the time of coating due to the tendency of milky-whitening. Further, since titanium alkoxide has an effect to accelerate a reaction of ultraviolet ray curable resin and metal alkoxide, it can improve physical properties of coated film even with a small quantity of addition.

Titanium alkoxide includes such as tetramethoxy titanium, tetraethoxy titanium, tetra-iso-propoxy titanium, tetra-n-propoxy titanium, tetra-n-butoxy titanium, tetra-sec-butoxy titanium and tetra-tert-butoxy titanium.

Zirconium alkoxide includes such as tetramethoxy zirconium, tetraethoxy zirconium, tetra-iso-propoxy zirconium, tetra-n-propoxy zirconium, tetra-n-butoxy zirconium, tetra-see-butoxy zirconium and tetra-tert-butoxy zirconium.

A preferable chelating agent, which forms a chelate compound by coordination to a free metal compound, includes alkanolamines such as diethanolamine and triethanolamine; glycols such as ethylene glycol, diethylene glycol and propylene glycol; acetyl acetone and ethyl acetoacetate, which have a molecular weight of not more than 10,000. By employing these chelating agents, prepared can be a chelate compound which is stable even against mixing of water as well as excellent in a reinforcing effect of coated film.

An addition amount of a metal compound is preferably adjusted so as to make the content of a metal oxide derived from the metal compound in a high refractive index layer of 0.3 to 5% by mass. Anti-abrasion resistance is insufficient when the content is less than 0.3% by mass, while light fastness is tends to be deteriorated when the content exceeds 5% by mass.

It is preferable that a radical polymerization compound is incorporated in high refractive index layer as a binder of metal oxide microparticles to improve film forming property and physical property of the coated layer. As radical polymerization compounds utilized can be monomer or oligomer having not less than two functional groups which cause a polymerization reaction directly by irradiation of ionization radiation such as ultraviolet rays and electron rays or indirectly by receiving an action of a photo-polymerization initiator. Preferable examples includes polyolacrylate, epoxyacrylate, urethaneacrylate, polyesteracrylate or their mixture concretely, and further polyfunctional acrylate compound set forth with reference to the hard coat layer.

An addition amount of ionization radiation curable resin is preferably not less than 15 weigh % and less than 50% by mass in a solid content of a high refractive index composition.

To accelerate curing of ionization radiation curable resin according to this invention, a photo-polymerization initiator and an acryl type compound having at least two unsaturated bonds capable of polymerization in a molecule are preferably contained at a weight ratio of 3/7 to 1/9.

As for the photo-polymerization initiator, the compounds previously set forth with reference to the hard coat layer.

An organic solvent utilized at the time of coating a high refractive index layer of this invention includes alcohols (such as methanol, ethanol, propane, isopropanol, butanol, isobutanol, secondary butanol, tertiary butanol, pentanol, hexanol, cyclohexanol and benzyl alcohol), polyhydric alcohols (such as ethylene glycol, diethylene glycol, triethylene glycol, polyethylene glycol, propylene glycol, dipropylene glycol, butylenes glycol, hexanediol, pentanediol, glycerin, hexanetriol and thioglycol); polyhydric alcohol ethers (such as ethylene glycol monomethyl ether, ethylene glycol monoethyl ether, ethylene glycol monobutyl ether, diethylene glycol monomethyl ether, diethylene glycol monoethyl ether, ethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether and propylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentametyldiethylenetriamine and tetramethylpropylenediamine), amides (such as formamide, N,N-dimethylformamide and N,N-dimethylacetoamide), heterocycles (such as 2-pyrrolidone, N-methyl-2-pyrroridone, cyclohexyl pyrrolidone, 2-oxazolidone, 1,3-dimethyl-2-imidazolidinone), sulfoxides (such as dimethylsulfoxide), sulfones (such as sulfolane), urea, acetonitrile and acetone, and, specifically preferable are alcohols, polyhydric alcohols and polyhydric alcohol ethers.

The high refractive index layer can be formed by coating the above described composition employing a gravure coater, dip water, reverse water, wire bar water, die water, or spray or inkjet coating on a surface of a transparent resin film or a hard coat layer with a wet thickness of 0.1 to 100 µm, drying by healing after the coating, and hardening if necessary. The hardening process can utilize those set forth with reference to the low refractive index layer. Dry thickness is adjusted by solid substance concentration of the coating composition so as to have above described thickness.

Electroconductive Layer

The electroconductive layer can be provided on a film substrate, and can be coated, for example, between the hard coat layer and the anti-reflection layer, or on the film substrate opposite side provided with the anti-reflection layer.

The electroconductive layer gives a function to prevent charging hard coat film during handling the supporting body (such as a resin film), and concretely, π conjugated electroconductive polymer, ionic polymer compound, metal oxide and the like, described afore in terms of the hard coat layer are used preferably.

It is preferable that surface specific resistivity of the electroconductive layer is adjusted $10^{11}\Omega/\square(25°$ C., 55% RH) or lower, more preferably $10^{10}\Omega/\square(25°$ C., 55% RH) or lower, and particularly preferably $10^{9}\Omega/\square(25°$ C., 55%/RH) or lower.

Measurement of the surface specific resistivity value, which is described in Examples more in detail, is measured employing TERAOHM Model VE-30, produced by Kawaguchi Electric Works, for after adjusting a sample at a condition of 25° C., 55% RH for 24 hours.

An overcoat layer is provided on the electroconductive layer as an outermost layer. The surface specific resistivity value is defined substantially as a surface specific resistivity value of the electroconductive layer, which is measured on the outermost layer at a side having an electroconductive layer.

The ionic polymers include anionic polymers as described in JP-B Nos. 49-23828, 49-23827, and 47-28937; ionene-type polymers having a dissociable group in a main chain as described, for example, in JP-B No. 55-734, JP-A No. 50-54672, JP-B Nos. 59-14735, 57-18175, 57-18176, and 57-56059; and cationic pendant-type polymers having a cationic dissociable group in a side chain as described in JP-B Nos. 53-13223, 57-15376, 53-45231, 55-145783, 55-65950, 55-67746, 57-11342, 57-19735, and 58-56858, as well as JP-A Nos. 61-27853 and 62-9346. The quaternary ammonium cationic polymer having a molecule crosslinking is particularly preferable among these, and quaternary ammonium cationic polymer containing no chloride ion and having a molecule crosslinking is employed particularly preferably in view of ecological safety to prevent generation of dioxin.

The ionic polymer compound can be used singly or in combination with several species of ionic polymer compound. Content of the ionic polymer compound used in the resin film of the invention is preferably 0.02 g to 1.0 g/m², and particularly preferably 0.02 g to 0.5 g/m².

Further, microparticles may be incorporated in the electroconductive layer. For example, microparticles include those composed of the silica, colloidal silica, alumina, alumina sol, kaolin, talc, mica, calcium carbonate and the like.

An average particle diameter of the above described microparticles is preferably 0.01 µm to 10 µm and more preferably 0.01 µm to 5 µm. An added amount is preferably 0.05 parts to 10 parts in mass ratio with reference to the solid content in the coating composition, and particularly preferably 0.1 parts to 5 parts.

Further, cellulose ester resin or acrylic resins used in the film substrate may be incorporated so that an electroconductive layer exhibits sufficient anti-static effect, and maintains the easy adhesion property to overcoat layer.

It is preferable that the amount of the resin used here is not less than 60% by mass, more preferably not less than 80% by mass with respect to the total amount used in the electroconductive layer, and an actinic ray curable resin or an actinic ray thermally curable resin can be added if necessary. These resins are provided as a binder by coating in state dissolved in the solvent described below.

The following solvents are preferably used in the coating composition to coat the electroconductive layer. The solvents can be used optionally mixing hydrocarbon, alcohols, ketones, esters, glycol ethers, and other solvent (methylene chloride), but it is not particularly restricted to these.

The hydrocarbons described above includes benzene, toluene, xylene, hexane, cyclohexane and the like; alcohols include methanol, ethanol, n-propylalcohol, iso-propylalcohol, n-butanol, 2-butanol, tert-butanol, pentanol, 2-methyl-2-butanol, cyclohexanol and the like, ketones include acetone, methylethylketone, methylisobutyl ketone, cyclohexanone and the like, esters include methyl formate, ethyl formate, methyl acetate, ethyl acetate, propyl acetate, amyl acetate, ethyl lactate, methyl lactate and the like, glycol ethers (C1 to C4) include methylcellosolve, ethylcellosolve, propyleneglycol monomethylether (PGME), propyleneglycol monoethylether, propyleneglycol mono-n-propylether, propyleneglycol mono-iso-propylether, and propyleneglycol monobutylether, or propyleneglycol mono (C1 to C4)alkyletheresters include propyleneglycol monoethylether acetate and propyleneglycol monoethylether acetate, and the other solvents include methylene chloride, N-methylpyrrolidone. It is not limited particularly to these and solvents optionally mixing these are used also preferably. The electroconductive layer coating composition is coated by employing a gravure coater, a dip coater, a wire bar coater, a reverse coater, an extrusion coater so as to have coating composition thickness (wet thickness) of 1 to 100 µm preferably, in particular, 5 to 30 µm is preferable.

Back Coat Layer

The hard coat film or the anti-reflection film of the present invention having a hard coat layer on one surface of the cellulose ester film is preferably provided with a back coat layer on the other surface of the cellulose ester film. A back coat film is provided on a cellulose ester film to prevent curling which may occur when a hard coat layer or other layers are formed on a cellulose ester film by means of a coating method or by CVD. Namely, by adding a counter force to curl toward the back coat side, the force to curl toward the hard coat layer side may be balanced out. Also, a back coat layer preferably has a feature to prevent blocking. For this purpose, microparticles are preferably added to a coating composition of back coat layer.

A back coat layer according to the invention (a resin layer) comprises cellulose ester resin (C), and it is preferable that a weight average molecular weight of the cellulose ester is in the range of 10,000 to 200,000.

A preferable embodiment is that total substitution degree of the acyl group in cellulose ester resin (C) contained in the a back coat layer (the resin layer) is 2.0 to 3.0, and a substitution degree of an acyl group having 3 to 7 carbon atoms is 0 to 2.2. Further, an embodiment is preferable wherein the a back coat layer (a resin layer), comprises cellulose ester resin (C) and acrylic resins (D), a weight average molecular weight of the acrylic resins (D) is 30,000 to 1,000,000, and content ratio the cellulose ester resin (C) to acrylic resins (D) is 95:5 to 50:50 by mass.

An embodiment is preferable in the invention that, the back coat layer (a resin layer) comprises 0.1 to 50% by mass of acrylic particles with reference to total mass of a resin composing the a back coat layer (a resin layer). It is preferable that an average particle diameter the acrylic particles is 0.1 to 1 µm in this instance.

Cellulose ester resin (C) used in the back coat layer (a resin layer) according to the invention, which is required to satisfy the condition above described, is a carboxylic acid ester having around 2 to 22 carbon atoms, and may be an ester of aromatic carboxylic acid, in particular, a lower aliphatic acid ester of a cellulose is preferable. The lower aliphatic acid cellulose in the lower aliphatic acid ester means an aliphatic acid having carbon atoms 6 or less. An acyl group bonding to hydroxy may be straight or branched, and further may form a cycle. Further, it can be substituted with another substituent. In case of same substitution degree, it is preferable that the acyl groups is selected from those having 2 to 6 carbon atoms when the above described number of the carbon atoms is larger birefringent property is deteriorated. Further, the acyl group has preferably 2 to 4 carbon atoms, in particular 2 or 3 carbon atoms is preferable, and a propionyl group or a butylyl group is preferable.

The substitution degree of the acetyl group and other acyl groups refers to the value determined by the method specified in ASTM-D817-96.

Examples of cellulose ester include mixture aliphatic acid esters such as cellulose acetate propionate, cellulose acetate butylate, cellulose acetate phthalate disclosed in JP-A 10-45804, JP-A 8-231761, and U.S. Pat. No. 2,319,052. Among these described above, mixing lower aliphatic acid esters particularly preferably used are cellulose acetate propionate, cellulose acetate butylate. These cellulose ester may be used singly or in plural in combination. The above described cellulose ester can be synthesized by a known method.

As cellulose ester, cellulose ester synthesized from such as cotton linter, wood pulp and kenaf as a starting material can be utilized alone or by being mixed. Specifically, cellulose ester synthesized from cotton linter (hereinafter, simply referred to as linter) and wood pulp is preferably utilized alone or by being mixed.

The weight average molecular weight can be measured employing high speed liquid chromatography. Measurement conditions are as follows:

Solvent: methylene chloride
Columns: SHODEX K806, K805, and K803G (produced by Showa Denko K.K., employed by connecting above three columns)
Column temperature: 25° C.
Sample concentration: 0.1% by mass
Detector: RI Model 504 (produced by GL Science Co.)
Pump: L6000 (produced by Hitachi, Ltd.)
Flow rate: 1.0 ml/min
Calibration curve: a calibration curve based on 13 samples of standard POLYSTYRENE STK standard POLYSTYRENE (produced by TOHSOH Corp.) at an Mw of 500 to 1,000,000 is employed. Thirteen samples, at almost equal intervals, are employed.

Further, it is preferable to use two or more species of cellulose esters in combination.

It is preferable that the cellulose ester is incorporated by dissolving with an organic solvent described later.

It is preferable that acrylic resins used in the back coat layer according to the invention has a weight average molecular weight (Mw) of 30,000 to 1,000,000.

(Binder)

It is preferable that a binder is incorporated in the back coat layer (a resin layer) according to the invention. Example of the binders to be used includes, for example, vinyl based polymers or copolymers such as vinyl chloride/vinyl acetate copolymer, vinyl chloride resin, vinyl acetate resin, copolymer of vinyl acetate and vinyl alcohol, partially hydrolyzed vinyl chloride/vinyl acetate copolymer, vinyl chloride/vinylidene chloride copolymer, vinyl chloride/acrylonitrile copolymer, ethylene/vinyl alcohol copolymer, chlorinated polyvinyl chloride, ethylene/vinyl chloride copolymer, and ethylene/vinyl acetate copolymer, copolymer of maleic acid and/or acrylic acid, acrylic acid ester copolymer, acrylonitrile/styrene copolymer, chlorinated polyethylene, acrylonitrile/chlorinated polyethylene/styrene copolymer, methylmethacrylate/butadiene/styrene copolymer, acrylic resins, polyvinylacetal resin, polyvinyl butyral resin, polyester polyurethane resin, polyether poly urethane resin, polycarbonate polyurethane resin, polyester resin, poly ether resin, poly amide resin, amino resin, rubber type resins such as styrene/butadiene resin, butadiene/acrylonitrile resin and the like, silicon type resin, fluorine resin and the like.

Preferably usable acrylic resins include variety of homopolymer as well as copolymer produced from acryl and methacryl based monomer, such as ACRYPET MD, VH, MF, V (produced by Mitsubishi Rayon Co., Ltd.), HI-PEARL M-4003, M-4005, M-4006, M-4202, M-5000, M-5001, M-4501 (produced by Negami Chemical industrial Co., Ltd.), DIANAL BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117, BR-118 and the like produced by (Mitsubishi Rayon Co., Ltd.) obtained from the market.

(Particles)

The back coat layer according to the invention (a resin layer) may contain acrylic resin particles above described and/or metal oxide microparticles described below. The particles are usually added for providing blocking preventing function, and it is preferable to incorporate particles having an average particle diameter of 0.1 to 1.0 μm in an amount of 5 to 50% by mass to enhance effects of preventing interference unevenness and blocking in case that it is composed of cellulose ester contained in the back coat layer (a resin layer). An average particle diameter of the particles can be obtained by means of a particle size measure apparatus on the market employing a light scattering method or a laser Doppler method, for example, ZETASIZER 1000 (produced by Malvern Ltd.), laser diffraction scattered light method particle size distribution measure apparatus L32, produced by Beckman Coulter Inc.), and the like, conveniently.

Further, microparticles may contain metal oxide microparticles selected from Si, Zr, Sn, Sb, As, Zn, Nb, In and Al.

Particles added to the a back coat layer (a resin layer) include an inorganic compound, such as silicon dioxide, titanium dioxide, aluminum dioxide, zirconium oxide, calcium carbonate, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Particles containing silicon are preferable to reduce haze, and silicon dioxide is preferable particularly.

These particles are available from the market in a trade name of, for example, AEROSIL R972, R972V, 8974, R812, 200, 200V, 300, R202, OX50 and TT600, (all, produced by Nippon Aerosil Co., Ltd.), KE-P10, KE-P30, KE-P50, and KE-P100 (all, produced by Nippon Shokubai Co., Ltd.). Particles of zirconium oxide are available from the market in a trade name of, for example, AEROSIL R976 and R811 (produced by Nippon Aerosil Co., Ltd.). Particles of polymer include, for example, silicone resin, fluorine resin and acrylic resins. Silicone resin is preferable, and those having three dimensional network structure are particularly preferable, which is available from the market in a trade name of for example, TOSPEARL 103, 105, 108, 120, 145, 3120 and 240 (produced by Toshiba Silicone Company, Limited).

Among these AEROSIL 200V, AEROSIL R972V, KE-P30 and KE-P50 are particularly preferably used since they have high blocking preventing effect while keeping haze low.

It is preferable that an increase of haze due to providing the back coat layer (a resin layer) is not more than 1%, more preferably not more than 0.5%, and 0.0 to 0.1% is particularly preferable.

(Plasticizer)

It is preferable to use a plasticizer as a coating composition of the back coat layer (a resin layer) in the invention. The plasticizers described in term of transparent film above described can be used.

(Organic Solvent)

It is preferable to use an organic solvent as a coating composition of the back coat layer (a resin layer) in the invention. The organic solvent has a function of giving anti-curling function in addition to function as a solvent. The anti-curling property is practically provided by coating on a substrate a coating composition containing a solvent which swells or dissolves the substrate. The solvent used may be one in which a solvent which does not dissolve nor swell a substrate is added to a mixture of solvents which swell or dissolve the substrate. The anti-curling property is provided by coating on a substrate a coating composition containing these solvents in an appropriate amount at an appropriate coating amount, considering the curling degree of the substrate or kinds of a resin used in the substrate.

In order to increase an anti-curling property, it is effective to use a mixture solvent containing a larger amount of a solvent which swells or dissolves the substrate and a smaller amount of a solvent which does not dissolve nor swell a substrate. The mixture ratio of a solvent which swells or dissolves the substrate to a solvent which does not dissolve nor swell a substrate is preferably 10:0 to 1:9.

The organic solvents which swell or dissolve in the solvent mixture above include dioxane, acetone, methylethylketone, N,N-dimethylformamide, methyl acetate, ethyl acetate trichloroethylene, methylene chloride, ethylene chloride, tetrachloro ethane, trichloro ethane and chloroform. The solvents which do not dissolve nor swell a substrate include methanol, ethanol, n-propylalcohol, i-propylalcohol, n-butanol, cyclohexanol, and hydrocarbons (such as toluene and xylene).

It is preferable to coat the coating composition by means of a gravure water, a dip coater, a reverse coater, a wire bar coater, a die coater, or spray coating or inkjet coating on the surface of the transparent film so as to have wet thickness of 1 to 100 μm, particularly 5 to 30 μm. Further, the back coat layer may be composed of two or more layers.

Order of coating a back coat layer may be before or after of coating the hard coat layer of the transparent film, and it is preferable to coat the back coat layer earlier when it also works as an anti-blocking layer. Further, the back coat layer can be formed by coating twice or more.

(Functional Thin Layer)

The optical film according to the invention is suitable for forming a variety of functional layers by coating or plasma CVD method, particularly atmospheric pressure plasma treatment method and the like, these are effective to provide various functions to the optical film according to the invention. An anti-reflection layer (low refractive index layer, high refractive index layer, middle refractive index layer), a transparent electroconductive layer, an anti-static layer, an anti-stain layer and the like are further formed directly or indirectly on the hard coat layer by these methods.

(Reflectance of Anti-Reflection Film)

Reflectance of the above mentioned anti-reflection film can be measured via spectrophotometer. After roughening the side opposite to measuring surface of the sample, light absorbing process is conducted by black paint spray, reflected light of visible light region (400 to 700 nm) is measured, in this instance.

The reflectance is lower, the more preferable film is. Average value visible light region in the visible light wave length is preferably not more than 2.0%, and minimum reflectance is preferably not more than 0.8%.

Further, it is preferable to have a flat reflection spectrum in wave length region of visible light. Further, the reflected color of a surface of a display device having subjected to anti-reflection treatment is liable to have red or blue color because reflectance in short wave length region or long wave length region within visible light region due to arrangement of anti-reflection layer is higher. Hue of reflected light varies depending on the use, and neutral color is favorably acceptable used in the uppermost layer of thin television etc. In this instance, favorably acceptable reflected color area is, in general, on the XYZ colorimetric system (CIE 1931 colorimetric system)

$$0.17 \leq x \leq 0.27, \text{ and}$$

$$0.07 \leq y \leq 0.17.$$

Further, it is preferable that a distance Δxy on the xy plain at (x, y)=(0.31, 0.31) is in the range of not more than 0.05 which is closer to neutral without hue, and more preferably not more than 0.03. Color can be calculated by thickness from refractive index of respective layers, taking reflectance and hue of reflected light into consideration according to usual method.

Further, haze of the hard coat film and the anti-reflection film is preferably not more than 1%, more preferably more than 0.5%, since haze more than 2% affects to display image on a liquid crystal display device. Yellow Index, YI can be used as an index of coloration, which is preferably not more than 3.0, more preferably not more than 1.0. Further, t is preferable that hard coat film or the anti-reflection film have transmittance of not less than 85%.

(Surface Treatment and Coating)

Surface treatment may be conducted before applying the above mentioned each layer. The surface treatment method includes a washing method, an alkali treatment method, a flame plasma treatment method, a high-frequency discharge plasma method, an electron beam method, an ion beam method, a spattering method, an acid treatment method, a corona treatment method and an atmospheric glow discharge plasma method.

Corona treatment can be conducted by employing a corona treatment apparatus having multi-knife electrodes from SOFTAL Corona & Plasma GmbH, Kasuga Electric Works, Ltd and Toyo Electric Co., Ltd. Intensity of corona discharge treatment depends on distance between the electrodes, power per unit area and frequency of generator.

As for one electrodes (electrode A), those obtained from market can be used, and the material thereof is selected from aluminum, stainless steel etc. The other electrode (electrode B) is an electrode holding the plastic film and is a roll electrode provided at a position of predetermined distance from the aforementioned electrode A so that the corona treatment is conducted stably and uniformly. This electrode is also obtained from the market. The rolls having a core roll of materials such as aluminum and stainless steel which is lining processed with ceramics, silicone, EPT rubber, hyperons rubber etc. are preferably employed. Frequency used in the corona treatment is 20 kHz to 100 kH, and is preferably 30 kHz to 60 kHz. When the frequency is low, uniformity of corona treatment is deteriorated, non-uniformity of corona treatment occurs. When the frequency is high, though there is no problem in case of high out put power corona treatment particularly, it is difficult to conduct stable treatment and non-uniformity occurs in case of low power corona treatment. Output power of corona treatment is 10 to 500 W min/m$^2$ and preferably 20 to 400 W min/m$^2$. Distance between the electrode and film is 5 mm to 50 mm, and preferably 10 mm to 35 mm. When the gapping is wide, high voltage is necessary to maintain constant output and non-uniformity is apt to generate. When the gapping is too narrow, applying voltage is too low and non-uniformity is apt to generate. In addition thereto, defects occur during conveyance of continuous processing.

An alkali treatment is generally conducted in a cycle of immersing the film in alkali solution, then washing and drying. Further, the process contains neutralization by acid solution after alkali treatment, and then washing and drying may be conducted. An alkali solution includes sodium hydroxide solution and potassium hydroxide solution. Concentration of hydroxide ion is preferably 0.1 to 3N, and more preferably 0.5N to 2N. Excellent adhesion between the hard coat layer and the low refractive index layer can be obtained by setting the above described range. Temperature of alkali solution is usually 25 to 90° C., and preferably 40 to 70° C. Time for alkali treatment is 5 seconds to 5 minutes, and preferably 30 seconds to 3 minutes.

Further, alkali treatment can be conducted by employing methods described in, for example, JP-A 2003-313326 or JP-A 2007-332253.

As for technologies of plasma treatment such as a flame plasma treatment method, a high-frequency discharge plasma treatment method, an atmospheric pressure glow discharge plasma treatment method and the like, references are made to those disclosed in JP-A 2004-352777, JP-A 2004-352777, JP-A 2007-314707, etc. Further, as for the processing apparatus, ordinary pressure plasma treatment apparatus AP-T series, produced by SEKISUI CHEMICAL Co., LTD. can be employed. Further, cleaning treatments such as treatment of wiping film substrate surface with liquid, high pressure air cleaner treatment, sticky roll treatment, film washing and the like can be conducted for removing foreign matter or deposited matter before or after the coating processes of each layer.

(Film Substrate)

A film substrate, one of the features of the invention, is described. The film substrate according to the invention contains a thermoplastic acrylic resin and cellulose ester resin, which is featured by that content ratio of thermoplastic acrylic resin to cellulose ester resin is thermoplastic acrylic resin: cellulose ester resin=95:5 to 50:50 by mass. The advantage of the invention is exhibited by employing thermoplastic acrylic resin and cellulose ester resin within the above described range in combination and providing the hard coat layer containing thermoplastic acrylic resin of the film substrate on the film substrate of the above described range.

(Acrylic Resins)

Thermoplastic acrylic resin used for the film substrate is a resin containing cellulose ester resin described below in mutually soluble state. The compound afore mentioned in terms of the hard coat layer can be used concretely. Further, it is preferable that the acrylic resins used for film substrate have a weight average molecular weight (Mw) in the range of 80,000 to 1,000,000, and more preferably in the range of 110,000 to 500,000, in view of displaying the advantage of the invention and miscibility with cellulose ester resin.

(Cellulose Ester Resin)

It is preferable that the cellulose ester resin has a total substitution degree of the acyl group (T) of 2.0 to 3.0, a substitution degree of an acyl group having 3 to 7 carbon atoms of is 1.2 to 3.0, and a substitution degree of an acyl group having 3 to 7 carbon atoms is 2.0 to 3.0, in view of improvement of brittleness and transparency dissolved with acrylic resins. That is, the cellulose ester resin employed in the invention is a cellulose ester resin substituted with an acyl group having 3 to 7 carbon atoms, concretely, propionyl, butylyl and the like are used preferably, particularly propionyl group is used preferably.

In case that total substitution degree of the acyl group cellulose ester resin is less than 2.0, that is, remaining degree of hydroxy groups on 2,3,6-position of the cellulose ester molecule exceeds 1.0, it is not sufficiently miscible with acrylic resins, and increase of haze becomes problematic. Even in case that total substitution degree of the acyl group is 2.0 or more, a substitution degree of an acyl group having 3 to 7 carbon atoms is less than 1.2, sufficient miscibility is not also obtained, and brittleness deteriorates.

Further, in case that the total substitution degree of the acyl group is 2.0 or more, a substitution degree of acyl group having 2 carbon atoms, i.e., an acetyl group is high, and a substitution degree of the acyl group having 3 to 7 carbon atoms is less than 1.2, miscibility is lowered and haze increases. Further, in case that the total substitution degree of the acyl group is 2.0 or more, the substitution degree of an acyl group having 8 or more carbon atoms is high, and a substitution degree of the acyl group having 3 to 7 carbon atoms is less than 1.2, brittleness deteriorates and expected properties are not obtained.

As for the acyl substitution degree cellulose ester resin, there is no problem when total substitution degree (T) is 2.0 to 3.0, and substitution degree of an acyl group having 3 to 7 carbon atoms is 1.2 to 3.0, and it is preferable that a sum of substitution degree of the acyl groups of acyl groups having carbon atoms of other than 3 to 7, that is, an acetyl group having 8 or more carbon atoms is totally not more than 1.3.

Further, total substitution degree of the acyl group (T) of the cellulose ester resin is further preferably within the range of 2.5 to 3.0.

The above described acyl group may be an aliphatic acyl group or an aromatic acyl group. In case of an aliphatic acyl group it may be straight chain or branched, and may have a substituent. The number of carbon atoms of acyl group of the invention includes those of substituent to the acyl group.

In case that the above described cellulose ester resin has an aromatic acyl group as substituent, a number of substituents to the aromatic ring X is preferably 0 to 5. Notice is necessary, in this instance, that a substitution degree of an acyl group having 3 to 7 carbon atoms including the substituent be 1.2 to 3.0. For example, benzoyl group has 7 carbon atoms, and if it has a substituent containing carbon atom, the number of carbon atoms of the benzoyl group is 8 or more, and consequently is not included within the acyl group having 3 to 7 carbon atoms.

Further, in case of number of substituents on the aromatic ring being two or more, they may be same or different, and further, may form a condensed polycyclic compound (for example, naphthalene, indene, indene, phenanthrene, quinoline, isoquinoline, chromene, chroman, phthalazine, acridine, indole and indoline) by bonding each other.

Cellulose ester resin having a structure containing an aliphatic acyl group having carbon atoms as above described is employed in the cellulose ester resin.

The cellulose ester resin has total substitution degree of the acyl group (T) of 2.0 to 3.0, and a substitution degree of an acyl group having 3 to 7-carbon atoms is 1.2 to 3.0.

Further, it is preferable that sum of the substitution degree of the acyl group other than those having 3 to 7 carbon atoms, that is, an acetyl group and the acyl group having 8 or more carbon atoms is not more than 1.3 totally.

The cellulose ester resin is preferable at least one selected from, particularly, cellulose acetate propionate, cellulose acetate butylate, cellulose acetate benzoate, cellulose propionate and cellulose butylate, that is, preferable is one having acyl group 3 or 4 carbon atoms as a substituent.

The particularly preferable cellulose ester resin is cellulose acetate propionate and cellulose propionate among them.

A part which is not substituted with acyl group usually exists as a hydroxy group. These can be synthesized by a known method.

The substitution degree of the acetyl group or other acyl groups is measured according to a method required by ASTM-D817-96.

A weight average molecular weight (Mw) of the cellulose ester resin is 75,000 or more and preferably in the range of 75,000 to 300,000, further preferably in the range of 100,000 to 240,000, and 160,000 to 240,000 is particularly preferable, particularly in view of improvement of miscibility with acrylic resins and brittleness. When weight average molecular weight (Mw) is not more than 75,000 cellulose ester resin, benefits of improving heat resistance or brittleness are not sufficient. Further, it is possible to use two or more kinds of cellulose resin by mixture.

In the film substrate according to the invention, the acrylic resin and the cellulose ester resin have content ratio of acrylic resins to cellulose ester resin of acrylic resins/cellulose ester resin=95/5 to 50/50 by mass, and preferably 90/10 to 60/40.

Further, the acrylic resin and the cellulose ester resin are required to be contained to improve transparency of the film substrate.

It is possible to determine by, for example, by glass transition temperature Tg whether the acrylic resin and cellulose ester resin are in a compatibly mixed state or not.

In case that each of glass transition temperature of two resins is different from each other, the blended resin has two or more glass transition temperatures since there exists glass transition temperatures of respective resins, however when two resins are in a compatibly mixed state, intrinsic glass transition temperatures of each resins dissolves and it has one glass transition temperature of the resin compatibly mixed.

Herein, glass transition temperature is mid-glass transition temperature (Tmg) determined in accordance with JIS K7121 (1987), by employing differential scanning calorimetry apparatus Model DSC-7 (produced by PerkinElmer Co., Ltd.) measured with raising temperature of 20° C./minute.

The acrylic resins and the cellulose ester resin are preferably non-crystalline resins respectively, and one may be a crystalline polymer or polymer having partially crystalline property. It is preferable that the acrylic resin and the cellulose ester resin are compatibly mixed to form a non-crystalline resin in the invention.

A weight average molecular weight (Mw) of the acrylic resin, a weight average molecular weight (Mw) of cellulose ester resin and a substitution degree of the film substrate can be obtained by conducting measurement respectively, after fractioning utilizing difference of solubility of resin against solvent. When the resin is subjected to fractioning, a compatibly mixed resin is added in a solvent in which only one is dissolved, and dissolved resin is extracted and fractioned, wherein heating operation or refluxing operation can be used. The resin may be fractioned by combining two or more processes using combination of solvents. Remaining undissolved resin are filtrated from dissolved resin, and the resin can be separated via operations of evaporating solvent and drying for a solution containing extracted substance. The separated resin can be determined via general polymer structural analysis. Further, in case that the film substrate contains other resins than acrylic resin or cellulose ester resin, fractioning can be conducted in the same way. By comparing the amounts of various types of resin obtained by fractioning confirmation can be made that content ratio of thermoplastic acrylic resin to cellulose ester resin satisfies within the range of the invention as thermoplastic acrylic resin/cellulose ester resin=95/5 to 50/50 by mass.

In the similar manner, confirmation is made for thermoplastic acrylic resin in the hard coat layer. By extracting thermoplastic acrylic resin by means of solvent after scraping the hard coat layer and measuring the scraped amount, co-existing radical polymerization compounds or cationic polymerization compounds has large polymer via polymerization reaction, which is not dissolve in above described solvent, thermoplastic acrylic resin can be confirmed easily by separation. Further, contained ratio of acrylic resin can be measured by employing TOF-SIMS (time-of-flight secondary ion mass spectrometry) for each of cut face and the hard coat layer surface, obtained by cutting film substrate and the hard coat layer neighborhood around interface employing a microtome.

Further, when each of weight average molecular weights (Mw) of compatibly mixed resin is different from each other, a high molecular weight substance is separated by dissolution within short time, and the lower molecular weight substance is separated by dissolution taking longer time, and therefore, they are easily separated and fractionated, and molecular weight can be measured via gel permeation chromatography (GPC).

Further, conducting molecular weight measurement of compatibly mixed resin by GPC, and simultaneously conducting quantitatively structural analysis of the resins fractionally obtained by a manner wherein a resin is separated by dissolution in each time resin and solvent is removed by evaporation and dried, resin composition in each of different molecular weight fraction is detected, whereby each resin of the compatibly mixed resin can be determined. Also, each resin of compatibly mixed resin is detected by measuring molecular weight distribution of the preliminarily fractionated resin by difference of solubility in solvent via GPC.

Further, the term of "contain acrylic resins or cellulose ester resin in compatibly mixed state" means that the resins becomes compatibly mixed as a result of the mixing each resin (polymer), and does not include the mixed resin state made by polymerization of precursor of acrylic resin such as monomer, dimer and oligomer after mixing the cellulose ester resin in the invention.

For example, a process of obtaining mixed resin by polymerization of precursor of acrylic resin such as monomer, dimer and oligomer after mixing the cellulose ester resin is complicated in the polymerization reaction, and the produced by this method is difficult to control reaction and adjust molecular weight. Further, incase that the resin is synthesized in this method, graft polymerization, crosslinking reaction or cycle forming reaction are sometimes occurred, it is difficult to measure a weight average molecular weight (Mw) conducting separation by dissolution of acrylic resins from mixed resin, because sometimes there are difficulty of dissolution in solvent or difficulty of melting by heat, it is difficult to control physical properties. Therefore, the resin is not used for manufacturing film substrate stably.

It is preferable that total mass of the acrylic resins and the cellulose ester resin in the film substrate is at least 55% by mass with respect to an optical film and further preferably at least 60% by mass and particularly preferably at least 70% by mass.

The film substrate may be composed by containing resins or additives other than thermoplastic acrylic resin, cellulose ester resin.

(Acrylic Particles)

It is preferable to incorporate acrylic particles to obtain improvement of brittleness or excellent pencil hardness of the film substrate according to the invention.

Acrylic particles represents acrylic component containing thermoplastic acrylic resin and cellulose ester resin in a particle state (hereinafter also referred to as a non-miscible state) in the film substrate.

A specified amount of a prepared acrylic resin containing film is sampled, and the above acrylic resin containing film is dissolved in solvents. After complete dissolution/dispersion, filtration is carried out employing a membrane filter produced by PTFE having a pore diameter which is less than the average particle diameter of acrylic particles. It is preferable that any insoluble compounds which are collected via the above filtration are at least 90% by mass of acrylic particles added to the acrylic resin containing film.

Acrylic particles employed in the present invention are not particularly limited, but it is preferable that each of acrylic particles is structured to have a layer configuration of at least two layers. Further, it is specifically preferable that each particle is an acrylic granular complex having multilayer structure described below.

The multilayer structure acrylic granular complex refers to a multilayer particle structure of acrylic polymer in which, toward the periphery from the center, an innermost hard layer polymer, a crosslinked soft layer polymer exhibiting rubber elasticity, and the outermost hard layer polymer are arranged.

That is the acrylic granular complex having multilayer structure is an acrylic granular complex having multilayer structure having, toward the periphery from the center, an innermost hard layer polymer, a crosslinked soft layer polymer exhibiting rubber elasticity, and the outermost hard layer polymer are arranged. The acrylic granular complex having multilayer structure composed of 3-layer core shell structure is preferably used As a preferred embodiment of the multilayer structure acrylic granular complex employed in the acrylic resin composition according to the present invention, listed is the one described below: an acrylic granular complex which incorporates a 3-layer structure composed of (a) an innermost hard layer polymer which is prepared by polymerizing a monomer mixture of 80 to 98.9% by mass of methyl methacrylate, 1 to 20% by mass of alkyl acrylate in which the number of carbon atoms of the alkyl group is 1 to 8, 0.01 to 5% by mass of polyfunctional crosslinking agents, and 0.01 to 0.3% by mass of polyfunctional grafting agents, (b) a crosslinked soft layer polymer which is prepared by polymerizing, in the presence of the above innermost hard layer polymer, a monomer mixture of 75 to 98.5% by mass of alkyl acrylate in which the number of carbon atoms of the alkyl group 4 to 8, 0.01 to 5% by mass of polyfunctional crosslinking argents, and 0.5 to 5% by mass of functional grafting agents, and (c) an outermost hard layer polymer which is prepared by polymerizing, in the presence of the polymer composed of the above innermost hard layer and crosslinked soft layer, a monomer mixture of 80 to 99% by mass of methyl methacrylate, 1 to 20% by mass of alkyl acrylate in which the number of carbon atoms of the alkyl group of 1 to 8, and the resulting 3-layer structure polymer is composed of 5 to 40% by mass of innermost hard layer polymer (a), 30 to 60% by mass of soft layer polymer (b), and 20 to 50% by mass of outermost hard layer polymer (c), and when being subjected to fraction via acetone, an insoluble portion exists and the methyl ethyl ketone swelling degree of the above insoluble portion is 1.5 to 4.0.

As disclosed in JP-B S60-17406 and H03-39095, not only by specifying the composition of each layer of the multilayer structure acrylic granular complex and the particle size, but also by setting the pulling elastic modulus of the multilayer structure acrylic granular complex and the methyl ethyl ketone swelling degree of the acetone-insoluble portion within the specified range, it is possible to realize a sufficient balance between the impact resistance and the stress resistance whitening properties.

It is preferable that innermost hard layer polymer (a), which constitutes the multilayer structure acrylic granular complex, is prepared by polymerizing a monomer mixture composed of 80 to 98.9% by mass of methyl methacrylate, 1-20% by mass of alkyl acrylate in which the number of carbon atoms of the alkyl group is 1 to 20, and 0.01 to 0.3% by mass of polyfunctional grafting agents.

Alkyl acrylates, in which the number of carbon atoms of the alkyl group is 1 to 8, include methyl acrylate, ethyl acrylate, n-propyl acrylate, n-butyl acrylate, s-butyl acrylate, and 2-ethylhexyl acrylate, and of these, preferably employed are methyl acrylate and n-butyl acrylate.

The ratio of alkyl acrylate units in innermost hard layer polymer (a) is commonly 1 to 20% by mass. When the aforesaid units are less than 1% by mass, the resulting polymer tends to thermally decompose, while when they exceeds 20% by mass, the glass transition temperature of innermost hard layer polymer (c) is lowered, whereby impact resistance providing effects of the 3-layer structure acrylic granular complex is degraded. Accordingly, neither case is preferred.

Polyfunctional grafting agents include polyfunctional monomers, having different polymerizable functional groups, such as allyl ester of acrylic acid, methacrylic acid, maleic acid and fumaric acid, and allyl methacrylate is preferably employed. Polyfunctional grafting agents are employed to chemically combine the innermost hard layer polymer and the soft layer polymer. The ratio when employed in the innermost hard layer polymerization is 0.01 to 0.3% by mass.

As crosslinked soft layer polymer (b) which constitutes an acrylic granular complex, preferred is one which is prepared by polymerizing, in the presence of above innermost hard layer polymer (a), a monomer mixture of 75 to 98.5% by mass of alkyl acrylate in which the number of carbon atoms of the alkyl group is 1 to 8, 0.01 to 5% by mass of polyfunctional crosslinking agents, and 0.5 to 5% by mass of polyfunctional grafting agents.

As an alkyl acrylate in which the number of carbon atoms of the alkyl group is 4 to 8, preferably employed are n-butyl acrylate and 2-ethylhexyl acrylate.

Further, together with these polymerizable monomers, it is possible to copolymerize other monofunctional monomers at 25% by mass or less which are copolymerizable.

Other monofunctional monomers which are copolymerizable include styrene and substituted styrene derivatives. With regard to the ratio of alkyl acrylates in which the number of carbon atoms of the alkyl group is 4 to 8 to styrene, as the former ratio increases, the glass transition temperature of polymer (b) is lowered, whereby softness is achievable.

On the other hand, in view of transparency of resin compositions, it is advantageous to make close the refractive index of soft layer polymer (b) at normal temperature to that of innermost hard layer polymer (a), outermost hard layer polymer (c), and thermally plastic hard acrylic resins. Upon considering the above, the ratio of both is chosen.

As a polyfunctional grafting agent, employed may be ones cited in the item of above innermost layer hard polymer (a). Polyfunctional grafting agents employed herein are employed to chemically combine soft layer polymer (b) and outermost hard layer polymer (c), and in view of providing of targeted impact resistance effects, the ratio employed during the innermost hard layer polymerization is preferably 0.5 to 5% by mass.

As an employable polyfunctional crosslinking agent may be commonly known crosslinking agents such as divinyl compounds, diallyl compounds, or dimethacryl compounds. Of these, preferably employed are polyethylene glycol diacrylate (at a molecular weight of 200 to 600).

Polyfunctional crosslinking agents, employed herein, are employed to realize effects of impact resistance via formation of a crosslinking structure during polymerization of soft layer (b). However, when the above polyfunctional grafting agents are employed during polymerization of the soft layer, the crosslinking structure in soft layer (b) is formed to some extent. Accordingly, polyfunctional crosslinking agents are not essential components. In view of targeted effects to provide impact resistance, the ratio of polyfunctional crosslinking agents during soft layer polymerization is preferably 0.01 to 5% by mass.

As outermost hard layer polymer (c) which constitutes a multilayer structure acrylic granular complex, preferred is one which is prepared, in the presence of the above innermost hard layer polymer (a) and soft layer polymer (b), by polymerizing a monomer mixture composed of 80 to 99% by mass of methyl methacrylate and 1 to 20% by mass of alkyl acrylate in which the number of carbon atoms in the alkyl group is 1 to 8.

As alkyl acrylates, employed are those described above, and of these, preferably employed are methyl acrylate and ethyl acrylate. The ratio of alkyl acrylate units in uppermost hard layer (c) is preferably 1 to 20% by mass.

Further, to enhance miscibility with acrylic resin during polymerization of outermost hard layer (c), it is possible to employ mercaptan as a chain transfer agent to regulate the resulting molecular weight.

In particular, to improve the balance between elongation and impact resistance, it is preferable to result in a gradient so that the molecular weight gradually decreases from the interior to the exterior. A specific method is as follows. A monomer mixture to form the outermost hard layer is divided into at least two parts. By a technique in which chain transfer agents, which are added each time, are gradually increased, it is possible to decrease the molecular weight of polymers to form the outermost hard layer from the interior of the multilayer structure acrylic granular complex to the exterior.

It is possible to check the molecular weight during the above formation as follows. The monomer mixture employed each time is individually polymerized under the same conditions, and the molecular weight of the resulting polymer is determined.

The diameter of acrylic particles preferably employed in the present invention is not particularly limited. The above diameter is preferably 10 to 1,000 nm, is more preferably 20 to 500 nm, and is most preferably 50 to 400 nm.

In the acrylic granular complex, which is the multilayer structure polymer preferably employed in the present invention, the weight ratio of the core and the shell is not particularly limited. When the entire multilayer structure polymer is assigned at 100 parts by weight, the core layer occupies preferably 50-90 parts by weight, but occupies more preferably 60 to 80 parts by weight. The core layer means the innermost hard layer here.

Examples of commercial products of the above multilayer structure acrylic granular complex include "METABLEN" produced by Mitsubishi Rayon Co., Ltd., "KANEACE" produced by Kaneka Corp., "PARALOID" produced by Kureha Chemical Industry Co., Ltd., "ACRYLOID" produced by Rohm and Haas Co., "STAFILOID" produced by Ganz Chemical Industry Co., and "PARAPET SA" produced by Kuraray Co., Ltd. These products may be employed individually or in combinations of two or more.

Further, specific examples of acrylic particles, which are composed of graft copolymers, appropriately employed as acrylic particles preferably employed in the present invention, include graft polymers which are prepared by copolymerizing, in the presence of rubber polymers, a mixture of monomers composed of unsaturated carboxylic acid ester type monomers, unsaturated carboxylic acid type monomers, and aromatic vinyl type monomers, as well as if desired, other vinyl type monomers which are copolymerizable with the above.

Rubber polymers employed in acrylic particles, which are graft copolymers, are not particularly limited, and diene type rubber, acryl type rubber, and ethylene type rubber are employable. Specific examples thereof include polybutadiene, styrene-butadiene copolymers, styrene-butadiene block copolymers, acrylonitrile-butadiene copolymers, butyl acrylate-butadiene copolymers, polyisoprene, butadiene-methyl methacrylate copolymers, butyl acrylate-methyl methacrylate copolymers, butadiene-ethyl acrylate copolymers, ethylene-propylene copolymers, ethylene-propylene-diene type copolymers, ethylene-isoprene copolymers, and ethylene-methyl acrylate copolymers. These rubber polymers may be employed individually or in combinations of at least two types.

Further, in view of preparation of a highly transparent film, it is preferable that the refractive index of the mixture of acrylic resin and cellulose ester resin is near that of acrylic particles. Specifically, any difference in the refractive index between acrylic particles and acrylic resin is preferably at most 0.05, is more preferably at most 0.02, but is most preferably at most 0.01.

In order to satisfy the above refractive index conditions, it is possible to decrease the difference in refractive index by employing a method in which each monomer unit composition ratio is regulated, and/or a method in which the composition ratio of employed rubber polymers or monomers is regulated, whereby it is possible to prepare an acrylic resin containing film which excels in transparency.

Difference in refractive index, as described herein, refers to the following. The acrylic resin containing film of the present invention is sufficiently dissolved in acrylic resin dissolvable solvents under optimal conditions to prepare a milky-white solution. The resulting solution is separated into a solvent soluble portion and a solvent insoluble portion via an operation such as centrifugal separation. Subsequently, each of the soluble portion (acrylic resin) and the insoluble portion (acrylic particles) is purified. Thereafter, each refractive index is determined (at 23° C. and 550 nm wavelength), whereby the difference is obtained.

Methods to blend acrylic resin with acrylic particles in the present invention are not particularly limited. A method is preferably employed in which after blending acrylic resin with other optional components, the resulting blend is homogeneously melt-kneaded via a uniaxial or biaxial extruder while adding acrylic particles at 200 to 350° C.

Further, it is possible to employ a method in which a solution, into which acrylic particles have been dispersed, is mixed with a solution (being a dope solution) which is prepared by dissolving acrylic resin and cellulose ester resin in solvents, and a method in which a solution which is prepared by dissolving acrylic particles and other optional additives in solvents is added in-line.

It is possible to employ, as the acrylic particles according to the present invention, commercial products. Examples thereof may include METABLEN W-341 (C2) (produced by Mitsubishi Rayon Co., Ltd.) and CHEMISNOW MR-2G (C3) and MS-300X (C4) (produced by Soken Chemical & Engineering Co., Ltd.).

It is preferable that the acrylic particles are incorporated with reference to the total mass of the acrylic resins and the cellulose ester resin composing the film in mass ratio of acrylic particles/the acrylic resins and the cellulose ester resin total mass of=0.5/100 to 30/100, further preferably, in the range of acrylic particles/total mass of the acrylic resins and the cellulose ester resin=1.0/100 to 15/100, in view of displaying the benefit of the invention.

(Other Additive)

In the acrylic resin containing film of the present invention, in order to enhance fluidity and flexibility of the composition, it is possible to simultaneously employ plasticizers. The plasticizer includes phthalic acid type, an aliphatic acid ester type, trimellitic acid ester type, phosphoric acid ester type, polyester type, epoxy type and the like. Among these, plasticizer of polyester type and phthalic acid type are employed preferably. The polyester type plasticizers are excellent in non-mobility and extraction resistance compared to phthalic acid ester type plasticizers such as dioctyl phthalate, but slightly inferior in plasticizing effects and miscibility.

Consequently, by selecting or simultaneously employing these plasticizers depending on intended use, they may be applied to a wide range of usages.

Polyester type plasticizers are reactants of uni- to tetravalent carboxylic acid with uni- to hexa-hydric alcohol, and those, which are prepared by allowing divalent carboxylic acid to react with glycol, are mainly employed. Representative divalent carboxylic acids include glutaric acid, itaconic acid, adipic acid, phthalic acid, azelaic acid, and sebacic acid.

Particularly, the use of adipic acid, phthalic acid and so on enables preparation of those excellent in plasticizing characteristics. Glycols include ethylene, propylene, 1,3-butyrene, 1,4-butyrene, 1,6-hexamethylene, neopentylene, diethylene, triethylene and dipropylene. These divalent carboxylic acids and glycols may be employed individually or in combination.

The above ester type plasticizers may be any of the ester, oligoester or polyester type. The molecular weight is preferably in the range of 100 to 10,000, and is more preferably in the range of 600 to 3,000, at which range plasticizing effects are more enhanced.

Further, viscosity of plasticizers correlates with their molecular structure and weight. In the case of adipic acid type plasticizers, the viscosity is preferably in the range of 200 to 5,000 mP·s (at 25° C.) from the relation with plasticization efficiency. Further, several polyester type plasticizers may be simultaneously employed.

It is preferable that 0.5 to 30 parts by weight of plasticizers are added to 100 parts by weight of a composition containing acrylic resin. It is not preferable that in practice, the added amount of the plasticizers exceeds 30 parts by weight, since the surface becomes sticky.

It is preferable that the film substrate contains UV absorbing agent. For example, cited may be triazoles such as 2-(5-methyl-2-hydroxyphenyl)benzotriazole, 2-[2-hydroxy-3,5-bis(α,α-dimethylbenzyl)phenyl]-2H-benzotriazole, and 2-(3,5-di-t-butyl-2-hydroxyphenyl)benzotriazole, as well as benzophenones such as 2-hydroxy-4-methoxybenzophenone, 2-hydroxy-4-octoxybenzophenone, or 2,2'-dihydroxy-4-methoxybenzophenone. Of UV absorbers, those having a molecular weight of at least 400 exhibit a high boiling point and are neither easily volatized nor scattered during molding at high temperature. Consequently, it is possible to effectively improve weather resistance via their addition of a relatively small amount.

UV absorbers having a molecular weight of at least 400 include benzotriazole type ones such as 2-[2-hydroxy-3,5-bis(α,α-dimethylbenzyl)phenyl]-2-benzotriazole, and 2,2-methylenebis[4-(1,1,3,3-tetrabutyl)-6-(2H-benzotriazole-2-yl)phenol; hindered amine type ones such as bis(2,2,6,6-tetramethyl-4-piperidyl)sebacate and bis(1,2,2,6,6-pentamethyl-4-piperidyl)sebacate; further hybrid type ones having hindered phenol and hindered amine structures in the molecule such as 2-(3,5-di-t-butyl-4-hydroxybenzyl)-2-n-butylmalonic acid bis(1,2,2,6,6-pentamethyl-4-piperidyl) or 1-[2-[3-(3,5-di-t-butyl-4-hydroxyphenyl)propionyloxy]ethyl-443-(3,5-di-t-butyl-4-hydroxyphenyl)propionyloxy]-2,2,6,6-tetramethylpyperidine. These may be employed individually or in combinations of at least two types. Of these, particularly preferred are 2-[2-hydroxy-3,5-bis(α,α-dimethylbenzyl)phenyl]-2-benzotriazole and 2,2-methylenebis[4-(1,1,3,3-tetrabutyl)-6-(2H-benzotriazole-2-yl)phenol.

Further, in order to minimize thermal decomposition and thermal staining during molding, it is possible to add various antioxidants to the film substrate. Still further, by the addition of antistatic agents, it is possible to provide the optical film with antistatic capability. The fire resistant acryl type resin composition containing phosphor type fire retardant may be used in the film substrate.

As phosphor type fire retardants employed here, listed may be mixtures incorporating at least one selected from red phosphorous, triaryl phosphoric acid esters, diaryl phosphoric acid esters, monoaryl phosphoric acid esters, aryl phosphoric acid compounds, aryl phosphine oxide compounds, condensed aryl phosphoric acid esters, halogenated alkyl phosphoric acid esters, halogen-containing condensed phosphoric acid esters, halogen-containing condensed phosphoric acid esters, and halogen containing phosphorous acid esters.

Specific examples thereof include triphenyl phosphate, 9,10-dihydro-9-oxa-10-phosphaphenantholene-10-oxide, phenylphosphonic acid, tris(β-chloroethyl)phosphate, tris(dichloropropyl)phosphate, and tris(tribromoneopentyl) phosphate.

The term of brittleness in the invention is determined according to a criteria whether the ductile fracture is occurred with the film or not. In the invention, ductile fracture, which is caused when a stress stronger than the strength of a material is applied to the material, is defined as fracture accompanied by marked elongation or contraction of the material until reaching final rupture. The fracture surface characteristically forms thereon a number of dents, called dimples.

Therefore, the film causing no ductile fracture has a feature that even when applying large stress to the film so as to bend the film double, no fracture is observed.

A tension softening point is employed as an index of heat resistance. Liquid crystal display devices have continually increased in size, as well as the luminance of backlight sources. In addition, still higher luminance is demanded for outdoor use such as digital signage. Consequently, it is demanded that such optical film is durable in a higher temperature. When the tension softening point is 105 to 145° C., it is judged that the film exhibits sufficient heat resistance, and it is specifically preferable to control it between 110 and 130° C.

The specific method to determine the temperature which exhibits the tension softening point of acrylic resin containing films is as follows. For example, by employing a TENSILON tester (RTC-1225A, produced by Orientec Co., Ltd.), the tested acrylic resin containing film is cut into 120 mm (longitudinal) D 10 mm (wide). The resulting film is tensioned at 10 N while elevating the temperature at a rate of 30° C. per minute. At the time to reach 9 N, temperature is determined thrice and the tension softening point is obtained by averaging the resulting values.

Further, in view of heat resistance, glass transition temperature (Tg) of acrylic resin containing films is preferably at least 110° C., is more preferably at least 120° C., but is most preferably at least 150° C.

"Glass transition temperature", as described herein, refers to the midpoint glass transition temperature Tmg) determined in accordance with JIS K 7121 (1987) in which measurements are carried out at a temperature elevating rate of 20° C./minute employing a differential scanning colorimeter (DSC-Type 7, produced by Perkin Elmer Co.).

Further, a liquid crystal display device used in outdoor is required to have sufficient brightness and high contrast in bright place, and haze value of the film substrate is preferably not more than 1.0%, and more preferably not more than.

Further, it is effective to control the particle diameter or the adding amount and of the acrylic particles within a range described previously and to control surface roughness of the film contacting portion during the film forming small, since roughness of the surface affects to haze value as the surface haze.

Further, when the film substrate is used as a protecting film for a polarizing plate of a liquid crystal display device, dimensional change due to moisture absorbing generates unevenness or change in phase difference value which induces problem of low contrast or color unevenness. Particularly the above described problems are marked in case of the polarizing plate protecting film of the liquid crystal display device used outdoor. Therefore, ratio of dimensional change (%) is preferably not more than 0.5%, and more preferably not more than 0.3%.

Further, the number of defects at a diameter of at least 5 μm on the surface of the acrylic resin containing film of the present invention is preferably 0.5 per 10 cm square, and is more preferably 0.1 per 10 cm square.

"Diameter of the defect", as described herein, refers to the diameter when the defect is circular. When the defect is not circular, the area of the defect is determined via the following method while observed via a microscope, and the resulting maximum diameter (being a diameter of the inscribed circle) is taken.

The area of the defect, when it is an air bubble or foreign matter, is the size of the shadow when the defect is observed via a differential interference microscope. When the defect is a surface state change such as transfer of roller flaws or abrasion, the size is determined via observation employing the deferential interference microscope.

In the case of observation via reflected light, when the area of a defect is not clear, aluminum or platinum is vapor-deposited onto the surface, followed by further observation.

In order to manufacture high quality films with the least frequency of the above defects under desired productivity, it is effective that a polymer solution is precisely filtered prior to casting, the degree of cleanness around a caster is enhanced, and drying conditions after extrusion are set stepwise so that drying is efficiently carried out while minimizing foam formation.

When the number of defects is at least 1 in 10 cm square, productivity is occasionally degraded in such a manner that in the course of treatment during a post-process, when tension is applied to the film, the film breaks at the position of defects. Further, when the diameter of defects is at least 5 μm, they may be visually detected via observation of polarizing plates, and when employed as an optical material, bright spots are occasionally formed.

Further, even in the case in which nothing is detected via visual observation, when a hard coat layer is formed on the aforesaid film, defects (non-coated spots) are occasionally formed in such a manner that it is impossible to achieve uniform formation of coating materials. Defects, as described herein, refer to voids (being foam defects) in the film, generated by abrupt evaporation of solvents during the drying process of solution film production, and foreign matter (foreign matter defects) in the film due to foreign matter in a primary film making solution or mixed foreign matter during film production.

Further, rupture elongation of the acrylic resin containing film of the present invention in at least one direction is preferably at least 10%, but is more preferably 20%, which is determined type on JIS K7127 1999.

The upper limit of rupture elongation is not particularly limited, and the practical limit is approximately 250%. In order to increase the rupture elongation factor, it is effective to retard the formation of defects in film due to foreign matter and foaming.

Thickness of the acrylic resin containing film of the present invention is preferably at least 20 μm, but is more preferably at least 30 μm.

The upper limit of the thickness is also not particularly limited. When a film is prepared via a solution film producing method, in view of coatability, foaming, and solvent drying, the upper limit is approximately 250 μm. Film thickness may appropriately be selected type on use.

Total light transmittance of the acrylic resin containing film of the present invention is preferably at least 90%, but is more preferably at least 93%. Further, the practical upper limit is approximately 99%. In order to achieve excellent transparency, represented by the above total light transmittance, it is effective that additives and copolymerizing components which absorb visible light are not allowed to be incorporated, and diffusion and absorption of light in the interior of the film is decreased by removing foreign matter in polymers via precise filtration.

Further, it is effective that roughness of the film surface is decreased by decreasing the surface roughness of film contacting portions (such as cooling rollers, calendering rollers, drums, belts, coating devices of a solution film production, or conveying rollers) during film production and diffusion and reflection of light on the film surface are decreased by reducing the refractive index of acrylic resins.

(Forming Film Substrate)

A film forming method of the film substrate is described. The invention is not limited thereto. As a film substrate production method applicable is an inflation method, a T-die method, a calendering method, a cutting method, a casting method, an emulsion method, or a hot press method.

A method of melt-cast film forming is preferable in view of inhibiting remaining solvent used for dissolving the cellulose ester resin or the acrylic resin. The melt-cast film forming methods are classified to a melt-extrusion method, a press method, an inflation method, an injection method, a blow method, a stretching method and so on. The melt-extrusion is preferable to produce a film excellent in mechanical strength and surface accuracy, among these. Further, solution film forming by a flow casting method is preferable in view of inhibiting coloration, minimizing optical defects such as different matter defects or die line.

Further, a melt-cast film forming method in which a film forming material is heated, after displaying its fluidity, and is extrude on a drum or an endless belt is included in the invention.

(Organic Solvent)

When the acrylic resin containing film of the present invention is produced via the solution casting method, as useful organic solvents to form a dope, any solvent may be employed without limitation as long as it simultaneously dissolves acrylic resin, cellulose ester resin, and other additives.

Examples thereof may include, chlorine type organic solvents, such as methylene chloride, and non-chlorine type organic solvents such as methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3-hexafluoro-2-methyl-2-propanol, 1,1,1,3,3,3-hexafluoro-2-propanol, 2,2,3,3,3-pentafluoro-1-propanol and nitroethane. Methylene chloride, methyl acetate, ethyl acetate and acetone are preferably employable.

It is preferable that other than the above organic solvents, incorporated in the dope, are aliphatic alcohols having a straight or branched chain having 1 to 4 carbon atoms in an amount of 1 to 40% by mass. As the alcohol ratio in the dope increases, the resulting web is gelled, whereby peeling from a metal support become easier. Further, as the ratio of alcohol is low, it enhances dissolution of acrylic resin and cellulose ester resin in non-chlorine type organic solvents.

Specifically, a dope composition is preferred which is prepared by dissolving, in solvents incorporating methylene chloride and aliphatic alcohols having a straight or branched chain having 1 to 4 carbon atoms, three of acrylic resin, cellulose ester resin, and acrylic particles in an total amount of 15 to 45% by mass.

As aliphatic alcohols having a straight or branched chain having 1 to 4 carbon atoms, listed may be methanol ethanol, n-propanol, iso-propanol, n-butanol, sec-butanol, and tert-butanol. Ethanol is preferable among these in view of stability of the dope, relatively low boiling point and good drying performance.

(Polarizing Plate Protecting Film)

It is preferable that the hard coat film or the anti-reflection film is used for a polarizing plate protecting film. A manufacturing method is not particularly limited when it is used as a polarizing plate protecting film, and the polarizing plate can be produced by a general method. There is a method in which thus the obtained hard coat film or the anti-reflection film is subjected to alkali treatment, polyvinylalcohol film is laminated on both sides of a polarizer produced by immersing in iodine solution and stretched by employing complete saponified polyvinylalcohol aqueous solution. It is preferable that the hard coat film or the anti-reflection film according to the invention is directly laminated on at least one side of the polarizer.

It is preferable that the film substrate has surface roughness Ra of not more than 1 μm. In case the roughness Ra exceeds 1 μm, the surface is roughen or has protruding defects, and smoothness and glossiness may be deteriorated when the aforementioned functional layers are provided. To render Ra not more than 1 μm, surface of a taking roll just after the melt-extrusion or stretching roll is made mirror finish, the film is nipped between mirror finished rolls just take by roll, or temperature, magnification ratio, stretching speed longitudinal and/or lateral stretching are adequately selected. Further, it is effective to reduce Ra by sharpening the lip edge of the melt-extrusion die or specular finish a surface contacting to molt resin inside of the die.

It is preferable that thickness of the protecting film is 10 to 500 μm when the hard coat film or the anti-reflection film is used as a polarizing plate protecting film. It is particularly preferable not less than 20 μm and further, preferably not less than 35 μm. Further, it is preferably not more than 150 μm, and more preferably not more than 120 μm, and particularly preferably not less than 25 to 90 μm. When the hard coat film is thicker than the above described range, the polarizing plate obtained polarizing plate after processing becomes too thick and, it is not suitable for particularly thin and light purpose of a liquid crystal display used in a note size personal computer and a mobile electronics device. On the other side, when the hard coat film is thinner than the above described range, it is not preferable because display of retardation becomes difficult, protecting power from moisture is poor due to high moisture permeability of the film.

(Polarizing Plate)

The polarizing plate employing the hard coat film or the anti-reflection film according to the invention is described. The polarizing plate can be produced by a general method. It is preferable that rear side of the hard coat film or the anti-reflection film of the invention is subjected to alkaline saponification treatment, treated the hard coat film or the anti-reflection film is laminated on at least one side of a polarizing film produced by immersing in iodine solution and stretching, using complete saponified type polyvinylalcohol aqueous solution. On the other side, the hard coat film or the anti-reflection film or, another polarizing plate protecting film can be employed. It is preferable that a polarizing plate protecting film used on the other side than the hard coat film or the anti-reflection film of the invention is an optical compensation film (retardation film) having phase difference in plane retardation. Ro of 20 to 70 nm at 590 nm and thickness direction retardation Rt of 100 to 400 nm. These can be produced by a method described in JP-A 2002-71957, JP-Patent Application 2002-155395. Or, it is also preferable to use a polarizing plate protecting film having an optical anisotropic layer formed by orienting liquid crystal compound such as discotic liquid crystal, which polarizing plate protecting film works as also an optical compensation film. The optical anisotropic layer can be formed by a method described in, for example, JP-A 2003-98348. Or non-orientation film having retardation Ro of 0 to 5 nm at 590 nm, and Rt of −20 to +20 nm described in JP-A 2003-12859 can be used preferably.

A polarizing plate having excellent in flatness and stable magnifying view angle effect can be obtained by using the hard coat film or the anti-reflection film of the invention in combination.

Cellulose ester film in the market such as, KC8UX2MW, KC4UX, KC5UX, KC4UY, KC8UY, KC12UR, KC4UEW, KC8UCR-3, KC8UCR-4, KC8UCR-5, KC4FR-2, KC8UE and KC4UE (all produced by Konica Minolta Opto, Inc.) is employed as a protective film for polarizing plate used on the rear side.

A polarizing film, which is a main component of the polarizing plate, is an element which transmits polarized light in only predetermined direction. A currently known representative polarizing film is a polyvinyl alcohol polarizing film. Two types of polyvinyl alcohol polarizing films are known, namely, one is stained with iodine and the other is stained with a dichroic dye, but is not limited to these. A polarizing film is prepared in such a manner that an aqueous polyvinyl alcohol solution is cast to form a film and then the film is monoaxially stretched, followed by dying, or the film is stained with a dye first and then monoaxially stretched, followed by carrying out a durability enhancing treatment employing a boron compound. Thickness of the polarizing is 5 to 30 µm, and preferably 8 to 15 µm. The anti-reflection film according to the present invention is adhered on the surface of the polarizing film to form a polarizing plate. It is preferable to carry out the above adhesion employing an aqueous adhesive containing a completely saponified polyvinyl alcohol as the main component.

(Liquid Crystal Display Device)

Various display devices having excellent visibility can be produced by arranging the clear hard coat film of the present invention in viewing side of a display device. The hard coat film or the anti-reflection film of the invention is arranged in polarizing plate, which is preferably employed in an LCD such as a reflection type, a transmission type, or a semi-transmission type, or in various mode driving system LCDs such as TN mode, STN mode, OCB mode, HAN mode, VA mode (for example, a PVA type and an MVA type) IPS mode, or OCB mode.

EXAMPLES

Examples of the invention are concretely described below but the invention is not limited to them.

Example 1

1. Study of an Optical Film Having a Hard Coat Layer (Hereafter Referred to "Hard Coat Film")

Example 1

Preparation of Acrylic Resin A2

First, methylmethacrylate/acrylamide copolymer based suspension composition was prepared by the following way

| Methylmethacrylate | 20 parts by mass |
| Acrylamide | 80 parts by mass |
| Potassium per sulfate | 0.3 parts by mass |
| Ion exchanged water | 1,500 parts by mass |

The above described materials were put into a reaction vessel, and while substituting inside of the reaction vessel with nitrogen gas, reaction was progressed keeping a temperature at 70° C. until monomers are converted to polymer completely. The obtained aqueous solution was suspension composition. A solution dissolving 0.05 parts by mass of above described suspension composition in 165 parts by mass of ion exchanged water was provided in an autoclave made of stainless steel having volume content of 5 liters equipped with baffles and Faudler type stirring blade, and was stirred at 400 rpm while inside thereof was substituted with nitrogen gas. Next, the following raw material mixture described below was added while stirring the reaction system.

| Methacrylic acid | 27 parts by mass |
| Methylmethacrylate | 73 parts by mass |
| t-Dodecyl mercaptan | 1.2 parts by mass |
| 2,2'-Azobisisobutylonitrile | 0.4 parts by mass |

After addition, temperature was raised to 70° C. When the interior temperature reached 70° C., polymerization was initiated, followed by polymerization for 180 minutes while maintaining the temperature. Thereafter, based on conventional methods, the reaction system was cooled, and after separating the resulting polymer, washing and drying were carried out, whereby a bead-shaped copolymer was prepared. The polymerization ratio of the resulting polymer was 97%, while the weight average molecular weight was 130,000. The resulting copolymer was blended with 0.2% by weight of an additive ($NaOCH_3$). By employing a two-screw extruder (TEX30 (L/D of 44.5, produced by Japan Steel Works, Ltd.), while purging 10 L/minute of nitrogen from the hopper section, an intramolecular ring-forming reaction was carried out at a cylinder temperature of 290° C. under a screw rotation rate of 100 rpm, and a low material supplying rate of 5 kg/hour, whereby pellets were prepared, followed by vacuum drying at 80° C. for 8 hours. Thus, Acrylic Resin A8 was prepared. Weight average molecular weight (Mw) and Tg of Acrylic Resin A8 were 130,000 and 140° C., respectively.

Acrylic resins A1, A3 and MS1 described below were obtained by polymerization reaction similar to Acrylic resins A2.

A1: Monomer ratio by mass(MMA/MA=97/3), Mw 550000

A3: Monomer ratio by mass(MMA/MA=98/2), Mw 70000

MS1: Monomer ratio by mass(MMA/ST=60/40), Mw 100,000

(MA: methacrylic acid, MMA: methylmethacrylate, ST: styrene represents)

The acrylic resin, described in Example 1 of JP-A 2005-146084, was prepared via the same method described in paragraphs [0068] to [0070] to obtain B1. The weight average molecular weight of B1 was 244,000.

Other than the above, employed were the following commercial acrylic resins.

DIANAL BR85 (Produced by Mitsubishi Rayon Co., Ltd.) Mw 280,000

DIANAL BR88 (Produced by Mitsubishi Rayon Co., Ltd.) Mw 480,000

DIANAL BR80 (Produced by Mitsubishi Rayon Co., Ltd.) Mw 95,000

Any of the ratios of MMA units in molecules of the above commercial acrylic resins were 90% by mass to 99% by mass.

(Manufacture of Hard Coat Film 1)
(Manufacture of Film Substrate 1)
(Dope Liquid Composition 1)

| | |
|---|---|
| DIANAL BR85 (Produced by Mitsubishi Rayon Co., Ltd.) | 70 parts by mass |
| Cellulose ester (Cellulose acetate propionate, acyl group total substitution degree: 2.75, an acetyl group a substitution degree 0.19, propionyl group substitution degree: 2.56, Mw = 200000) | 30 parts by mass |
| Methylene chloride | 300 parts by mass |
| Ethanol | 40 parts by mass |

The above composition was subjected to complete dissolution under heating, whereby a dope liquid was manufactured.

(Film Forming)

The dope liquid, prepared as above, was uniformly cast onto a 2 in wide belt support made of stainless steel at 22° C., employing a belt casting apparatus Solvents were evaporated on the stainless steel band support so that the residual solvent amount reached 100%, and the resulting film was peeled from the belt support made of stainless steel via a peeling tension of 162 N/m.

The peeled acrylic resin web was heated at 35° C. to evaporate solvents and was slit to a 1.6 m width. Thereafter, while being stretched by a factor of 1.1 in the lateral direction via a tenter, drying was carried out carried out at a drying temperature of 135° C. When stretching was initiated via the tenter, the amount of residual solvents was 10%.

After tenter stretching, relaxation was allowed out for 5 minutes at 130° C. Thereafter, drying was completed via conveyance into 120° C. and 140° C. drying zones employing numerous rollers, and slitting was carried out for a 1.5 in width. Subsequently, a knurling treatment of a width of 10 mm and a height of 5 μm was applied to both edges, followed by winding onto a core of an internal diameter of 15.24 under an initial tension of 220 N/m and a final tension of 110 N/m, whereby Film Substrate 1 was obtained.

The stretching magnitude in the MD direction, calculated based on the rotation rate of the stainless steel belt support and the driving rate of the tenter, was at a factor of 1.1. Amount of residual solvent, thickness and roll length of the Film Substrate 1 were 0.1%, 60 μm and 4,000 m, respectively.

(Manufacture of Hard Coat Film 1)

Hard Coat Film 1 was manufactured a hard coat layer and a back coat layer are coated on the film substrate 1 manufactured as described above by procedures described below.

Coating composition of the hard coat layer was prepared by filtering Hard Coat Layer Composition 1 described below with a filter made of polypropylene having pore size of 0.4 μl. The obtained coating composition was coated on a surface of film substrate 1 employing an extrusion coater, was dried in a condition of temperature of 80° C. for 50 seconds, then coated layer was cured by employing UV ray lamp with intensity of illumination of irradiation portion of 300 mW/cm$^2$ and irradiation quantity of 0.3 J/cm$^2$, and a hard coat layer having a dry thickness 10 μm was formed. Then continuously Back Coat Layer Composition 1 described below was coated on the opposite side to a side the provided with the hard coat layer so as to have a wet thickness of 8 μm by means of an extrusion coater, dried in a condition of temperature at 50° C. for 30 seconds, and then was wound in roll state. Thus Hard Coat Film 1 was manufactured.

(Hard Coat Layer Composition 1)

Acrylic resin (Mw 280,000, trade name of DIANAL BR85, Produced by Mitsubishi Rayon Co., Ltd.) in an amount of 3.8 parts by mass was dissolved in 100 parts by mass of methyl ethylketone, was stirred and mixed with the materials described below to prepare Hard Coat Layer Composition 1.

| | |
|---|---|
| (Radical polymerization compound) | |
| Dipentaerythritol hexaacrylate (NK ester A-DPH, produced by Shin-Nakamura Chemical Co., Ltd.) | 180 parts by mass |
| (Photo-polymerization initiator) | |
| IRGACURE 184 (produced by Ciba Japan Ltd.) | 6 parts by mass |
| IRGACURE 907 (produced by Ciba Japan Ltd.) | 8 parts by mass |
| (Silicon type surfactant) | |
| Polyether modified silicone compound (trade name of KF-355A, produced by Shin-Etsu Chemical Co., Ltd.) | 9 parts by mass |
| (Solvent) | |
| Propyleneglycol monoethylether | 10 parts by mass |
| Methyl acetate | 80 parts by mass |
| (Back Coat Layer Composition 1 ) | |
| Acetone | 89.0 parts by mass |
| Isopropanol | 10.0 parts by mass |
| Cellulose acetate propionate (Acyl group total substitution degree 2.7, an acetyl group substitution degree 1.9 and propionyl group substitution degree 0.8) | 0.6 parts by mass |
| Ultra microparticles silica 2% acetone dispersion liquid (AEROSIL 200 V, product by Nippon Aerosil Co., Ltd.) | 0.2 parts by mass |

(Manufacture of Hard Coat Films 2 to 10)

Hard Coat Films 2 to 10 were manufactured in the same manner as the manufacture process of Film Substrate 1, except that species and content ratio of acrylic resin, to cellulose ester resin were modified as described in Table 1.

(Manufacture of Hard Coat Films 11 and 12)

Hard Coat Films 11 and 12 were manufactured in the same manner as the manufacture process of Hard Coat Films 7 and 8, except that the hard coat composition was changed to Hard Coat Composition 2.

(Hard Coat Layer Composition 2)

Hard Coat Layer Composition 2 was prepared by stirring and mixing materials described below.

| | |
|---|---|
| (Radical polymerization compound) | |
| Dipentaerythritol hexaacrylate (NK ester A-DPH, produced by Shin-Nakamura Chemical Co., Ltd.) | 180 parts by mass |
| (Photo-polymerization initiator) | |
| IRGACURE 184 (produced by Ciba Japan Ltd.) | 6 parts by mass |
| IRGACURE 907 (produced by Ciba Japan Ltd.) | 8 parts by mass |
| (Silicon type surfactant) | |
| Polyether modified silicone compound (trade name of KF-355A, produced by Shin-Etsu Chemical Co., Ltd.) | 9 parts by mass |
| (Solvent) | |
| Isopropyl alcohol | 180 parts by mass |

(Manufacture of Hard Coat Film 13)

Hard Coat Film 13 was manufactured in the same manner as the manufacture process of Hard Coat Film 1 except that the hard coat composition was changed to Hard Coat Composition 3.

(Hard Coat Layer Composition 3)

Acrylic resin (Mw 480,000, trade name of DIANAL BR88, produced by Mitsubishi Rayon Co., Ltd.) in an amount of 3.8 parts by mass was dissolved in 100 parts by mass of methylethylketone, was stirred and mixed with the materials described below to prepare Hard Coat Layer Composition 3.

| (Radical polymerization compound) | |
| --- | --- |
| Dipentaerythritol hexaacrylate (NK ester A-DPH, produced by Shin-Nakamura Chemical Co., Ltd.) | 180 parts by mass |
| (Photo-polymerization initiator) | |
| IRGACURE 184 (produced by Ciba Japan Ltd.) | 6 parts by mass |
| IRGACURE 907 (produced by Ciba Japan Ltd.) | 8 parts by mass |
| (Silicon type surfactant) | |
| Polyether modified silicone compound (trade name of KF-355A, produced by Shin-Etsu Chemical Co., Ltd.) | 9 parts by mass |
| (Solvent) | |
| Propyleneglycol monoethylether | 10 parts by mass |
| Methyl acetate | 80 parts by mass |

(Manufacture of Hard Coat Film 14)

Hard Coat Film 14 was manufactured in the same manner as the manufacture process of Hard Coat Film 1, except that the hard coat composition was changed to Hard Coat Composition 4.

(Hard Coat Layer Composition 4)

Acrylic resins (Mw 280,000, trade name of DIANAL BR85, produced by Mitsubishi Rayon Co., Ltd.) in an amount of 5.0 parts by mass was dissolved in 100 parts by mass of methylethylketone, was stirred and mixed with the materials described below to prepare Hard Coat Layer Composition 4.

| (Radical polymerization compound) | |
| --- | --- |
| Dipentaerythritol hexaacrylate (NK ester A-DPH, produced by Shin-Nakamura Chemical Co., Ltd.) | 180 parts by mass |
| (Photo-polymerization initiator) | |
| IRGACURE 184 (produced by Ciba Japan Ltd.) | 6 parts by mass |
| IRGACURE 907 (produced by Ciba Japan Ltd.) | 8 parts by mass |
| (Silicon type surfactant) | |
| Polyether modified silicone compound (trade name of KF-355A, produced by Shin-Etsu Chemical Co., Ltd.) | 9 parts by mass |
| (Solvent) | |
| Propyleneglycol monoethylether | 100 parts by mass |
| Methyl acetate | 80 parts by mass |

(Evaluation)

Hard Coat Films 1 to 14 manufactured as described above were evaluated in the following items after conducting the durability test described below. Obtained result was shown in Table 1.

(Durability Test)

Test pieces in a size of 15 cm×15 cm were cut out from each rolls of the above described manufactured hard coat film. They were put to a cycle thermo (500 cycles of standing for 30 minutes at −40° C., followed by standing for 30 minutes at 85° C., alternatively) supposing outdoor use, thereafter, durability test was conducted by light irradiation to the surface of the hard coat layer by means of Sun Shine Carbon Arc for 20 days. The hard coat films subjected to the durability test were conditioned at temperature 23° C. and relative humidity of 55% for 24 hours, and were evaluated.

(Surface Hardness: Pencil Hardness)

Hardness was measured by a method in accordance with the pencil hardness evaluation method stipulated by JIS-K5400, and employing test pencil stipulated by JIS-S6006 and a 500 g weight, in which method a hard coat layer surface was scratched five times repeating with pencils having each hardness until one scratch line was formed. Pencil hardness 3H or more is high hardness, and the higher the hardness number is given, the higher hardness the sample has.

(Adhesive Property Valuation)

Hundred square cells were formed on the hard coat layer surface by cutting 11 lines in each lateral and longitudinal like a chess board by a cutter. Adhesion test by a polyester adhesive tape (Model 31B, produced by Nitto Denko Corp.) was conducted 3 times repeatedly on a same area. Peeled state was observed visually and evaluation was conducted in 4 ranks described below.

AA: No peeling was observed until 100th cell at all.

A: Two or less peeled cells were observed in 100 cells.

B: Three to ten peeled cells were observed in 100 cells (practically unacceptable)

C: Eleven or more peeled cells were observed in 100 cells.

(Ductile Fracture Test: Brittleness Evaluation)

The hard coat film was cut out in a size of 100 mm (longitudinal)×10 mm (lateral), and was folded once in each inside and out side directions at the center of the longitudinal direction with radius of curvature of 8 mm. The test was conducted three times and evaluation was conducted according to criteria described below.

AA: No crack throughout film for 3 times.

A: Cracks were observed slightly on a part of a substrate and a hard coat layer 3 times all, but practically acceptable.

C: Film was broken at the folded portion at least once in 3 times.

(General Evaluation)

General evaluation was conducted as a result of each pencil hardness, adhesive properties and brittleness according to the described below criteria AA: Pencil hardness is 4H or higher, and one of adhesive property or brittleness is A and the other is B.

A: Pencil hardness is 3H or higher, and both of adhesive property and brittleness is B or A.

B: Pencil hardness is 3H or higher, and adhesive property is C or brittleness is D (practically unacceptable).

C: Pencil hardness is 2H or lower, and adhesive property is C or brittleness is D

TABLE 1

| Hard coat film No. | Hard coat Composition No. | Thermo plastic acrylic resin Species (added amount) | Mw | Substrate No. | Thermo plastic acrylic resin Species | Mw | Cellulose ester resin Mw | Content ratio * | Pencil hardness | Adhesive property | Ductile Fracture test (Brittleness evaluation) | General evaluation | Remarks |
|---|---|---|---|---|---|---|---|---|---|---|---|---|---|
| 1 | 1 | BR85 (3.8 parts by mass) | 280000 | 1 | BR85 | 280000 | 200000 | 70/30 | 5H | AA | AA | AA | Inv. |
| 2 | 1 | BR85 (3.8 parts by mass) | 280000 | 2 | BR85 | 280000 | 200000 | 94/6 | 5H | AA | A | AA | Inv. |
| 3 | 1 | BR85 (3.8 parts by mass) | 280000 | 3 | BR85 | 280000 | 200000 | 98/2 | 4H | C | C | B | Comp. |
| 4 | 1 | BR85 (3.8 parts by mass) | 280000 | 4 | BR85 | 280000 | 200000 | 52/48 | 5H | AA | AA | AA | Inv. |
| 5 | 1 | BR85 (3.8 parts by mass) | 280000 | 5 | BR85 | 280000 | 200000 | 48/52 | 2H | B | A | C | Comp. |
| 6 | 1 | BR85 (3.8 parts by mass) | 280000 | 6 | MS1 | 100000 | 200000 | 70/30 | 4H | A | A | A | Inv. |
| 7 | 1 | BR85 (3.8 parts by mass) | 280000 | 7 | A2 | 130000 | 200000 | 70/30 | 5H | AA | AA | AA | Inv. |
| 8 | 1 | BR85 (3.8 parts by mass) | 280000 | 8 | BR88 | 480000 | 200000 | 70/30 | 5H | AA | AA | AA | Inv. |
| 9 | 1 | BR85 (3.8 parts by mass) | 280000 | 9 | A1 | 550000 | 200000 | 70/30 | 4H | A | A | A | Inv. |
| 10 | 1 | BR85 (3.8 parts by mass) | 280000 | 10 | B1 | 244000 | — | 100 | 5H | C | C | B | Comp. |
| 11 | 2 | — | — | 7 | A2 | 130000 | 200000 | 70/30 | 2H | C | A | C | Comp. |
| 12 | 2 | — | — | 8 | BR88 | 480000 | 200000 | 70/30 | 2H | B | B | C | Comp. |
| 13 | 3 | BR88 (3.8 parts by mass) | 480000 | 1 | BR85 | 280000 | 200000 | 70/30 | 5H | AA | AA | AA | Inv. |
| 14 | 4 | BR85 (5.0 parts by mass) | 280000 | 1 | BR85 | 280000 | 200000 | 70/30 | 5H | AA | AA | AA | Inv. |

BR85: DIANAL BR85
BR88: DIANAL BR88
Inv.: Invention
Comp.: Comparative example
*: Content ratio of thermo plastic acrylic resin to cellulose ester resin by mass Though good surface hardness was obtained, the other characteristics such as adhesive properties and brittleness was not obtained, by employing acrylic resin in high content ratio in the film substrate from the result shown in Table 1. Further, though brittleness was improved, high surface hardness or adhesive property was not obtained, by employing the acrylic resin along with cellulose ester resin in combination in the film substrate.

It is understand to be excellent in all items of adhesive properties after a durability test, surface hardness and brittleness in comparison with comparative samples, by that the film substrate contains an acrylic resin and a cellulose ester resin, content ratio by mass of the acrylic resin to the cellulose ester resin is acrylic resins/cellulose ester resin=95/5 to 50/50, and the hard coat film of the invention containing acrylic resin in the hard coat layer is employed.

It is understood that acrylic resin in the film substrate having a weight average molecular weight of 110000 to 500,000 has particularly excellent property among the hard coat films of the invention.

Further, as for the hard coat films of the invention, film substrate and neighborhood around interface of the hard coat layer was cut by means of a microtome, content ratio of acrylic resin at the cut face and the hard coat layer surface was measured by means of TOF-SIMS (time-of-flight secondary ion mass spectrometry). As the result, acrylic resin content ratio is higher at a face cut in the neighborhood around interface of film substrate and the hard coat layer.

Example 2

Manufacture of Hard Coat Films 15 to 19

Hard Coat Films 15 to 19 were manufactured in the same way as the manufacture process of Hard Coat Film 1, except that acrylic resin added amount in the hard coat composition was changed with respect to an amount of dipentaerythritol hexaacrylate (A-DPH), which is a radical polymerization compound as shown in Table 2.

(Evaluation)

Hard Coat Films 15 to 19 manufactured described above and Hard Coat Film 1 manufactured in Example 1, were evaluated in the same way as Example 1 except that durability test condition was changed to that described below. The obtained results are shown in Table 2.

(Durability Test)

Test pieces in a size of 15 cm×15 cm were cut out from each rolls of the above described manufactured hard coat film. They were put to a cycle thermo (cycle of standing for 30 minutes at −40° C., followed by standing for 30 minutes at 85° C., alternatively) in which number of cycles changed to 600 in place of 500 cycles supposing outdoor use, thereafter, durability test was conducted by light irradiation to the surface of the hard coat layer by means of Sun Shine Carbon Arc for 20 days. The hard coat films subjected to the durability test were conditioned at temperature 23° C. and relative humidity of 5.5% for 24 hours, and were evaluated.

TABLE 2

| Hard coat film No. | Composition No. | Thermo plastic acrylic resin Species (added amount) | Mw | Cationic polymerizable compound (added amount) | * | Pencil hardness | Adhesive property | Ductile Fracture test (Brittleness evaluation) | General evaluation |
|---|---|---|---|---|---|---|---|---|---|
| 1 | 1 | BR85 (3.8 parts by mass) | 280000 | A-DPH (180 parts by mass) | 2.1/100 | 5H | AA | AA | AA |
| 15 | 5 | BR85 (1.8 parts by mass) | 280000 | A-DPH (180 parts by mass) | 1.0/100 | 5H | AA | AA | AA |
| 16 | 6 | BR85 (0.9 parts by mass) | 280000 | A-DPH (180 parts by mass) | 0.50/100 | 5H | AA | AA | AA |
| 17 | 7 | BR85 (0.6 parts by mass) | 280000 | A-DPH (180 parts by mass) | 0.33/100 | 4H | A | A | A |
| 18 | 8 | BR85 (34 parts by mass) | 280000 | A-DPH (180 parts by mass) | 19/100 | 4H | AA | AA | AA |
| 19 | 9 | BR85 (38 parts by mass) | 280000 | A-DPH (180 parts by mass) | 21/100 | 3H | A | AA | A |

BR85: DIANAL BR85
*: Content ratio of thermo plastic acrylic resin to cationic polymerizable compound by mass As it is understood from the results of Table 2, more excellent performance is displayed by a content ratio by mass of acrylic resin to polyfunctional acrylate, which is a radical polymerization compound, in the hard coat layer, is arranged so as to have acrylic resins/radical polymerization compound=0.50/100 to 20/100, among the hard coat films of the invention, in a condition of elongated cycle thereto time supposing outdoor use.

Example 3

Manufacture of Hard Coat Films 20 to 23

Hard Coat Films 20 to 23 were manufactured in the same way as the manufacture process of Hard Coat Film 1, except that spices of acrylic resin in the hard coat composition were changed as described in Table 3. Herein acrylic resins of A3 and A4 described in Table 3 were obtained by the same polymerization reaction as in Example 1. A3, A4 and acrylic resins obtained from the market were shown below.

A3: Monomer ratio by mass (MMA/MA=97/3), Mw 70000
A4: Monomer ratio by mass (MMA/MA=97/3), Mw 550000
DIANAL BR80 (Produced by Mitsubishi Rayon Co., Ltd.), Mw 95000

(Evaluation)

Hard Coat Films 20 to 23 manufactured described above and Hard Coat Film 1 manufactured in Example 1, were subjected to durability test and evaluation in the same way as Example 2. The obtained results are shown in Table 3.

TABLE 3

| Hard coat film No. | Com-position No. | Thermo plastic acrylic resin Species (added amount) | Mw | Substrate No. | Thermo plastic acrylic resin Species | Mw | Cellulose ester resin Mw | Content ratio * | Pencil hardness | Adhesive property | Ductile Fracture test (Brittleness evaluation) | General evaluation |
|---|---|---|---|---|---|---|---|---|---|---|---|---|
| 1 | 1 | BR85 (3.8 parts by mass) | 280000 | 1 | BR85 | 280000 | 200000 | 70/30 | 5H | AA | AA | AA |
| 13 | 3 | BR88 (3.8 parts by mass) | 480000 | 1 | BR85 | 280000 | 200000 | 70/30 | 5H | AA | AA | AA |
| 20 | 10 | A4 (5.0 parts by mass) | 550000 | 1 | BR85 | 280000 | 200000 | 70/30 | 4H | A | A | A |
| 21 | 11 | A2 (5.0 parts by mass) | 130000 | 1 | BR85 | 280000 | 200000 | 70/30 | 5H | AA | AA | AA |
| 22 | 12 | BR80 (5.0 parts by mass) | 95000 | 1 | BR85 | 280000 | 200000 | 70/30 | 4H | AA | AA | AA |
| 23 | 13 | A3 (5.0 parts by mass) | 70000 | 1 | BR85 | 280000 | 200000 | 70/30 | 3H | A | AA | A |

BR85: DIANAL BR85
BR88: DIANAL BR88
BR80: DIANAL BR80
*: Ratio of thermo plastic acrylic resin to cellulose ester resin by mass As it is understood from the results of Table 2, more excellent performance is displayed by selecting a weight average molecular weight of the acrylic resin in the hard coat layer of 80,000 to 500,000 among the hard coat films of the invention, in a condition of elongated cycle thermo time supposing outdoor use. It is understood that acrylic resin having a weight average molecular weight of, inter alia, 110,000 to 500,000, particularly excellent surface hardness is displayed and excellent performance is displayer in the other items.

Example 4

Manufacture of Hard Coat Film 24

Hard Coat Film 24 was produced by providing coating of two-layer hard coat layer and a backing layer by the procedures described below on the Film Substrate 8 manufactured in Example 1.

Coating composition of the hard coat layer was prepared by filtering Hard Coat Layer Composition 1 with a filter made of polypropylene having pore size of 0.4 μm. The obtained coating composition was coated on a surface of film substrate 1 employing an extrusion coater, was dried in a condition of temperature of 80° C. for 50 seconds, then coated layer was cured by employing UV ray lamp with intensity of illumination of irradiation portion of 100 mW/cm$^2$ and irradiation quantity of 0.1 J/cm$^2$, and Hard Coat Layer A (the first layer) having a dry thickness of 1 μm was formed. Subsequently, coating composition of Hard Coat Layer 2 was prepared by filtering Hard Coat Layer Composition 2 with a filter made of polypropylene having pore size of 0.4 μm. The prepared Hard Coat Layer Composition 2 was coated on the first hard coat layer employing an extrusion coater, was dried in a condition of temperature of 80° C. for 50 seconds, then coated layer was cured by employing UV ray lamp with intensity of illumination of irradiation portion of 300 mW/cm$^2$ and irradiation quantity of 0.3 J/cm$^2$, and Hard Coat Layer B (the second layer) having a dry thickness of 9 μm was formed. Further, Back Coat Layer Composition 1 described below was coated on a side opposite to a side provided with Hard Coat Layers A and B via an extrusion coater, so as to have a wet thickness of 8 μm, dried in a condition of temperature at 50° C. for 30 seconds, and then was wound in roll state. Thus Hard Coat Film 24 was manufactured.

(Manufacture of Hard Coat Film 25)

Hard Coat Film 25 was produced by that Hard Coat Layer Composition 14 which was prepared by changing solvent of Hard Coat Layer Composition 1 to the following solvent was coated on Film Substrate 8 manufactured Example 1, similarly to Hard Coat Film.

(Solvent)

| Methylethylketone r | 50 parts by mass |
| Methyl acetate | 50 parts by mass |

(Evaluation)

Hard Coat Films 24 and 25 manufactured described above and Hard Coat Film 8 manufactured in Example 1, were evaluated in the same way as Example 1 except that the condition of durability test was modified as described below. The obtained results are shown in Table 4.

(Durability Test)

Test pieces in a size of 15 cm×15 cm were cut out from each rolls of the above described manufactured hard coat film. They were put to a cycle thermo (cycle of standing for 30 minutes at −40° C., followed by standing for 30 minutes at 85° C., alternatively) in which number of cycles changed to 600 in place of 500 cycles supposing outdoor use, thereafter, durability test was conducted by light irradiation to the surface of the hard coat layer by means of Sun Shine Carbon Arc for 20 days. The hard coat films subjected to the durability test were conditioned at temperature 23° C. and relative humidity of 55% for 24 hours, and were evaluated.

Further, as for Hard Coat Film 25, film substrate and neighborhood around interface of the hard coat layer was cut by means of a microtome, content ratio of acrylic resin at the cut face and the hard coat layer surface was measured by means of TOF-SIMS (time-of-flight secondary ion mass spectrometry). As the result, acrylic resin content ratio at a face cut in the neighborhood around interface of film substrate and the hard coat layer is higher than that of Hard Coat Film 8.

TABLE 4

| | Hard coat layer | | | | | | | Film substrate | | | | Evaluation | | | |
|---|---|---|---|---|---|---|---|---|---|---|---|---|---|---|---|---|
| | Hard coat layer A (First layer) | | | | Hard coat layer B (Second layer) Thermo plastic acrylic resin | | | | | | | | | | | |
| Hard Coat Film No. | Composition No. | Thermo plastic acrylic resin Species (added amount) | Mw | Solvent | Thickness μm | Composition No. | Species | Mw | Thickness μm | Substrate No. | Thermo plastic acrylic resin Species | Mw | Cellulose ester resin Mw | Content ratio * | Pencil Hardness | Adhesive property | *1 | *2 |
| 8 | 1 | BR85 (3.8 parts by mass) | 280000 | *A | 10 | — | — | — | — | 8 | BR88 | 480000 | 200000 | 70/30 | 4H | A | AA | A |
| 24 | 1 | BR85 (3.8 parts by mass) | 280000 | *A | 1 | 2 | — | — | 9 | 8 | BR88 | 480000 | 200000 | 70/30 | 5H | AA | AA | AA |

TABLE 4-continued

| | Hard coat layer | | | | | | | | | | | | | | |
|---|---|---|---|---|---|---|---|---|---|---|---|---|---|---|---|
| | Hard coat layer A (First layer) | | | | Hard coat layer B (Second layer) | | | | Film substrate | | | | Evaluation | | |
| | | Thermo plastic acrylic resin | | | | | Thermo plastic acrylic resin | | | | Thermo plastic acrylic resin | | | | | |
| Hard Coat Film No. | Com- posi- tion No. | Species (added amount) | Mw | Sol- vent | Thick- ness μm | Com- posi- tion No. | Spe- cies | Mw | Thick- ness μm | Sub- strate No. | Spe- cies | resin Mw | Cellu- lose ester resin Mw | Con- tent ratio * | Pen- cil Hard- ness | Ad- he- sive prop- erty | *1 | *2 |
| 25 | 15 | BR85 (3.8 parts by mass) | 280000 | *B | 10 | — | — | — | — | 8 | BR88 | 480000 | 200000 | 70/30 | 4H | AA | AA | AA |

BR85: DIANAL BR85
BR88: DIANAL BR88
*A: Propyleneglycol monomethylether/methyl acetate
*B: Methylethyl ketone/methyl acetate
*1: Ductile Fracture test (Brittleness evaluation)
*2: General Evaluation
*: ratio of thermo plastic acrylic resin to cellulose ester resin by mass It is understood from the result shown in Table 4 to have an excellent performance by that a hard coat layer is composed of multi-layer material and the hard coat layer adjacent to the film substrate contains acrylic resins among the hard coat films of the invention in severer durability test.

Further, it is understood by employing a solvent dissolving film substrate in a hard coat layer composition, content ratio of acrylic resin in an area in which film substrate is adjacent to hard coat layer can be enhanced, and a result is obtained more excellent in adhesive property.

Example 5

Manufacture of Hard Coat Films 26 to 30

Hard Coat Films 26 to 30 were manufactured in the same way as the manufacture process of Hard Coat Film 1 except that, Film Substrate 1 was changed to Film Substrates 11 to 15.
(Manufacture of Film Substrate 11)
(Preparation of Acrylic Particles (C1))
Into a reaction vessel having inner content of 60 liter equipped with a reflux condenser, 38.2 liter of ion exchanged water and 111.6 g of sodium dioctylsulfosuccinate were charged, and temperature was raised to 75° C. while stirring at 250 rpm rotation under nitrogen atmosphere, without influence by oxygen substantially. APS in an amount of 0.36 g was poured, after 5 minutes stirring, a mixture of monomers composed of 1657 g of MMA, 21.6 g of BA, and 1.68 g of ALMA was added together, and polymerization of an innermost hard layer was completed by keeping for 20 minutes after detection of exothermic peak.

Subsequently, 3.48 g of APS were poured, after 5 minutes stirring a mixture of monomers composed of 8105 g of BA, 31.9 g of PEGDA (200) and 264.0 g of ALMA was added continuously taking for 120 minutes, and polymerization of a soft layer was completed by keeping for 120 minutes after completion of addition.

Subsequently, 1.32 g of APS were poured, after 5 minutes stirring a mixture of monomers composed of 2106 g of MMA and 201.6 g of BA was added continuously taking for 20 minutes, and polymerization of an outermost hard layer was completed by keeping for 20 minutes after completion of addition.

Subsequently, 1.32 g of APS were poured, after 5 minutes a mixture of monomers composed of 3148 g of MMA, BA201.6 g and 10.1 g of n-OM was added continuously taking for 20 minutes, and was kept for 20 minutes after addition. Subsequently temperature was raised to 95° C. and polymerization of an outermost hard layer 2 was completed by keeping for 60 minutes.

The obtained polymer latex was poured into warm aqueous solution of 3% by mass of sodium sulfate, and was subjected to salting out and aggregation, then, was dried after repeated dehydration and washing, acrylic particles having three layers (C1) was obtained. An average particle size was 100 nm via absorptiometric method.

Abbreviations described above are materials described below respectively.
MMA: Methylmethacrylate
MA: Methylacrylate
BA: n-Butylacrylate
ALMA: Allylmethaciylate
PEGDA: Poly ethyleneglycol diacrylate (molecular weight 200)
n-OM: n-Octyl mercaptan
APS: Ammonium persulfate
(Manufacture of Film Substrates 11 to 15)

| (Dope Liquid Composition 11) | |
|---|---|
| DIANAL BR85 (Produced by Mitsubishi Rayon Co., Ltd.) | 70 parts by mass |
| Cellulose ester (cellulose acetate propionate, acyl group total substitution degree 2.75, an acetyl group a substitution degree 0.19, propionyl group substitution degree 2.56, Mw = 200000) | 30 parts by mass |
| Methylene chloride | 300 parts by mass |
| Ethanol | 40 parts by mass |
| Acrylic particles (C1) prepared described above | 21 parts by mass |

The above described composition was dissolved sufficiently with stirring, and dope liquid was manufactured. Subsequently, Film Substrate 11 was manufactured in the same manner as manufacturing method of Film Substrate 1 of Example 1.

Subsequently, dope liquid was prepared in the same manner except that added amount of acrylic particles (C1) in Dope Liquid Composition 11 was modified to those described in Table 5, and Film Substrates 12 to 15 were manufactured in the same manner as manufacturing method of Film Substrate 1.

(Evaluation)

Durability test and evaluation were conducted for Hard Coat Films 26 to 30 manufactured described above in the same manner as Example 4 conducted in Hard Coat Film 1 manufactured Example 1. The result is shown in Table 5.

300 mW/cm² and irradiation quantity of 0.35 J/cm², conducting nitrogen purging so that atmosphere was oxygen concentration of 0.5 volume % or less.

(Preparation of Coating Composition 1 for Low Refractive Index Layer (Coating Composition for Low Refractive Index Layer Containing Cationic Polymerization Compound))

(Preparation of Fluorine Containing Epoxy Compound 1)

To a mixture of 81.03 g of 1,3-dihydroxy hexafluoroisopropylbenzene and 185 g of epichlorohydrin, 16.27 g of sodium hydroxide and 40 ml of water added, and they were allowed to reflux with heating under stirring. After 3 hours reaction at 130° C., it was cooled by standing, generated sodium chloride was removed by aspirator filtration. Resulting filtered liquid was extracted by chloroform water, organic phase was dried, filtered and condensed to obtain 95.7 g of fluorine containing epoxy compound 1.

TABLE 5

| | Hard coat layer | | | Film substrate | | | | | | Evaluation | | | |
|---|---|---|---|---|---|---|---|---|---|---|---|---|---|
| | | Thermo plastic acrylic resin | | | | | Acrylic | | | | | Ductile | |
| Hard coat film No. | Composition No. | Species (added amount) | Mw | Substrate No. | Thermo plastic acrylic resin Species | Mw | Cellulose ester resin Mw | Content ratio *1 | Acrylic resin particles (added amount) | *2 | Pencil hardness | Adhesive property | Fracture test (Brittleness evaluation) | General evaluation |
| 1 | 1 | BR85 (3.8 parts by mass) | 280000 | 1 | BR85 | 280000 | 200000 | 70/30 | — | — | 4H | A | AA | A |
| 26 | 1 | BR85 (3.8 parts by mass) | 280000 | 11 | BR85 | 280000 | 200000 | 70/30 | C1 (21 parts by mass) | 21/100 | 5H | AA | A | AA |
| 27 | 1 | BR85 (3.8 part by mass) | 280000 | 12 | BR85 | 280000 | 200000 | 70/30 | C1 (0.5 parts by mass) | 0.5/100 | 5H | AA | AA | AA |
| 28 | 1 | BR85 (3.8 parts by mass) | 280000 | 13 | BR85 | 280000 | 200000 | 70/30 | C1 (0.3 parts by mass) | 0.2/100 | 5H | AA | AA | AA |
| 29 | 1 | BR85 (3.8 parts by mass) | 280000 | 14 | BR85 | 280000 | 200000 | 70/30 | C1 (30 parts by mass) | 30/100 | 5H | AA | A | AA |
| 30 | 1 | BR85 (3.8 parts by mass) | 280000 | 15 | BR85 | 280000 | 200000 | 70/30 | C1 (35 parts by mass) | 35/100 | 4H | A | A | A |

BR85: DIANAL BR85
*1: Ratio of thermo plastic acrylic resin to cellulose ester resin by mass
*2: Mass ratio of acrylic resin particles to total mass of thermo plastic acrylic resin and cellulose ester resin It is understood from the result shown in Table 5 to have an excellent performance by that a film substrate contains acrylic particles, and content ratio by mass of acrylic particles to total mass of the acrylic resins and the cellulose ester resin is arranged satisfying in the range of acrylic particles/total mass of the acrylic resins and the cellulose ester resin=0.5/100 to 30/100 among the hard coat films of the invention in severer durability test.

Example 6

Manufacture of an Anti-Reflection Films 1 to 14

Hard Coat Films 1 to 14 manufactured in Example 1 were respectively unwound, and low refractive index layer coating composition 1 described below was coated on the hard coat layer surface via a micro gravure water so as to have a dry thickness of 85 nm, dried at temperature 80° C. for 1 minute, subsequently was cured by employing UV ray lamp irradiation portion condition of intensity of illumination of (Cationic polymerization compound)

| | |
|---|---|
| [1-(3-Ethyl3-oxetanyl)methyl]ether | 6.5 parts by mass |
| 3,4-Epoxy-6-methylcyclohexylmethylcarboxylate | 0.5 parts by mass |
| Fluorine containing epoxy compound 1 | 2 parts by mass |

(Cationic polymerizable initiator)

| | |
|---|---|
| Triallysulfonium hexafluorophoshpine salt | 0.2 parts by mass |

(Microparticles)

| | |
|---|---|
| Hollow silica microparticles sol dispersed in isopropyl alcohol (solid substance 20%, silica sol, trade name of ELCOM V-8209, product by Shokubai Kasei Kogyo Co., Ltd.) | 6.9 parts by mass |

(Additive)

| | |
|---|---|
| 10% propyleneglycol monoethylether liquid Silicone compound (FZ-2207, produced by Nippon Unicar Co., Ltd.) | 0.9 parts by mass |

-continued (Solvent)

| | |
|---|---|
| Methylisobutyl ketone | 90 parts by mass |
| Methylethylketone | 30 parts by mass |

Among the coating composition 1 for low refractive index layer above described compounds other than hollow silica microparticles sol dispersed in isopropyl alcohol were mixed and dissolved in methylisobutyl ketone and methylethylketone in the ratio described above, then hollow silica microparticles sol dispersed in isopropyl alcohol was added in the refractive index of low refractive index layer composed of low refractive index layer coating composition 1 was 1.37.

Durability test and evaluation were conducted for Anti-reflection Films 1 to 14 manufactured described above in the same manner as Example 1, and further an anti-abrasion property was evaluated in the condition described below. The result is shown in Table 6.
(Evaluation of Anti-Reflection Film)
(Test)
(Anti-Abrasion Property)

Steel wool (SW) of #0000 was allowed to go and return ten times on the low refractive index layer surface of the anti-reflection film with applying load of 1,000 $g/cm^2$, and number of the abraded streaks per 1 cm width was measured. The number of the abraded streaks was measured in an area where the abraded streaks were observed most in the area to which load was applied. Evaluation was conducted according to criteria described below. The apparatus by which steel wool was allowed to go and return was SHINTO Scientific Co., Ltd. abrasion tester (TRIBOSTATION TYPE: 32, moving speed: 4000 mm/min).

Anti-Abrasion Property Evaluation Criteria:

AA: 1 line/cm or less

A: 5 lines/cm or less

B: 10 lines/cm or less

C: more than 10 line/cm (General Evaluation)

General evaluation was conducted based on the result of pencil hardness, adhesive properties, an anti-abrasion property and brittleness according to following criteria.

AA: Pencil hardness is 4H or higher, and, at least one of adhesive property, anti-abrasion property and brittleness is ranked AA, and the others A.

A: Pencil hardness is 4H or higher, and, all of adhesive property, anti-abrasion property and brittleness is ranked A or AA.

B: Pencil hardness is 3H or higher, and, adhesive properties is ranked B or worse, anti-abrasion property B or worse, or brittleness C (practically unacceptable level).

C: Pencil hardness is 2H or lower, and, adhesive properties is ranked B or worse, anti-abrasion property B or worse or brittleness C.

TABLE 6

| Anti-reflection film No. | Low refractive index layer Composition | Hard coat layer Composition No. | Hard coat layer Thermo plastic acrylic resin Species (added amount) | Hard coat layer Thermo plastic acrylic resin Mw | Film substrate Substrate No | Film substrate Thermo plastic acrylic resin Species | Film substrate Thermo plastic acrylic resin Mw |
|---|---|---|---|---|---|---|---|
| 1 | *A | 1 | BR85 (3.8 parts by mass) | 280000 | 1 | BR85 | 280000 |
| 2 | *A | 1 | BR85 (3.8 parts by mass) | 280000 | 2 | BR85 | 280000 |
| 3 | *A | 1 | BR85 (3.8 parts by mass) | 280000 | 3 | BR85 | 280000 |
| 4 | *A | 1 | BR85 (3.8 parts by mass) | 280000 | 4 | BR85 | 280000 |
| 5 | *A | 1 | BR85 (3.8 parts by mass) | 280000 | 5 | BR85 | 280000 |
| 6 | *A | 1 | BR85 (3.8 parts by mass) | 280000 | 6 | MS1 | 100000 |
| 7 | *A | 1 | BR85 (3.8 parts by mass) | 280000 | 7 | A2 | 130000 |
| 8 | *A | 1 | BR85 (3.8 parts by mass) | 280000 | 8 | BR88 | 480000 |
| 9 | *A | 1 | BR85 (3.8 parts by mass) | 280000 | 9 | A1 | 550000 |
| 10 | *A | 1 | BR85 (3.8 parts by mass) | 280000 | 10 | B1 | 244000 |
| 11 | *A | 2 | — | — | 7 | A2 | 130000 |
| 12 | *A | 2 | — | — | 8 | BR88 | 480000 |
| 13 | *A | 3 | BR83 (3.8 parts by mass) | 480000 | 1 | BR85 | 280000 |
| 14 | *A | 4 | BR85 (5.0 parts by mass) | 280000 | 1 | BR85 | 280000 |

| Anti-reflection film No. | Film substrate Cellulose ester resin Mw | Content ratio * | Evaluation Pencil hardness | Evaluation Adhesive property | Evaluation Anti-abrasion property | *1 | *2 | Remarks |
|---|---|---|---|---|---|---|---|---|
| 1 | 200000 | 70/30 | 5H | AA | AA | AA | AA | Inv. |
| 2 | 200000 | 94/6 | 5H | AA | A | AA | A | Inv. |
| 3 | 200000 | 98/2 | 3H | C | B | C | B | Comp. |
| 4 | 200000 | 52/48 | 5H | AA | AA | AA | AA | Inv. |
| 5 | 200000 | 48/52 | 2H | B | C | A | C | Comp. |
| 6 | 200000 | 70/30 | 4H | A | A | A | A | Inv. |
| 7 | 200000 | 70/30 | 5H | AA | AA | AA | AA | Inv. |
| 8 | 200000 | 70/30 | 5H | AA | AA | AA | AA | Inv. |
| 9 | 200000 | 70/30 | 4H | A | A | A | A | Inv. |
| 10 | — | 100 | 5H | C | B | C | B | Comp. |
| 11 | 200000 | 70/30 | 2H | C | C | A | C | Comp. |

TABLE 6-continued

| 12 | 200000 | 70/30 | 2H | B  | C  | A  | C  | Comp. |
|----|--------|-------|----|----|----|----|----|-------|
| 13 | 200000 | 70/30 | 5H | AA | AA | AA | AA | Inv.  |
| 14 | 200000 | 70/30 | 5H | AA | AA | AA | AA | Inv.  |

*A: Cationic polymerizable
BR85: DIANAL BR85
BR88: DIANAL BR88
*1: Ductile Fracture test (Brittleness evaluation)
*2: General evaluation
Inv.: Invention
Comp.: Comparative example
* ratio of thermo plastic acrylic resin to cellulose ester resin by mass It is understood from the result shown in Table 6 that anti-reflection films provided with a low refractive index layer on the hard coat film of the invention are excellent in all properties of an anti-abrasion property, adhesive properties, surface hardness, and ductile after a durability test in comparison with comparative samples.

Example 7

Manufacture of Anti-Reflection Film 17

Hard Coat Film 8 manufactured in Example 1 were respectively unwound, and low refractive index layer coating composition 1 described below was coated on the hard coat layer surface via a micro gravure coater so as to have a dry thickness of 85 nm, dried at temperature 80° C. for 1 minute, subsequently was cured by employing UV ray lamp irradiation portion condition of intensity of illumination of 300 mW/cm$^2$ and irradiation quantity of 0.35 J/cm$^2$, conducting nitrogen purging so that atmosphere was oxygen concentration of 0.5 volume % or less.
(Preparation of Coating Composition 2 for Low Refractive Index Layer (Coating Composition for Low Refractive Index Layer Containing Cationic Polymerization Compound))
(Preparation of Fluorine Containing Polymer 1)

Into an autoclave equipped with a stirring device made of stainless steel having capacity of 100 ml, 40 ml of ethyl acetate, 14.7 g of hydroxy ethylvinyl ether and 0.55 g of dilauroyl peroxide were charged, and reaction system was deairized and substituted with nitrogen gas. Further, 25 g of hexafluoropropylene (HFP) was introduced into the autoclave, and temperature was raised to 65° C. Pressure at a time of temperature inside of autoclave reached at 65° C. was 5.4 kg/cm$^2$. Temperature inside of autoclave was kept, and reaction was continued for 8 hours. Heating was terminated when the pressure reaches 3.2 kg/cm$^2$, and it was allowed to cool by standing. Un reacted monomers were exhausted at a time that the inner temperature reached to room temperature, autoclave was opened and reacted liquid was took out.

The obtained reaction liquid was poured into much excess amount of hexane, and solvent was removed by decantation whereby precipitated polymer was taken out. The polymer was dissolved in a small quantity of ethyl acetate, and then reprecipitation was conducted from hexane twice whereby remaining monomers were removed completely, and 28 g of polymer was obtained by drying. Subsequently, 20 g of the polymer was dissolved in 100 ml of N,N-dimethylacetoamide, 11.4 g of acrylic acid chloride was dripped while cooling by ice. After that it was stirred at room temperature for 10 hours. Ethyl acetate was added to reaction liquid, following to water washing. Organic phase was extracted and condensed, and obtained polymer was subjected to reprecipitation by hexane, and 19 g of fluorine containing polymer 1 was obtained.

| (Coating Composition 2 for low refractive index layer) | |
|---|---|
| (Solvent) | |
| Methylethylketone | 460 parts by mass |
| Cyclohexanone | 300 parts by mass |
| (Radical polymerization compounds) | |
| Fluorine containing polymer 1 | 30 parts by mass |
| A-DPH (mixture of dipentaerythritol pentaacrylate and dipentaerythritol hexaacrylate, produced by Shin-Nakamura Chemical Co., Ltd.) | 34 parts by mass |
| (Photopolymerizable initiator) | |
| IRGACURE 907 (Produced by Ciba Japan Ltd.) | 3 parts by mass |
| (Additive) | |
| Silicone compound (FZ-2207, produced by Nippon Unicar Co., Ltd) 10% liquid of propyleneglycol monoethylether | 6.5 parts by mass |
| (Microparticles) | |
| Hollow silica microparticles sol dispersed in isopropyl alcohol (solid substance 20%, silica sol, trade name of ELCOM V-8209, product by Shokubai Kasei Kogyo Co., Ltd.) | 50 parts by mass |

Among above described coating composition 1 for low refractive index layer, fluorine containing polymer 1 previously prepared, silicone resin containing methacrylate group, photo-polymerization initiator and A-DPH were added and dissolved in the above described blend ratio to methylethylketone and cyclohexanone, thereafter, hollow silica microparticles sol dispersed in isopropyl alcohol was added in the above described blend ratio. Further, refractive index of the low refractive index layer composed of low refractive index layer coating composition 2 was 1.37.

Evaluation was conducted for Anti-reflection Film 17 manufactured as described above and Anti-reflection Film 8 manufactured in Example 6, in the same manner as Example 6 except that condition of durability test was changed to that described below. Result was shown in Table 7.
(Durability Test)

Test pieces in a size of 15 cm×15 cm were cut out from each rolls of the above described manufactured hard coat film. They were put to a cycle thereto (cycle of standing for 30 minutes at −40° C., followed by standing for 30 minutes at 85° C., alternatively) in which number of cycles changed to 600 in place of 500 cycles supposing outdoor use, thereafter, durability test was conducted by light irradiation to the surface of the hard coat layer by means of Sun Shine Carbon Arc for 25 days in place of 20 days.

The hard coat films subjected to the durability test were conditioned at temperature 23° C. and relative humidity of 55% for 24 hours, and were evaluated.

Step 2: The above described polarizing film was immersed in a polyvinylalcohol adhesive tank containing solid substance 2% by mass for 1 to 2 seconds.

TABLE 7

| Anti-reflection film No. | Low refractive index layer Composition | Hard coat layer Composition No. | Thermo plastic acrylic resin Species (added amount) | Mw | Film substrate Substrate No | Film substrate Thermo plastic acrylic resin Species | Film substrate Thermo plastic acrylic resin Mw |
|---|---|---|---|---|---|---|---|
| 8 | *A | 1 | BR85 (3.8 parts by mass) | 280000 | 8 | BR88 | 480000 |
| 17 | *B | 1 | BR85 (3.8 parts by mass) | 280000 | 8 | BR88 | 480000 |

| Anti-reflection film No. | Film substrate Cellulose ester resin Mw | Content ratio * | Evaluation Pencil hardness | Adhesive property | Anti-abrasion | Ductile Fracture test (Brittleness evaluation) | General Evaluation |
|---|---|---|---|---|---|---|---|
| 8 | 200000 | 70/30 | 5H | AA | AA | AA | AA |
| 17 | 200000 | 70/30 | 4H | A | A | AA | A |

*A: Cationic polymerizable
*B: Radical polymerizable
BR85: DIANAL BR85
BR88: DIANAL BR88
* ratio of thermo plastic acrylic resin to cellulose ester resin by mass As it is understood from the results of Table 7 that an anti-reflection film having low refractive index layer composed of radical polymerization compound has more excellent anti-abrasion property, adhesive properties and surface hardness than an anti-reflection film having low refractive index layer composed of cationic polymerization compound in severe durability test.

Example 8

A polarizing plate was manufactured using each of Anti-reflection Films 1 to 14 and a retardation film Konica Minolta TAC KC4FR-2 (produced by Konica Minolta Opto, Inc.), as a polarizing plate protecting film, according to the following method.
(a) Manufacture of a Polarizing Film Long size polyvinylalcohol film having a thickness of 120 μm was subjected to mono-axis stretching (temperature 110° C., stretching factor of 5 times). This was immersed in an aqueous solution composed of 0.075 g of iodine, 5 g of potassium iodide and 100 g of water for 60 seconds, then was immersed in an aqueous solution composed of 6 g of potassium iodide, 7.5 g of boric acid and 100 g of water at 68° C. This was waster washed and dried and long size polarizing film was obtained.
(b) Manufacture of a Polarizing Plate Subsequently, a polarizing plate was produced by pasting a polarizing film to a protecting film for a polarizing plate, according to the steps 1 to 5 described below.

Step 1: Each of anti-reflection films and KC4FR-2 were immersed in 2 mol/L of potassium hydroxide solution at 50° C. for 90 seconds, followed by water washing and drying. Here an anti-reflection film was protected by adhering peelable protecting film (made of PET) on its anti-reflection layer surface, preliminary.

Step 3: Excess adhesive adhered to polarizing film in Step 2 was briefly removed, and this was interposed between KC4FR-2 subjected to alkali treatment in Step 1 and an anti-reflection film, and was arranged in lamination.

Step 4: These were pasted into together by 2 rotating rollers at a pressure of 20 to 30 N/cm² at a 2 m/min speed. This was conducted carefully so that air bubble was not introduced.

Step 5: The polarizing plate was produced by drying the sample manufactured in Step 4 at 80° C. for 2 minutes.

The polarizing plate on the outermost surface of a commercial liquid crystal display panel (NEC, color liquid crystal display, MultiSync LCD1525J: model LA-1529HM) was carefully removed, and the above polarizing plate of 10 cm square was pasted while the polarizing direction lay in the same direction. Thus obtained liquid crystal panels 101 to 114 were placed on a desk with a height of 80 cm from the floor, and ten of the set composed of two straight tube daylight fluorescent 40 W lamps (FLR40S-D/M-X, produced by Matsushita Electric Industrial Co., Ltd.) were arranged with an interval of 1.5 m at the ceiling with a height of 3 m from the floor. The fluorescent lamps were arranged so that the lamps were lined at the ceiling in the direction of from the overhead to backward of the observer when the observer placed under the front of the displaying face. The liquid crystal panel was slanted 25° to the perpendicular line of the desk so that the fluorescent lamps were reflected on the panel surface. The easiness of looking of the image (visibility) was classified into the following ranking for evaluation. Further, luminescent foreign materials in the liquid crystal panels 101 to 114 manufactured described above was evaluated according to the following ranks. Result was shown in Table 7.

(Evaluation)
(Visibility)

AA: The reflection of the fluorescent lamps did not attract notice of the observer, and letters of a font size not more than 8 could be read clearly.

A: The reflection of the nearly arranged fluorescent lamps somewhat attracted notice of the observer, but the ones far position did not attract, notice of the observer, and letters of a font size not more than 8 could be barely read.

B: The reflection of the nearly arranged fluorescent lamps attracted notice of the observer, and letters of a font size not more than 8 could be hardly read.

C: The reflection of the nearly arranged fluorescent lamps considerably attracted notice of the observer, and letters of a font size not more than 8 could not be read.

(Luminescent Foreign Materials)

Display of each of liquid crystal panels 101 to 114 was made whole black, and diameter and number of luminescent foreign materials were counted by a magnifier, and were evaluated according to criteria described below. Magnifying factor of the magnifier was 50 times.

A: Luminescent foreign materials of 100 µm or more are not observed.

C: Luminescent foreign materials of 100 µm or more are observed. (Practically unacceptable level).

TABLE 8

| Display panel No. | Anti-reflection film No. | Visibility | Luminescent foreign materials | Remarks |
|---|---|---|---|---|
| 101 | 1 | A | A | Invention |
| 102 | 2 | B | A | Invention |
| 103 | 3 | C | C | Comparative example |
| 104 | 4 | B | A | Invention |
| 105 | 5 | C | C | Comparative example |
| 106 | 6 | A | A | Invention |
| 107 | 7 | A | A | Invention |
| 108 | 8 | A | A | Invention |
| 109 | 9 | A | A | Invention |
| 110 | 10 | C | C | Comparative example |
| 111 | 11 | C | C | Comparative example |
| 112 | 12 | C | C | Comparative example |
| 113 | 13 | A | A | Invention |
| 114 | 14 | A | A | Invention |

As a result of evaluation, liquid crystal display devices employing anti-reflection films of the invention were good both at visibility and luminescent foreign materials in comparison with those employing anti-reflection films of comparative examples.

Example 9

Polarizing plate was manufactured employing each of hard coat films 1 to 14 and a piece of retardation film Konica Minolta TAC KC4FR-2 (produced by Konica Minolta Opto, Inc.) as a polarizing plate protecting film for each according to a method described below.

(a) Manufacture of Polarizing Film

Long size polyvinylalcohol film having a thickness of 120 µm was subjected to mono axis stretching (temperature 110° C., stretching factor of 5 times). This was immersed in an aqueous solution composed of 0.075 g of iodine, 5 g of potassium iodide and 100 g of water for 60 seconds, then was immersed in an aqueous solution composed of 6 g of potassium iodide, 7.5 g of boric acid and 100 g of water at 68° C. This was waster washed and dried and long size polarizing film was obtained.

(b) Manufacture of a Polarizing Plate

Subsequently, a polarizing plate was produced by pasting a polarizing film to a protecting film for a polarizing plate, according to the steps 1 to 5 described below.

Step 1: Each of anti-reflection films and KC4FR-2 were immersed in 2 mol/L of potassium hydroxide solution at 50° C. for 90 seconds, followed by water washing and drying. Here an anti-reflection film was protected by adhering peelable protecting film (made of PET) on its anti-reflection layer surface, preliminary.

Step 2: The above described polarizing film was immersed in a polyvinylalcohol adhesive tank containing solid substance 2% by mass for 1 to 2 seconds.

Step 3: Excess adhesive adhered to polarizing film in Step 2 was briefly removed, and this was interposed between KC4FR-2 subjected to alkali treatment in Step 1 and an anti-reflection film, and was arranged in lamination.

Step 4: These were adhered into together by 2 rotating rollers at a pressure of 20 to 30 N/cm² at a 2 m/min speed. This was conducted carefully so that air bubble was not introduced.

Step 5: The polarizing plate was produced by drying the sample manufactured in Step 4 at 80° C. for 2 minutes.

The polarizing plate on the outermost surface of a commercial liquid crystal display panel (NEC, color liquid crystal display, MultiSync LCD1525J: model LA-1529HM) was carefully removed, and the above polarizing plate of 10 cm square was pasted while the polarizing direction lay in the same direction. Thus obtained liquid crystal panels 201 to 214 were placed on a desk with a height of 80 cm from the floor, and ten of the set composed of two straight tube daylight fluorescent 40 W lamps (FLR40S•D/M-X, produced by Matsushita Electric industrial Co., Ltd.) were arranged with an interval of 1.5 m at the ceiling. The fluorescent lamps were arranged so that the lamps were lined at the ceiling in the direction of from the overhead to backward of the observer when the observer placed under the front of the displaying face. Further, flatness of liquid crystal panels 201 to 214 manufactured described above was evaluated according to following criteria.

AA: Fluorescent tube is observed straight.

A: Fluorescent tube is observed slightly rounded partly.

B: Fluorescent tube is observed rounded.

C: Fluorescent tube is observed waved.

As the result of the evaluation, flatness of liquid crystal display devices using hard coat films of the invention was good as ranked AA, and flatness of those using hard coat films of comparative example was ranked C or B.

Example 10

The same experiment was conducted in the same manner as Example 1 by changing solvents of coating composition of hard coat layer and film substrates in manufacture of hard coat films 11 and 12 in Example 1 to those described in Table 9. Herein, content of thermoplastic acrylic resin in the hard coat layer was described in Table 9 measured in a hard coat film state.

TABLE 9

| Hard coat film No. | Solvent of coating composition of hard coat layer | Film substrate | | | | | |
|---|---|---|---|---|---|---|---|
| | | Substrate No. | Thermo plastic acrylic resin Species | Mw | Cellulose ester resin Mw | Content ratio *1 | *2 |
| 31 | (1) | 8 | DIANAL BR88 | 480000 | 200000 | 70/30 | 0.1 |
| 32 | (1) | 1 | DIANAL BR85 | 280000 | 200000 | 70/30 | 0.1 |
| 33 | (1) | 4 | B1 | 244000 | 200000 | 70/30 | 0.2 |
| 34 | (1) | 7 | A2 | 130000 | 200000 | 70/30 | 0.5 |
| 35 | (1) | 6 | MS1 | 110000 | 200000 | 70/30 | 0.8 |
| 36 | (1) | 16 | *3 | 100000 | 200000 | 70/30 | 0.8 |
| 37 | (1) | 17 | DIANAL BR80 | 95000 | 200000 | 70/30 | 0.9 |
| 38 | (1) | 18 | A3 | 70000 | 200000 | 70/30 | 1.1 |
| 12 | (2) | 8 | DIANAL BR88 | 480000 | 200000 | 70/30 | not detected |
| 39 | (2) | 1 | DIANAL BR85 | 280000 | 200000 | 70/30 | not detected |
| 40 | (2) | 4 | B1 | 244000 | 200000 | 70/30 | not detected |
| 11 | (2) | 7 | A2 | 130000 | 200000 | 70/30 | not detected |
| 41 | (2) | 6 | MS1 | 110000 | 200000 | 70/30 | not detected |
| 42 | (2) | 16 | *3 | 100000 | 200000 | 70/30 | not detected |
| 43 | (2) | 17 | DIANAL BR80 | 95000 | 200000 | 70/30 | not detected |
| 44 | (2) | 18 | A3 | 70000 | 200000 | 70/30 | not detected |
| 45 | (3) | 7 | A2 | 130000 | 200000 | 70/30 | not detected |

| Hard coat film No. | Pencil hardness | Adhesive property | Ductile Fracture test (Brittleness evaluation) | General evaluation | Remarks |
|---|---|---|---|---|---|
| 31 | 4H | A | A | A | Invention |
| 32 | 4H | A | A | A | Invention |
| 33 | 3H | A | A | A | Invention |
| 34 | 3H | A | A | A | Invention |
| 35 | 3H | A | A | A | Invention |
| 36 | 3H | A | A | A | Invention |
| 37 | 3H | A | A | A | Invention |
| 38 | 3H | A | A | A | Invention |
| 12 | 2H | B | A | C | Comparative example |
| 39 | 3H | C | A | B | Comparative example |
| 40 | 3H | C | A | B | Comparative example |
| 11 | 2H | C | A | C | Comparative example |
| 41 | 2H | C | A | C | Comparative example |
| 42 | H | C | C | C | Comparative example |
| 43 | H | C | C | C | Comparative example |
| 44 | H | C | C | C | Comparative example |
| 45 | 2H | C | A | C | Comparative example |

(1) Mixture solvent of 1/1 methylethyl ketone and methyl acetate
(2) Isopropyl alcohol
(3) propylene glycol monomethyl ether
*1: Ratio of thermo plastic acrylic resin to cellulose ester resin by mass
*2: Content ratio of thermo plastic acrylic resin in hard coat layer
*3 ACRYPET V(produced by Mitsubishi Rayon Co., Ltd.)

As a result of the valuation, thermoplastic acrylic resin in the film substrate elutes into a liquid in a coating liquid state of the hard coat layer and can incorporate in a hard coat layer, by using a solvent dissolving thermoplastic acrylic resin (1/1 mixture solvent of methylethylketone and methyl acetate) as a solvent of coating composition, though thermoplastic acrylic resin is not contained in a hard coat layer composition, and a benefit of the invention is obtained.

2. Study of Optical Film Having Back Coat Layer

The term of % represents % by mass without particular note.

Example 1

Manufacture of Optical Film 1

(Manufacture of Acrylic Resin-Containing Film A1)
(Preparation of Dope Liquid for A1)
Acrylic resin (A):

| | |
|---|---|
| BR100 (acrylic resins, produced by Mitsubishi Rayon Co., Ltd.) | 70 parts by mass |
| Cellulose ester resin (B) cellulose ester (cellulose acetate propionate acyl group total substitution degree 2.75, an acetyl group a substitution degree 0.19, propionyl group substitution degree 2.56, Mw = 200,000) | 30 parts by mass |
| Methylene chloride | 264 parts by mass |
| Ethanol | 36 parts by mass |

(Film Forming of Acrylic Resin-Containing Film A1)

The dope liquid for A1 manufactured as described above was cast on a belt support made of stainless steel uniformly by employing a belt cast apparatus in 2 m width at a temperature of 22° C. Solvent was evaporated on the belt support made of stainless steel until solvent concentration (amount of residual solvent) reaches 100%, and the film was peeled from the belt support made of stainless steel at peeling tension of 162 N/m. In this instance, required time from casting to peeling was 100 seconds. Solvent in the peeled acrylic resin web was evaporated at 35° C., and was slit in 1.6 m width. Thereafter, it was dried at drying temperature of 135° C. while stretching 1.1 times via a tenter in wide direction. Herein remaining solvent concentration when the stretching was started via a tenter was 10% by mass. After conducting relaxation at 130° C. for 5 minutes subsequent to stretching via a tenter, drying was completed while conveying through drying zones at 120° C. and 130° C. with a plenty of rolls. It was slit in 1.5 m width, was subjected to knurling treatment on both side of film with width of 10 mm and height of 5 µm, was wound on a core having inner diameter of 6 inch with initial tension of 220 N/m, and terminating tension of 110 N/m, and thus acrylic resin-containing film A1 was obtained. Stretching magnification in MD direction calculated based rotation speed of the belt support made of stainless steel and operation speed of the tenter was 1.1 times. Remaining solvent concentration of acrylic resin-containing film A1 described in Table 10 was 0.1% by mass and thickness was 60 µm, winding length was 4,000 m.

(Manufacture of resin layer C1)
(Preparation of manufacturing liquid composition for C1)

| | |
|---|---|
| Cellulose ester resin (C): Cellulose ester (cellulose acetate propionate, acyl group total substitution degree 1.90, an acetyl group a substitution degree 0.20, propionyl group substitution degree 1.70, Mw = 150,000) | 100 parts by mass |
| Acetone | 16,000 parts by mass |
| Methanol | 4000 parts by mass |
| Microparticles silica KE-P30 (product by Nippon Shokubai Co., Ltd., an average particle diameter 0.3 µm) 2% methanol dispersion liquid | 1600 parts by mass |

(Forming of Resin Layer C1)

Resin layer C1 was provided by coating manufacturing liquid composition prepared as described above by a die on the acrylic resin-containing film A1 at a side peeled from belt support made of stainless steel so as to have a wet thickness of 14 µm, was dried at 50° C., and wound.

Thus the optical film 1 was manufactured as described above.

(Manufacture of Optical Films 2 to 32)

Acrylic resin-containing films A2 to A29 were manufactured in the same manner as optical film 1 except that compositions of acrylic resins (A) and cellulose ester resin (B) in acrylic resin-containing film were changed as described in Table 10.

Further, optical film 2 to 31 were produced by coating resin layers C1 to C5 in the same manner as optical film 1 except that composition of cellulose ester resin (C) to coat on acrylic resin-containing film A2 to A29 at a side peeled from belt support made of stainless steel was changed as described in Table 11.

Further, optical film 32 was manufactured without coating a resin layer on acrylic resin-containing film A1.

Content of various optical films 1 to 32 described above are shown in Table 10 and Table 11.

TABLE 10

| | | Film substrate | | | | | | | | | | | |
|---|---|---|---|---|---|---|---|---|---|---|---|---|---|
| | | | | | | Cellulose ester resin (B) | | | | | | Content | |
| Optical Film No. | Acrylic resin containing film No. | Acrylic resin (A) | | | Total substitution degree 'total' | Substitution degree 'ac' | $C_3$ 'pr' | $C_4$ 'bu' | $C_5$ 'pen' | $C_6$ 'hep' | $C_7$ 'bz' | $C_8$ 'oct' | ratio (parts by mass) (A/B) | Remarks |
| | | Species of acryl | Mw | Mw | | | | | | | | | | |
| 1 | A1 | BR100 | 120000 | 200000 | 2.75 | 0.19 | 2.56 | — | — | — | — | — | 70/30 | Invention |
| 2 | A2 | BR100 | 120000 | 200000 | 2.75 | 0.19 | 2.56 | — | — | — | — | — | 95/5 | Invention |
| 3 | A3 | BR100 | 120000 | 200000 | 2.75 | 0,19 | 2.56 | — | — | — | — | — | 50/50 | Invention |
| 4 | A19 | BR100 | 120000 | 200000 | 2.75 | 0.19 | 2.56 | — | — | — | — | — | 98/2 | Comparative example |
| 5 | A20 | BR100 | 120000 | 200000 | 2.75 | 0.19 | 2.56 | — | — | — | — | — | 30/70 | Comparative example |
| 6 | A1 | BR100 | 120000 | 200000 | 2.75 | 0.19 | 2.56 | — | — | — | — | — | 70/30 | Invention |
| 7 | A1 | BR100 | 120000 | 200000 | 2.75 | 0.19 | 2.56 | — | — | — | — | — | 70/30 | Invention |

TABLE 10-continued

| | | | | Film substrate | | | | | | | | | |
| | | | | | Cellulose ester resin (B) | | | | | | | | Content | |
| Optical Film No. | Acrylic resin containing film No. | Acrylic resin (A) Species of acryl | Mw | Mw | Total substitution degree 'total' | Substitution degree 'ac' | $C_3$ 'pr' | $C_4$ 'bu' | $C_5$ 'pen' | $C_6$ 'hep' | $C_7$ 'bz' | $C_8$ 'oct' | ratio (parts by mass) (A/B) | Remarks |
|---|---|---|---|---|---|---|---|---|---|---|---|---|---|---|
| 8 | A21 | BR100 | 120000 | 200000 | 2.75 | 0.19 | 2.56 | — | — | — | — | — | 70/30 | Comparative example |
| 9 | A22 | BR100 | 120000 | 200000 | 2.75 | 0.19 | 2.56 | — | — | — | — | — | 70/30 | Comparative example |
| 10 | A4 | BR100 | 120000 | 200000 | 2.00 | 0.80 | 1.20 | — | — | — | — | — | 70/30 | Invention |
| 11 | A5 | BR100 | 120000 | 200000 | 3.00 | 0.50 | 2.50 | — | — | — | — | — | 70/30 | Invention |
| 12 | A6 | BR100 | 120000 | 200000 | 2.20 | 0.50 | — | 1.70 | — | — | — | — | 70/30 | Invention |
| 13 | A7 | BR100 | 120000 | 200000 | 2.20 | 0.50 | — | — | 1.70 | — | — | — | 70/30 | Invention |
| 14 | A8 | BR100 | 120000 | 200000 | 2.20 | 0.50 | — | — | — | 1.70 | — | — | 70/30 | Invention |
| 15 | A9 | BR100 | 120000 | 200000 | 2.20 | 0.50 | — | — | — | — | 1.70 | — | 70/30 | Invention |
| 16 | A10 | BR100 | 120000 | 200000 | 3.00 | — | 3.00 | — | — | — | — | — | 70/30 | Invention |
| 17 | A23 | BR100 | 120000 | 200000 | 2.20 | 0.50 | — | — | — | — | — | 1.70 | 70/30 | Comparative example |
| 18 | A24 | BR100 | 120000 | 200000 | 2.65 | 1.65 | 1.00 | — | — | — | — | — | 70/30 | Comparative example |
| 19 | A25 | BR75 | 85000 | 200000 | 1.80 | 1.80 | — | — | — | — | — | — | 70/30 | Comparative example |
| 20 | A11 | BR100 | 120000 | 75000 | 2.75 | 0.19 | 2.56 | — | — | — | — | — | 70/30 | Invention |
| 21 | A12 | BR100 | 120000 | 300000 | 2.75 | 0.19 | 2.56 | — | — | — | — | — | 70/30 | Invention |
| 22 | A26 | BR100 | 120000 | 50000 | 2.75 | 0.19 | 2.56 | — | — | — | — | — | 70/30 | Comparative example |
| 23 | A27 | BR100 | 120000 | 400000 | 2.75 | 0.19 | 2.56 | — | — | — | — | — | 70/30 | Comparative example |
| 24 | A13 | a1 | 1000000 | 200000 | 2.75 | 0.19 | 2.56 | — | — | — | — | — | 70/30 | Invention |
| 25 | A14 | MB-2539 | 80000 | 200000 | 2.75 | 0.19 | 2.56 | — | — | — | — | — | 70/30 | Invention |
| 26 | A15 | BR108 | 550000 | 200000 | 2.75 | 0.19 | 2.56 | — | — | — | — | — | 70/30 | Invention |
| 27 | A16 | a2 | 110000 | 200000 | 2.75 | 0.19 | 2.56 | — | — | — | — | — | 70/30 | Invention |
| 28 | A17 | BR85 | 280000 | 200000 | 2.75 | 0.19 | 2.56 | — | — | — | — | — | 70/30 | Invention |
| 29 | A18 | a3 | 500000 | 200000 | 2.75 | 0.19 | 2.56 | — | — | — | — | — | 70/30 | Invention |
| 30 | A28 | BR64 | 65000 | 200000 | 2.75 | 0.19 | 2.56 | — | — | — | — | — | 70/30 | Comparative example |
| 31 | A29 | a4 | 1100000 | 200000 | 2.75 | 0.19 | 2.56 | — | — | — | — | — | 70/30 | Comparative example |
| 32 | A1 | BR100 | 120000 | 200000 | 2.75 | 0.19 | 2.56 | — | — | — | — | — | 70/30 | Comparative example |

(Note)
Species of Acryl: a1, a2, a3, a4: synthesized intra company, BR64, BR75, Br85, BR100, BR108, MB-2539; product by Mitsubishi Rayon Co., Ltd.

TABLE 11

| | | Resin layer Cellulose ester resin (C) | | | | |
| Optical Film No. | Resin layer No. | Mw | Total substitution degree 'total' | Substitution degree 'ac' | $C_3$ 'pr' | Remarks |
|---|---|---|---|---|---|---|
| 1 | C1 | 150000 | 1.90 | 0.20 | 1.70 | Invention |
| 2 | C1 | 150000 | 1.90 | 0.20 | 1.70 | Invention |
| 3 | C1 | 150000 | 1.90 | 0.20 | 1.70 | Invention |
| 4 | C1 | 150000 | 1.90 | 0.20 | 1.70 | Comparative example |
| 5 | C1 | 150000 | 1.90 | 0.20 | 1.70 | Comparative example |
| 6 | C2 | 200000 | 1.90 | 0.20 | 1.70 | Invention |
| 7 | C3 | 10000 | 1.90 | 0.20 | 1.70 | Invention |
| 8 | C4 | 6000 | 1.90 | 0.20 | 1.70 | Comparative example |
| 9 | C5 | 250000 | 1.90 | 0.20 | 1.70 | Comparative example |
| 10 | C1 | 150000 | 1.90 | 0.20 | 1.70 | Invention |
| 11 | C1 | 150000 | 1.90 | 0.20 | 1.70 | Invention |
| 12 | C1 | 150000 | 1.90 | 0.20 | 1.70 | Invention |
| 13 | C1 | 150000 | 1.90 | 0.20 | 1.70 | Invention |
| 14 | C1 | 150000 | 1.90 | 0.20 | 1.70 | Invention |
| 15 | C1 | 150000 | 1.90 | 0.20 | 1.70 | Invention |
| 16 | C1 | 150000 | 1.90 | 0.20 | 1.70 | Invention |

TABLE 11-continued

| Optical Film No. | Resin layer No. | Mw | Total substitution degree 'total' | Substitution degree 'ac' | $C_3$ 'pr' | Remarks |
|---|---|---|---|---|---|---|
| 17 | C1 | 150000 | 1.90 | 0.20 | 1.70 | Comparative example |
| 18 | C1 | 150000 | 1.90 | 0.20 | 1.70 | Comparative example |
| 19 | C1 | 150000 | 1.90 | 0.20 | 1.70 | Comparative example |
| 20 | C1 | 150000 | 1.90 | 0.20 | 1.70 | Invention |
| 21 | C1 | 150000 | 1.90 | 0.20 | 1.70 | Invention |
| 22 | C1 | 150000 | 1.90 | 0.20 | 1.70 | Comparative example |
| 23 | C1 | 150000 | 1.90 | 0.20 | 1.70 | Comparative example |
| 24 | C1 | 150000 | 1.90 | 0.20 | 1.70 | Invention |
| 25 | C1 | 150000 | 1.90 | 0.20 | 1.70 | Invention |
| 26 | C1 | 150000 | 1.90 | 0.20 | 1.70 | Invention |
| 27 | C1 | 150000 | 1.90 | 0.20 | 1.70 | Invention |
| 28 | C1 | 150000 | 1.90 | 0.20 | 1.70 | Invention |
| 29 | C1 | 150000 | 1.90 | 0.20 | 1.70 | Invention |
| 30 | C1 | 150000 | 1.90 | 0.20 | 1.70 | Comparative example |
| 31 | C1 | 150000 | 1.90 | 0.20 | 1.70 | Comparative example |
| 32 | None | None | 1.90 | 0.20 | 1.70 | Comparative example |

Further, acrylic species of a1 to a4 described in columns of Acrylic resins (A) in Table 10 were prepared by a known method using the following components.

(Preparation of Acrylic Resin)

a1: Monomer ratio by mass (MMA/MA=98/2), Mw 1,000,000 a2: Monomer ratio by mass (MMA/MA=97/3), Mw 110,000 a3: Monomer ratio by mass (MMA/MA=97/3), Mw 500,000 a4: Monomer ratio by mass (MMA/MA=9713), Mw 1,100,000

Further, numbers shown in the column of ac, pr, bu, pen, bz and oct in Cellulose ester resin (B) represent a substitution degree of substituents as described below in Table 10.

'ac': acetyl substitution degree
'pr': propionyl substitution degree
'bu': butylyl substitution degree
'pen': bpentyl substitution degree
'bz': benzoyl group
'oct': octlyl group
'total': total substitution degree (Manufacture of Optical Film 33)
(Manufacture of Resin layer C6)

(Preparation of manufacturing liquid composition for C6)

| | |
|---|---|
| Cellulose ester resin (C): Cellulose ester (cellulose acetate propionate, acyl group total substitution degree 2.00, an acetyl group a substitution degree 0.05, propionyl group substitution degree 1.95, Mw = 150,000) | 100 parts by mass |
| Acetone | 16,000 parts by mass |
| Methanol | 4,000 parts by mass |
| Microparticles silica, 2% methanol dispersion liquid of KE-P30 (Product by Nippon Shokubai Co., Ltd. an average particle diameter 0.3 μm) | 1,600 parts by mass |

Resin layer C6 was provided by coating manufacturing liquid composition prepared as described above by a die on the acrylic resin-containing film A1 at a side peeled from belt support made of stainless steel so as to have a wet thickness of 14 μm, was dried at 50° C., and wound.

Thus optical film 33 was manufactured as described above.

(Manufacture of Optical Films 34 to 41)

Optical Films 34 to 41 were manufactured in the same manner as Optical Film 1 except that compositions of cellulose ester resin (C) in the resin layer was changed as described in Table 13, and resin layers C7 to C14 were coated on acrylic resin-containing film A31 at a side peeled from belt support made of stainless steel.

Content of various optical films optical films 28 and 33 to 41 described above are shown in Table 12 and Table 13.

TABLE 12

| | Film substrate | | | | | | | | |
|---|---|---|---|---|---|---|---|---|---|
| | Acrylic resin containing film No. | Acrylic resin (A) | | | Cellulose ester resin (B) | | | Content ratio (Parts by mass) (A/B) | |
| Optical Film No. | | Acryl species | Mw | Mw | Total substitution degree 'total' | Substitution degree 'ac' | $C_3$ 'pr' | | Remarks |
| 28 | A17 | BR85 | 280000 | 200000 | 2.75 | 0.19 | 2.56 | 70/30 | Invention |
| 33 | A17 | BR85 | 280000 | 200000 | 2.75 | 0.19 | 2.56 | 70/30 | Invention |

TABLE 12-continued

| | | | | Film substrate | | | | |
|---|---|---|---|---|---|---|---|---|
| | Acrylic resin containing film No. | Acrylic resin (A) | | Cellulose ester resin (B) | | | | |
| Optical Film No. | | Acryl species | Mw | Total substitution degree Mw 'total' | Substitution degree 'ac' | $C_3$ 'pr' | Content ratio (Parts by mass) (A/B) | Remarks |
| 34 | A17 | BR85 | 280000 | 200000 2.75 | 0.19 | 2.56 | 70/30 | Invention |
| 35 | A17 | BR85 | 280000 | 200000 2.75 | 0.19 | 2.56 | 70/30 | Invention |
| 36 | A17 | BR85 | 280000 | 200000 2.75 | 0.19 | 2.56 | 70/30 | Invention |
| 37 | A17 | BR85 | 280000 | 200000 2.75 | 0.19 | 2.56 | 70/30 | Invention |
| 38 | A17 | BR85 | 280000 | 200000 2.75 | 0.19 | 2.56 | 70/30 | Invention |
| 39 | A17 | BR85 | 280000 | 200000 2.75 | 0.19 | 2.56 | 70/30 | Invention |
| 40 | A17 | BR85 | 280000 | 200000 2.75 | 0.19 | 2.56 | 70/30 | Invention |
| 41 | A17 | BR85 | 280000 | 200000 2.75 | 0.19 | 2.56 | 70/30 | Invention |

TABLE 13

| | | Resin layer | | | | | | | | | |
|---|---|---|---|---|---|---|---|---|---|---|---|
| | | Cellulose ester resin (C) | | | | | | | | | |
| Optical Film No. | Resin layer No. | Mw | Total substitution degree 'total' | Substitution degree 'ac' | $C_3$ 'pr' | $C_4$ 'bu' | $C_5$ 'pen' | $C_6$ 'hep' | $C_7$ 'bz' | $C_8$ 'oct' | Remarks |
| 28 | C1 | 150000 | 1.90 | 0.20 | 1.70 | — | — | — | — | — | Invention |
| 33 | C6 | 150000 | 2.00 | 0.05 | 1.95 | — | — | — | — | — | Invention |
| 34 | C7 | 150000 | 2.15 | 0.05 | 2.10 | — | — | — | — | — | Invention |
| 35 | C8 | 150000 | 2.15 | 0.05 | — | 2.10 | — | — | — | — | Invention |
| 36 | C9 | 150000 | 2.15 | 0.05 | — | — | 2.10 | — | — | — | Invention |
| 37 | C10 | 150000 | 2.15 | 0.05 | — | — | — | 2.10 | — | — | Invention |
| 38 | C11 | 150000 | 2.15 | 0.05 | — | — | — | — | 2.10 | — | Invention |
| 39 | C12 | 150000 | 2.15 | 0.05 | — | — | — | — | — | 2.10 | Invention |
| 40 | C13 | 150000 | 2.75 | 0.55 | 2.20 | — | — | — | — | — | Invention |
| 41 | C14 | 150000 | 3.00 | 3.00 | — | — | — | — | — | — | Invention |

Further, numbers shown in the column of ac, p, b, bz and ph in Cellulose ester resin (C) represent a substitution degree of substituents as described below in Table 13.
 ac: acetyl substitution degree
 p: propionyl substitution degree
 b: butylyl substitution degree
 bz: benzoyl group
 ph: phthalyl group
 T: total substitution degree
(Manufacture of Optical Film 42)
(Manufacture of resin layer C15)

(Preparation of manufacturing liquid composition for C15)

| | |
|---|---|
| Cellulose ester resin (C): Cellulose ester (cellulose acetate propionate, acyl group total substitution degree 1.90, an acetyl group a substitution degree 0.20, propionyl group substitution degree 1.70, Mw = 150,000) | 70 parts by mass |
| Acrylic resins (D): BR85 (acrylic resin, produced by Mitsubishi Rayon Co., Ltd.) | 30 parts by mass |
| Acetone | 16,000 parts by mass |
| Methanol | 4,000 parts by mass |

-continued

| | |
|---|---|
| Microparticles silica, 2% methanol dispersion liquid of KE-P30 (Product by Nippon Shokubai Co., Ltd. an average particle diameter 0.3 μm) | 1,600 parts by mass |

Resin layer C15 was provided by coating manufacturing liquid composition prepared as described above by a die on the acrylic resin-containing film A17 at a side peeled from belt support made of stainless steel so as to have a wet thickness of 14 μm, was dried at 50° C., and wound.

Thus optical film 42 was manufactured as described above.

(Manufacture of Optical Films 43 to 50)

Optical Films 43 to 50 were manufactured in the same manner as Optical Film 1 except that compositions of cellulose ester resin (C) and acrylic resins (D) in the resin layer was changed as described in Table 15, and resin layers C7 to C14 were coated on acrylic resin-containing film A17 at a side peeled from belt support made of stainless steel.

Content of various optical films optical films 42 to 50 described above are shown in Table 14 and Table 15.

TABLE 14

| | | Film substrate | | | | | | | |
|---|---|---|---|---|---|---|---|---|---|
| | Acrylic resin | Acrylic resin (A) | | | Cellulose ester resin (B) | | | Content ratio | |
| Optical Film No. | containing film No. | Acryl species | Mw | Mw | Total substitution degree 'total' | Substitution degree 'ac' | $C_3$ 'pr' | (Parts by mass) (A/B) | Remarks |
| 42 | A17 | BR85 | 280000 | 200000 | 2.75 | 0.19 | 2.56 | 70/30 | Invention |
| 43 | A17 | BR85 | 280000 | 200000 | 2.75 | 0.19 | 2.56 | 70/30 | Invention |
| 44 | A17 | BR85 | 280000 | 200000 | 2.75 | 0.19 | 2.56 | 70/30 | Invention |
| 45 | A17 | BR85 | 280000 | 200000 | 2.75 | 0.19 | 2.56 | 70/30 | Invention |
| 46 | A17 | BR85 | 280000 | 200000 | 2.75 | 0.19 | 2.56 | 70/30 | Invention |
| 47 | A17 | BR85 | 280000 | 200000 | 2.75 | 0.19 | 2.56 | 70/30 | Invention |
| 48 | A17 | BR85 | 280000 | 200000 | 2.75 | 0.19 | 2.56 | 70/30 | Invention |
| 49 | A17 | BR85 | 280000 | 200000 | 2.75 | 0.19 | 2.56 | 70/30 | Invention |
| 50 | A17 | BR85 | 280000 | 200000 | 2.75 | 0.19 | 2.56 | 70/30 | Invention |

TABLE 15

| | | Resin layer | | | | | | | |
|---|---|---|---|---|---|---|---|---|---|
| | | Cellulose ester resin (C) | | | | Acrylic resin (D) | | Content ratio | |
| Optical Film No. | Resin layer No. | Mw | Total substitution degree 'total' | Substitution degree 'ac' | $C_3$ 'pr' | Acryl species | Mw | (Parts by mass) (C/D) | Remarks |
| 42 | C15 | 150000 | 1.90 | 0.20 | 1.70 | BR87 | 25000 | 70/30 | Invention |
| 43 | C16 | 150000 | 1.90 | 0.20 | 1.70 | BR113 | 30000 | 70/30 | Invention |
| 44 | C17 | 150000 | 1.90 | 0.20 | 1.70 | BR85 | 280000 | 70/30 | Invention |
| 45 | C18 | 150000 | 1.90 | 0.20 | 1.70 | a1 | 1000000 | 70/30 | Invention |
| 46 | C19 | 150000 | 1.90 | 0.20 | 1.70 | a4 | 1100000 | 70/30 | Invention |
| 47 | C20 | 150000 | 1.90 | 0.20 | 1.70 | BR85 | 280000 | 98/2 | Invention |
| 48 | C21 | 150000 | 1.90 | 0.20 | 1.70 | BR85 | 280000 | 95/5 | Invention |
| 49 | C22 | 150000 | 1.90 | 0.20 | 1.70 | BR85 | 280000 | 50/50 | Invention |
| 50 | C23 | 150000 | 1.90 | 0.20 | 1.70 | BR85 | 280000 | 30/70 | Invention |

(Manufacture of Optical Film 51)
(Manufacture of Acrylic Resin-Containing Film A30)

| | |
|---|---|
| (Preparation of dope liquid for A30) | |
| Acrylic resins (A): BR85 (acrylic resin, produced by Mitsubishi Rayon Co., Ltd.) | 70 parts by mass |
| Cellulose ester resin (B): cellulose ester (cellulose acetate propionate, acyl group total substitution degree 2.75, an acetyl group a substitution degree 0.19, propionyl group substitution degree 2.56, Mw = 200,000) | 30 parts by mass |
| Acrylic particles (E): acrylic particles E1 | 0.5 parts by mass |
| Methylene chloride | 264 parts by mass |
| Ethanol | 36 parts by mass |

(Film Forming of)

Acrylic resin-containing film A30 was produced by employing dope liquid for A30 manufactured described above in the same manner as acrylic resin-containing film A1.

Resin layer C18 was provided by coating manufacturing liquid composition prepared as described above by a die on the acrylic resin-containing film A17 at a side peeled from belt support made of stainless steel so as to have a wet thickness of 14 μm, was dried at 50° C., and wound.

Thus optical film 51 was manufactured as described above.

(Manufacture of Optical Films 52 to 57)

Acrylic resin-containing film A31 to A36 were manufactured in the same manner as acrylic resin-containing film A30 modifying composition of acrylic particles (E) in acrylic resin-containing film to those as described in Table 16.

Resin layer C18 was provided by coating Manufacturing liquid composition prepared as described above by a die on the acrylic resin-containing films A31 to A36 at a side peeled from belt support made of stainless steel so as to have a wet thickness of 14 μm, was dried at 50° C., and wound.

Thus optical films 52 to 57 were manufactured as described above.

Content of various optical films optical films 44 and 51 to 57 described above are shown in Table 16 and Table 17.

TABLE 16

| | | | | Film substrate | | | | | | |
|---|---|---|---|---|---|---|---|---|---|---|
| | Acrylic | | | Cellulose ester resin (B) | | | | Acrylic resin particles (E) | | |
| Optical | resin | Acrylic resin (A) | | Total substitution | Substitution | | Content ratio | In film substrate | | Content |
| Film No. | containing film No. | Acryl species | Mw | Mw | degree 'total' | degree 'ac' | C$_3$ 'pr' | (Parts by mass) (A/B) | Acryl species | Particle diameter | in film substrate | Remarks |
| 44 | A17 | BR85 | 280000 | 200000 | 2.75 | 0.19 | 2.56 | 70/30 | None | — | — | Invention |
| 51 | A30 | BR85 | 280000 | 200000 | 2.75 | 0.19 | 2.56 | 70/30 | E1 | 0.1 μm | 0.50% | Invention |
| 52 | A31 | BR85 | 280000 | 200000 | 2.75 | 0.19 | 2.56 | 70/30 | E1 | 0.1 μm | 18% | Invention |
| 53 | A32 | BR85 | 280000 | 200000 | 2.75 | 0.19 | 2.56 | 70/30 | E1 | 0.1 μm | 30% | Invention |
| 54 | A33 | BR85 | 280000 | 200000 | 2.75 | 0.19 | 2.56 | 70/30 | E1 | 0.1 μm | 40% | Invention |
| 55 | A34 | BR85 | 280000 | 200000 | 2.75 | 0.19 | 2.56 | 70/30 | E2 | 0.5 μm | 18% | Invention |
| 56 | A35 | BR85 | 280000 | 200000 | 2.75 | 0.19 | 2.56 | 70/30 | E3 | 1.0 μm | 18% | Invention |
| 57 | A36 | BR85 | 280000 | 200000 | 2.75 | 0.19 | 2.56 | 70/30 | E4 | 2.0 μm | 18% | Invention |

TABLE 17

| | | Resin layer | | | | | | | |
|---|---|---|---|---|---|---|---|---|---|
| | | Cellulose ester resin (C) | | | | Acrylic resin (D) | | Content ratio | |
| | | | Total substitution | Substitution | | | | | |
| Optical Film No. | Resin layer No. | Mw | degree 'total' | degree 'ac' | C$_3$ 'pr' | Acryl species | Mw | (Parts by mass) (C/D) | Remarks |
| 44 | C18 | 150000 | 1.90 | 0.20 | 1.70 | BR85 | 280000 | 70/30 | Invention |
| 51 | C18 | 150000 | 1.90 | 0.20 | 1.70 | BR85 | 280000 | 70/30 | Invention |
| 52 | C18 | 150000 | 1.90 | 0.20 | 1.70 | BR85 | 280000 | 70/30 | Invention |
| 53 | C18 | 150000 | 1.90 | 0.20 | 1.70 | BR85 | 280000 | 70/30 | Invention |
| 54 | C18 | 150000 | 1.90 | 0.20 | 1.70 | BR85 | 280000 | 70/30 | Invention |
| 55 | C18 | 150000 | 1.90 | 0.20 | 1.70 | BR85 | 280000 | 70/30 | Invention |
| 56 | C18 | 150000 | 1.90 | 0.20 | 1.70 | BR85 | 280000 | 70/30 | Invention |
| 57 | C18 | 150000 | 1.90 | 0.20 | 1.70 | BR85 | 280000 | 70/30 | Invention |

Further, E1 to E4 in the column of acrylic particles (E) in Table 16 having an average particle diameter respectively described below was repapered by known methods.

(Preparation of Acrylic Particles)

E1: Average particle diameter 0.1 μm
E2: Average particle diameter 0.5 μm
E3: Average particle diameter 1.0 μm
E4: Average particle diameter 2.0 μm (Manufacture of Optical Film 58)
(Manufacture of Resin Layer C24)

| | |
|---|---|
| (Preparation of manufacturing liquid composition for C24) | |
| Cellulose ester resin (C): Cellulose ester (cellulose acetate propionate, acyl group total substitution degree 1.90, an acetyl group a substitution degree 0.20, propionyl group substitution degree 1.70, Mw = 150000) | 70 parts by mass |
| Acrylic resins (D): BR85 (acrylic resin, produced by Mitsubishi Rayon Co., Ltd.) | 30 parts by mass |
| Acrylic particles (E): E1 | 0.1 parts by mass |
| Acetone | 16,000 parts by mass |
| Methanol | 4,000 parts by mass |
| Microparticles silica, 2% methanol dispersion liquid of KE-P30 (Product by Nippon Shokubai Co., Ltd. an average particle diameter 0.3 μm) | 1600 parts by mass |

Resin layer C24 was provided by coating manufacturing liquid composition prepared as described above by a die on the acrylic resin-containing film A1 at a side peeled from belt support made of stainless steel so as to have a wet thickness of 14 μm, was dried at 50° C., and wound.

Thus the optical film 58 was manufactured as described above.

(Manufacture of Optical Films 59 to 64)

Acrylic resin-containing films 59 to 64 were manufactured in the same manner as optical film 1 except that compositions of acrylic resins (E) in acrylic resin-containing film were changed as described in Table 19, and resin layers C7 to C14 were coated on acrylic resin-containing film A17 at a side peeled from belt support made of stainless steel.

Content of various optical films optical films 28 and 33 to 41 described above are shown in Table 18 and Table 19.

TABLE 18

| | | Film substrate | | | | | | | | |
|---|---|---|---|---|---|---|---|---|---|---|
| | Acrylic | | | Cellulose ester resin (B) | | | Content | Acrylic resin particles (E) | | |
| | resin | Acrylic resin (A) | | Total | Substitution | | ratio | In film | | Content |
| Optical Film No. | containing film No. | Acryl species | Mw | substitution degree 'total' | degree 'ac' | $C_3$ 'pr' | (Parts by mass) (A/B) | substrate Acryl species | Particle diameter | in film substrate | Remarks |
| 58 | A31 | BR85 | 280000 | 200000 | 2.75 | 0.19 | 2.56 | 70/30 | E1 | 0.1 μm | 18% | Invention |
| 59 | A31 | BR85 | 280000 | 200000 | 2.75 | 0.19 | 2.56 | 70/30 | E1 | 0.1 μm | 18% | Invention |
| 60 | A31 | BR85 | 280000 | 200000 | 2.75 | 0.19 | 2.56 | 70/30 | E1 | 0.1 μm | 18% | Invention |
| 61 | A31 | BR85 | 280000 | 200000 | 2.75 | 0.19 | 2.56 | 70/30 | E1 | 0.1 μm | 18% | Invention |
| 62 | A31 | BR85 | 280000 | 200000 | 2.75 | 0.19 | 2.56 | 70/30 | E1 | 0.1 μm | 18% | Invention |
| 63 | A31 | BR85 | 280000 | 200000 | 2.75 | 0.19 | 2.56 | 70/30 | E1 | 0.1 μm | 18% | Invention |
| 64 | A31 | BR85 | 280000 | 200000 | 2.75 | 0.19 | 2.56 | 70/30 | E1 | 0.1 μm | 18% | Invention |

TABLE 19

| | | Resin layer | | | | | | | | | |
|---|---|---|---|---|---|---|---|---|---|---|---|
| | | Cellulose ester resin (C) | | | | Acrylic resin (D) | | Content ratio | Acrylic resin particles (E) | | |
| Optical Film No. | Resin layer No. | Mw | Total substitution degree 'total' | Substitution degree 'ac' | $C_3$ 'pr' | Acryl species | Mw | (Parts by mass) (C/D) | Acryl species in resin layer | Particle diameter | Content in resin layer | Remarks |
| 58 | C24 | 150000 | 1.90 | 0.20 | 1.70 | BR85 | 280000 | 70/30 | E1 | 0.1 μm | 0.10% | Invention |
| 59 | C25 | 150000 | 1.90 | 0.20 | 1.70 | BR85 | 280000 | 70/30 | E1 | 0.1 μm | 20% | Invention |
| 60 | C26 | 150000 | 1.90 | 0.20 | 1.70 | BR85 | 280000 | 70/30 | E1 | 0.1 μm | 50% | Invention |
| 61 | C27 | 150000 | 1.90 | 0.20 | 1.70 | BR85 | 280000 | 70/30 | E1 | 0.1 μm | 60% | Invention |
| 62 | C28 | 150000 | 1.90 | 0.20 | 1.70 | BR85 | 280000 | 70/30 | E2 | 0.5 μm | 20% | Invention |
| 63 | C29 | 150000 | 1.90 | 0.20 | 1.70 | BR85 | 280000 | 70/30 | E3 | 1.0 μm | 20% | Invention |
| 64 | C30 | 150000 | 1.90 | 0.20 | 1.70 | BR85 | 280000 | 70/30 | E4 | 2.0 μm | 20% | Invention |

(Evaluation of Optical Films 1 to 64)
(Transparency)

Transparency Average transmittance in visible light region was measured by spectrophotometer U-3400 (produced by Hitachi Ltd.), transparency was evaluated according to the criteria described below. The visible light region means wavelength of 400 to 720 nm.

Evaluation Criteria:

A: Average transmittance in visible light region is 90% or higher.

B: Average transmittance in visible light region is not less than 85% and less than 90%.

C: Average transmittance in visible light region is less than 85%.

(Brittleness)

The hard coat film was cut out in a size of 100 mm (longitudinal)×10 mm (lateral), and was folded once in each inside and out side directions at the center of the longitudinal direction with radius of curvature of 8 mm. The test was conducted three times and evaluation was conducted according to criteria described below. The term 'break' represents that the sample is divided into two or more pieces.

Evaluation Criteria:

A: No break in three times.

C: Broken at least once in three times.

(Anti-Moisture Absorption Property)

Two signs (+ mark) were marked in extrusion direction on the manufactured optical film, the samples were processed by standing at 60° C., and 90% RH for 1,000 hours, distance of signs (+ mark) before and after the processing was measured by an optical, and evaluation was conducted according to criteria described below.

Ratio of dimensional change(%)=((a1−a2)/a1)×100

In the formula, a1 and a2 represent distance before and thermal process, respectively.

Evaluation Criteria:

A: Less than 0.3%.

B: Not less than 0.3% and less than 0.5%.

C: Not less than 0.5%.

(Heat Resistance)

Each optical film was kept standing at 90° C., under dry atmosphere (relative humidity of not more than 5% RH) for 1,000 hours, degree of film deformation was measured by visual observation, and evaluation was conducted according to the criteria described below.

Evaluation Criteria:

A: Deformation of him was not observed at all.

B: Deformation of film was observed.

C: Marked deformation of film was observed.

(Adhesive Properties of Film to Polarizer)
(Pre Processing: Saponification)

The optical film manufactured described above was cut out in a size of 3.5 cm×20 cm, immersed in 1 liter aqueous solution of 1N potassium hydroxide for 2 minutes, washed by ion exchanged water for 20 seconds, then dried, and stored one day under the environment at room temperature 23° C. and relative humidity of 55%.

On an optical film stored described above, 3 micro liter of ion exchanged water was dripped, contact angle 1 second after dripping was measured via a contact angle measuring instrument (DropMaster 100, produced by Kyowa Interface Science Co., Ltd.), evaluation was conducted according to the criteria described below.
Evaluation Criteria:
AA: Contact angle to water of less than 25°.
A: Contact angle to water of not less than 25° and less than 35°.
B: Contact angle to water of not less than 35° and less than 50°.
C: Contact angle to water of not less than 50°.
(Adhesive Properties of Substrate to Resin Layer)
Chess board pattern tape peeling test was conducted according to JIS-K5600.
Hundred square cells were formed on a resin layer surface of the sample like a chess board by a cutter, and pressing and peeling an adhesive tape (No. 31B, produced by Nitto Denko Corp.) were repeated three times at a same portion.
Then, surface of the sample after peeling off the tape was observed by eye view, and evaluation was conducted according to the following criteria.
Evaluation Criteria:
AA: No peeling is observed at all.
A: Though peeling is scarcely observed, border in a part of cells is peeled off.
B: Peeling is observed.
C: Peeling is observed on whole surface,
(Interference Unevenness after Saponification)
(Pre Processing: Saponification)
The optical film manufactured described above was cut in A4 size, impede in 1 liter of aqueous solution of 1 mol of potassium hydroxide for 2 minutes, washed by ion exchanged water for 20 seconds, dried, and stored one day under the environment at room temperature 23° C. and relative humidity of 55%.
Degree of occurrence of interference unevenness of samples processed described above were evaluated by eye view observation under 3 wavelength fluorescent tube (PA-LOOK fluorescent tube FLR40S-EX-DM, produced by Matsushita Electric Industrial Co., Ltd.) according to the following criteria.
Evaluation Criteria:
AA: No interference unevenness was observed at all.
A: Interference unevenness was scarcely observed.
B: Not problematic level of interference unevenness is observed
C: Interference unevenness is clearly observed.
Ranks AA and A are practically acceptable.
(Sticking Property)
The optical film manufactured described above was cut into A4 size two pieces, and these were superposed so that surface the optical film was brought into contact with the resin layer, and were stored in an atmosphere at 23° C. and 55% RH for 100 hours.
Thereafter, sticking degree of the optical films each other was measured by eye view observation and the evaluation was conducted according to the criteria described below.
Evaluation Criteria:
AA: No sticking each other is observed at all.
A: Little sticking is observed with sticking are of less than 10%
B: Sticking are of not less than and less than 10% 30%.
C: Sticking are of not less than 30%.
(Deformation Failure)
The optical film manufactured described above was cut into A4 size two pieces, and these were superposed so that surface the optical film was brought into contact with the resin layer, and were stored in an atmosphere at 23° C. and 55% RH for 100 hours.
Thereafter, the optical films were peeled off and stuck mark on the optical film was evaluated.
Evaluation Criteria:
AA: No stuck mark is observed at all.
A: Stuck mark is hardly observed, and is observed by careful view.
B: Stuck mark is faintly observed.
C: Stuck mark is clearly observed.
(Durable Adhesive Property)
Light was irradiated on film substrate side of the manufactured optical film via a light fastness test apparatus (I SUPER UV TESTER, produced by Iwasaki Electric Co., Ltd.) for 120 hours.
Thereafter, evaluation was conducted in the similar manner to above described adhesive property test.
(Torn Surface)
Each optical film was tore via a light weight tearing tester (produced by Toyo Seiki Seisaku-sho, LTD.) and evaluated in the following way.
Evaluation Criteria:
A: Torn surface is very smooth and the film is torn straight.
B: Torn surface has burr, and the film is torn straight
C: Torn surface has burr considerably, and the film is torn not straight.
(Cut Chips)
Light weight tearing test described above was conducted 10 times above the adhesive sheet. Number of cut chips was counted and evaluation was shown by converted number in unit area.
AA: Number of cut chips on the adhesive sheet is less than $10/m^2$.
A: Number of cut chips on the adhesive sheet is not less than $10/m^2$ and less than $30/m^2$.
B: Number of cut chips on the adhesive sheet is not less than $30/m^2$ and less than $50/m^2$.
C: Number of cut chips on the adhesive sheet is not less than $50/m^2$.
(Pencil Hardness)
Hardness was measured by a method in accordance with the pencil hardness evaluation method stipulated by JIS-K5400, and employing test pencil stipulated by JIS-S6006 and a 500 g weight, in which method a hard coat layer surface was scratched five times repeating with pencils having each hardness until one scratch line was formed. Pencil hardness 3H or more is high hardness, and the higher the hardness number is given, the higher hardness the sample has.
The same saponification as described above was conducted, and pencil hardness test before and after saponification processing was performed.
(Stick Test at High Temperature and High Moisture)
The optical film manufactured described above was cut into A4 size two pieces, and these were superposed so that surface the optical film was brought into contact with the resin layer, and were stored in an atmosphere at 60° C. and 90% RH for 50 hours.
Thereafter, sticking degree of the optical films each other was measured by eye view observation and the evaluation was conducted according to the criteria described below.
Evaluation Criteria:
AA: No sticking each other is observed at all.
A: Little sticking is observed with sticking are of less than 10%

B: Sticking are of not less than and less than 10% 30%.
C: Sticking are of not less than 30%.

(Haze)

For each film manufactured described above a piece of film sample was measured according to JIS K-7136 by employing a haze meter (model NDH2000, produced by Nippon Denshoku Industries Co., Ltd.).

Evaluation Criteria:
AA: Haze value of less than 0.5%.
A: Haze value of not less than 1.0% less than 0.5%.
B: Haze value of not less than 1.5% less than 1.0%.
C: Haze value of not less than 1.5%.

Result of each evaluation described above is shown in Tables 20 to 23.

TABLE 20

| Optical film No. | Effects | | | | 1Cl | | Interference unevenness after saponification | 2CL | | General evaluation | Remarks |
|---|---|---|---|---|---|---|---|---|---|---|---|
| | Transparency | Brittleness | Anti-moisture absorption property | Heat fastness | Adhesion of film to polarizer | Adhesion of substrate to resin layer | | Sticking property | Deformation failure | | |
| 1 | A | A | A | A | A | AA | A | AA | AA | AA | Inv. |
| 2 | A | A | A | A | A | AA | A | AA | AA | AA | Inv. |
| 3 | A | A | A | A | A | AA | A | AA | AA | AA | Inv. |
| 4 | A | A | A | A | C | AA | B | — | — | C | Comp. |
| 5 | A | A | A | A | A | AA | B | — | — | B | Comp. |
| 6 | A | A | A | A | A | AA | A | AA | AA | AA | Inv. |
| 7 | A | A | A | A | A | AA | A | AA | AA | AA | Inv. |
| 8 | B | A | A | A | B | AA | A | — | — | B | Comp. |
| 9 | A | A | A | A | B | B | A | — | — | B | Comp. |
| 10 | A | A | A | A | A | AA | A | AA | AA | AA | Inv. |
| 11 | A | A | A | A | A | AA | A | AA | AA | AA | Inv. |
| 12 | A | A | A | A | A | AA | A | AA | AA | AA | Inv. |
| 13 | A | A | A | A | A | AA | A | AA | AA | AA | Inv. |
| 14 | A | A | A | A | A | AA | A | AA | AA | AA | Inv. |
| 15 | A | A | A | A | A | AA | A | AA | AA | AA | Inv. |
| 16 | A | A | A | A | A | AA | A | AA | AA | AA | Inv. |
| 17 | C | C | C | C | C | C | A | — | — | C | Comp. |
| 18 | C | C | C | C | C | C | A | — | — | C | Comp. |
| 19 | C | C | C | C | C | C | A | — | — | C | Comp. |
| 20 | A | A | A | A | A | AA | A | AA | AA | AA | Inv. |
| 21 | A | A | A | A | A | AA | A | AA | AA | AA | Inv. |
| 22 | C | C | C | C | C | C | A | — | — | C | Comp. |
| 23 | C | C | C | C | C | C | A | — | — | C | Comp. |
| 24 | A | A | A | A | A | A | A | A | A | A | Inv. |
| 25 | A | A | A | A | A | A | A | A | A | A | Inv. |
| 26 | A | A | A | A | A | A | A | A | A | A | Inv. |
| 27 | A | A | A | A | A | AA | A | AA | AA | AA | Inv. |
| 28 | A | A | A | A | A | AA | A | AA | AA | AA | Inv. |
| 29 | A | A | A | A | A | AA | A | AA | AA | AA | Inv. |
| 30 | A | C | C | C | B | B | A | — | — | C | Comp. |
| 31 | C | C | C | C | C | C | A | — | — | C | Comp. |
| 32 | A | A | A | A | — | — | B | — | — | B | Comp. |

Inv.: Invention
Comp.: Comparative example

TABLE 21

| Optical Film No. | Result 3CL Durable adhesive property | Remarks |
|---|---|---|
| 28 | A | Comparative (within the invention) |
| 33 | AA | Invention |
| 34 | AA | Invention |
| 35 | AA | Invention |
| 36 | AA | Invention |
| 37 | AA | Invention |
| 38 | AA | Invention |
| 39 | A | Comparative (within the invention) |
| 40 | AA | Invention |
| 41 | AA | Invention |

TABLE 22

| Optical Film No. | Effect | | | Remarks |
|---|---|---|---|---|
| | 4CL Interference unevenness after saponification | Torn surface | Cut chips | |
| 42 | A | A | A | Comparative (within the invention) |
| 43 | AA | AA | AA | Invention |
| 44 | AA | AA | AA | Invention |
| 45 | AA | AA | AA | Invention |
| 46 | A | A | A | Comparative (within the invention) |

TABLE 22-continued

| Optical Film No. | 4CL Interference unevenness after saponification | Torn surface | Cut chips | Remarks |
|---|---|---|---|---|
| 47 | A | A | A | Comparative (within the invention) |
| 48 | AA | AA | AA | Invention |
| 49 | AA | AA | AA | Invention |
| 50 | A | A | A | Comparative (within the invention) |

TABLE 23

| Optical Film No. | 5CL Pencil hardness before saponification | 5CL Pencil hardness after saponification | Stick test at high temperature and high moisture | 6CL 7CL Haze | General evaluation | Remarks |
|---|---|---|---|---|---|---|
| 51 | H | H | A | AA | AA | Invention |
| 52 | H | H | A | AA | AA | Invention |
| 53 | H | H | A | AA | AA | Invention |
| 54 | H | HB | A | A | A | Comparative (within the invention) |
| 55 | H | H | A | AA | AA | Invention |
| 56 | H | H | A | AA | AA | Invention |
| 57 | H | H | A | A | AA | Invention |
| 58 | H | H | AA | AA | AA | Invention |
| 59 | H | H | AA | AA | AA | Invention |
| 60 | H | H | AA | AA | AA | Invention |
| 61 | H | H | AA | A | A | Invention |
| 62 | H | H | AA | AA | AA | Invention |
| 63 | H | H | AA | AA | AA | Invention |
| 64 | H | H | AA | A | A | Invention |

It is apparent from the result shown in Tables 20 to 23, the optical films according to the invention are excellent in performance of above described various evaluation.

Example 2

Manufacture of Hard Coat Film 101 to 164

(Manufacture of Hard Coat Layer)

Hard coat films 101 to 164 were manufactured by Example 1 by coating hard coat layer on opposite side to resin layer of each of optical film 1 to 64 by procedures described below corresponding to optical film 1 to 64 in Example 1.

Coating composition of the hard coat layer was prepared by filtering Hard Coat Layer Compositions described below with a filter made of polypropylene having pore size of 0.4 µM. The obtained coating composition was coated on optical films 1 to 64 employing an extrusion coater, was dried in a condition of temperature of 80° C. for 1 minute, then coated layer was cured by employing UV ray lamp with intensity of illumination of irradiation portion of 100 mW/cm² and irradiation quantity of 0.32 J/cm², and a hard coat layer having a dry thickness 10 µm was formed. Then continuously Back Coat Layer Composition 1 described below was coated on the opposite side to a side the provided with the hard coat layer so as to have a wet thickness of 10 µm by means of an extrusion coater, dried in a condition of temperature at 50° C., and then was wound in roll state. Thus Hard Coat Films 101 to 164 was manufactured.

(Resin composition for forming hard coat layer)
| | |
|---|---|
| Pentaerythritol triacrylate | 20 parts by mass |
| Pentaerythritol tetraacrylate | 50 parts by mass |
| Urethaneacrylate (U-4HA, produced by Shin-Nakamura Chemical Co., Ltd.) | 50 parts by mass |
| Radical polymerization initiator (IRGACURE 184, produced by Ciba Japan Ltd.) | 5 parts by mass |

Mixture solvent of ethyl acetate/propyleneglycol monoethylether of 50 parts by mass/50 parts by mass was added to the above described Composition so as to have solid substance 50% by mass, and for forming a hard coat layer was obtained.

Pencil hardness evaluation was conducted on hard coat film 101 to 164 obtained by the above described process, and the result described in Table 24 and Table 25 was obtained.

TABLE 24

| Hard coat film No. | Pencil hardness | Remarks |
|---|---|---|
| 101 | 3H | Invention |
| 102 | 3H | Invention |
| 103 | 3H | Invention |
| 104 | 2H | Comparative example |
| 105 | 2H | Comparative example |
| 106 | 3H | Invention |
| 107 | 3H | Invention |
| 108 | 2H | Comparative example |
| 109 | 2H | Comparative example |
| 110 | 3H | Invention |
| 111 | 3H | Invention |
| 112 | 3H | Invention |
| 113 | 3H | Invention |
| 114 | 3H | Invention |
| 115 | 3H | Invention |
| 116 | 3H | Invention |
| 117 | 2H | Comparative example |
| 118 | 2H | Comparative example |
| 119 | 2H | Comparative example |
| 120 | 3H | Invention |

TABLE 24-continued

| Hard coat film No. | Pencil hardness | Remarks |
|---|---|---|
| 121 | 3H | Invention |
| 122 | 2H | Comparative example |
| 123 | 2H | Comparative example |
| 124 | 3H | Invention |
| 125 | 3H | Invention |
| 126 | 3H | Invention |
| 127 | 3H | Invention |
| 128 | 3H | Invention |
| 129 | 3H | Invention |
| 130 | 2H | Comparative example |
| 131 | 2H | Comparative example |
| 132 | 2H | Comparative example |

TABLE 25

| Hard coat film No. | Pencil hardness | Remarks |
|---|---|---|
| 133 | 3H | Invention |
| 134 | 3H | Invention |
| 135 | 3H | Invention |
| 136 | 3H | Invention |
| 137 | 3H | Invention |
| 138 | 3H | Invention |
| 139 | 3H | Invention |
| 140 | 3H | Invention |
| 141 | 3H | Invention |
| 142 | 3H | Invention |
| 143 | 3H | Invention |
| 144 | 3H | Invention |
| 145 | 3H | Invention |
| 146 | 3H | Invention |
| 147 | 3H | Invention |
| 148 | 3H | Invention |
| 149 | 3H | Invention |
| 150 | 3H | Invention |
| 151 | 4H | Invention |
| 152 | 4H | Invention |
| 153 | 4H | Invention |
| 154 | 4H | Invention |
| 155 | 4H | Invention |
| 156 | 4H | Invention |
| 157 | 4H | Invention |
| 158 | 4H | Invention |
| 159 | 4H | Invention |
| 160 | 4H | Invention |
| 161 | 4H | Invention |
| 162 | 4H | Invention |
| 163 | 4H | Invention |
| 164 | 4H | Invention |

Example 3

Manufacture of Anti-Reflection Films 201 to 264

Anti-reflection films 201 to 264 were manufactured by procedures described below on a hard coat layer of the obtained hard coat films 101 to 164 described above.
(Manufacture of Low Refractive Index Layer)
Low refractive index layer Composition described below was coated via an extrusion coater on the above described hard coat layer, and was dried in a condition at 80° C., and 0.1 m/seconds for 1 minute. After drying, it was cured by irradiating UV ray at 130 mJ/cm$^2$ by a high pressure lamp mercury lamp (80 W), further, thermally cured at 120° C. taking for 5 minutes, thus an anti-reflection layer having a low refractive index layer was manufactured.

(Low refractive index layer Composition)
(Cationic polymerization compounds)

| | |
|---|---|
| (1-(3-Ethyl-3-oxetanyl)methylether | 4.5 parts by mass |
| 3-Glycidoxy propyltrimethoxysilane | 2.5 parts by mass |
| Fluorine containing epoxy compound | 2 parts by mass |

(Photo cationic polymerization initiators)

| | |
|---|---|
| 4-Methylphenyl[4-(1-methylethyl)phenyl]-iodoniumtetrakis (pentafluorophenyl) borate, (RHODSIL 2074, produced by RHODIA Japan) | 0.2 parts by mass |

(Silica particles)

| | |
|---|---|
| Hollow silica particles dispersion liquid D-1 | 35 parts by mass |

(Additive)

| | |
|---|---|
| 10% propyleneglycol monomethylether liquid of silicone compound (FZ-2207, produced by Dow Corning Toray Co., Ltd.) | 0.9 parts by mass |

(Solvent)

| | |
|---|---|
| Methylisobutyl ketone | 30 parts by mass |
| Methylethylketone | 90 parts by mass |

(Preparation of Fluorine Containing Epoxy Compound)

To a mixture of 81.03 g of 1,3-dihydroxy hexafluoroisopropylbenzene and 185 g of epichlorohydrin, 16.27 g of sodium hydroxide and 40 ml of were added, and were heat-refluxed with stirring. After 3 hours reaction at 130° C., it was cooled naturally, and generated sodium chloride was removed by aspiration filtration. The obtained filtered liquid was extracted from chloroform water, and 95.7 g of fluorine containing epoxy compound 1 was obtained by drying, filtering and condensing the organic phase.

(Preparation of Hollow Silica Particles Dispersion Liquid D-1)

Mixture of 100 g of silica sol having average particle diameter 5 nm, and SiO$_2$ concentration of 20% by mass and 1,900 g of deionized water was heated up to 80° C. The reaction mother liquid has pH of 10.5. Sodium silicate aqueous solution 0.98% by mass in terms of SiO$_2$ in amount of 9,000 g and sodium aluminate aqueous solution 1.02% by mass in terms of Al$_2$O$_3$ in amount of 9,000 g were added simultaneously to the mother liquid. During addition, temperature of the reaction liquid was maintained at 80° C. Just after the addition, pH of the reaction liquid rose to 12.5, and scarcely changed thereafter. After addition, reaction liquid was cooled down to room temperature, washed by ultrafiltration membrane, and solid substance concentration of 20% by mass SiO$_2$.Al$_2$O$_3$ core particles dispersion liquid was prepared (Step a).

To 500 g of the core particles dispersion liquid 1,700 g of deionized water was added and heated to 98° C., while keeping temperature, 3,000 g of silicic acid solution (SiO$_2$ concentration of 3.5% by mass) obtained by dealkalization of sodium silicate aqueous solution with cation exchange resin was added, and dispersion liquid of core particles on which the first silica covering layer was formed was obtained (Step b).

Next, to 500 g of core particles dispersion liquid having the first silica covering layer, of which solid substance concentration became 13% by mass by washing with ultrafiltration membrane, 1,125 g of deionized water was added, pH was adjusted to 1.0 by dripping concentrated hydrochloric acid (35.5%), and dealuminum treatment was conducted. Subsequently, while adding 10 L of pH3 hydrochloric acid aqueous solution and 5 L of deionized water, aluminum salt dissolved by ultrafiltration membrane was removed, whereby dispersion liquid of $SiO_2 \cdot Al_2O_3$ porous particles that was core particles on which the first silica covering layer is formed from which a part of composing component was removed was prepared (Step c.)

After heating a mixture of 1,500 g of above described porous particles dispersion liquid, 500 g of deionized water, 1,750 g of ethanol, and 626 g of 28% aqueous ammonia to 35° C., 104 g of ethyl silicate ($SiO_2$ 28% by mass) was added, surface of the porous particles on which the first silica covering layer was formed was covered by hydrolysis condensation polymer of ethyl silicate and the second silica cover layer was formed. Subsequently, hollow silica particles dispersion liquid D-1 having solid substance concentration of 20% by mass solvent of which was substituted with ethanol employing by ultrafiltration membrane was prepared.

The first silica covering layer of the hollow silica particles has thickness of 3 nm, an average particle diameter of 45 nm, $MO_x/SiO_2$ (molar ratio) of 0.0017, and refractive index of 1.28. The average particle diameter was measured by a dynamic light scattering method.

Thus obtained anti-reflection films 201 to 264 were placed on a desk with a height of 80 cm from the floor, and ten of the set composed of two straight tube daylight fluorescent 40 W lamps (FLR40S•D/M-X, produced by Matsushita Electric Industrial Co., Ltd.) were arranged with an interval of 1.5 m at the ceiling with a height of 3 m from the floor. The fluorescent lamps were arranged so that the lamps were lined at the ceiling in the direction of from the overhead to backward of the observer when the observer placed under the front of the displaying face. The anti-reflection film was slanted 25° to the perpendicular line of the desk so that the fluorescent lamps were reflected on the panel surface. The easiness of looking of the image (visibility) was classified into the following ranking for evaluation.

AA: The reflection of the fluorescent lamps did not attract notice of the observer, and letters of a font size not more than 8 could be read clearly.

A: The reflection of the nearly arranged fluorescent lamps somewhat attracted notice of the observer, but the ones far position did not attract, notice of the observer, and letters of a font size not more than 8 could be barely read.

B: The reflection of the nearly arranged fluorescent lamps attracted notice of the observer, and letters of a font size not more than 8 could be hardly read.

C: The reflection of the nearly arranged fluorescent lamps considerably attracted notice of the observer, and letters of a font size not more than 8 could not be read.

As a result of the valuation, though anti-reflection films of Comparative example were evaluated as C or worse, anti-reflection films of the invention were all evaluated as B or better, and it was confirmed that the visibility was good without interference unevenness.

(Manufacture of Polarizing Plate)

Polarizing plates 301 to 364 were manufactured using Anti-reflection films 201 to 264 as manufactured above as protecting film for the polarizing plate according to method described below.

Polyvinylalcohol film having a thickness of 120 μm was immersed in an aqueous solution containing 1 part by mass of iodine, 2 parts by mass of potassium iodide and 4 parts by mass of boric acid, and was stretched 4 times at 50° C., and a polarizing film was obtained.

Polarizing plates 301 to 364 were manufactured in the steps of described below (1) to (5) by pasting a polarizing film, anti-reflection films 201 to 2(4, and opposite side to Konica Minolta TAC KC8UCR-5 (Produced by Konica Minolta Opto, Inc.) which is a retardation film.

(Manufacturing Method of Polarizing Plate)

(1) Each of anti-reflection films 201 to 264 and KC8UCR-5 were immersed in 2 mol/l of sodium hydroxide solution at 60° C. for 2 minutes, and washed and dried. Preliminarily easy adhesion film was adhered to the anti-reflection film on its anti-reflection layer surface.

(2) The polarizing film described above was immersed in polyvinyl alcohol adhesive tank of solid substance concentration of 2% for 1 to 2 seconds.

(3) Excess adhesive adhered to polarizing film in the above described step (2) was briefly removed, and anti-reflection film treated in above described step (1), a polarizing film, and KC8UCR-5 were superposed in this order. In this instance, the anti-reflection film was arranged so that anti-reflection layer is provided outside of the polarizing plate.

(4) Laminated material of the polarizing film, the anti-reflection film and KC8UCR-5 superposed in the above described step (3) were adhered steadily by pressing a hand roller to the laminated material, thereafter these were adhered by removing excess adhesive and air bubble from the edge of the laminated material. Stress was applied by the hand roller with pressure of 20 to 30 N/cm², and roller was around 2 m/min.

(5) The samples obtained in the step (4) were kept standing in a drying device at 80° C. for 2 minutes.

(Manufacture of Liquid Crystal Display Device)

Liquid crystal display devices 401 to 464 were manufactured employing polarizing plates 301 to 364.

Liquid crystal panels for measuring view angle were manufactured by the following way, and characteristics as a liquid crystal display device was evaluated.

Polarizing plates originally pasted on both side of 15 type display VL-150SD produced by Fujitsu Ltd. were peeled off, and each of polarizing plates 301 to 364 manufactured described above was pasted on glass surface of the liquid crystal cell.

In this instance, pasting direction of the polarizing plate was arranged so that retardation film surface was faced to liquid crystal cell side and absorption axis directed to the same direction as the originally pasted polarizing plate, whereby liquid crystal display devices 401 to 464 were manufactured. Further, polarizing plates cut from end portion of long size continuous anti-reflection film which was apt to vary performance were employed (Visibility Evaluation of Liquid Crystal Display Device)

Interference unevenness of the surface was evaluated for each liquid crystal display device by visual observation of displayed black screen according to the criteria described below.

Evaluation Criteria:

AA: Interference unevenness was not observed and, black is observed tightly.

A: Interference unevenness is slightly observed.

B: Interference unevenness is observed but acceptable range.

C: Interference unevenness is fairly observed.

As a result of the evaluation, while liquid crystal display panels using comparative anti-reflection film were evaluated as rank B or worse, liquid crystal display panels using anti-reflection films of the invention were all evaluated as rank A or better and are confirmed to have good visibility without interference unevenness.

Liquid crystal display devices manufactured by using polarizing plates according to the invention are confirmed that they display improvement of interference unevenness and excellent visibility.

DESCRIPTION OF SYMBOLS

Y Continuous film
Taking out roll 1
2 Conveying roller
3 Extrusion coater
4 Counter rolls
5 Drying zone
6 Actinic ray irradiation lamp unit
6a Air-cooling actinic ray lamp
6b Air-cooling vent hole
6c Nitrogen supply chamber
7 Heating zone
8 Winding room
9 Winding roll
10 Warm air blowing outlet
12 Movable carriage
15 Winding core
A Heat treatment room

The invention claimed is:

1. An optical film comprising a film substrate and a hard coat layer containing a resin on the film substrate, wherein
the film substrate contains a mixture of a thermoplastic acrylic resin (A) and a cellulose ester resin (B),
a content ratio by mass of the thermoplastic acrylic resin (A) to the cellulose ester resin (B) in the film substrate is in a range of the thermoplastic acrylic resin (A)/the cellulose ester resin (B)=90/10 to 60/40,
a weight average molecular weight of the thermoplastic acrylic resin (A) contained in the film substrate is in a range of 110,000 to 500,000,
the hard coat layer contains a thermoplastic acrylic resin,
a weight average molecular weight of the thermoplastic acrylic resin contained in the hard coat layer is in a range of 80,000 to 500,000, and
the thermoplastic acrylic resin contained in the hard coat layer exists more in quantity in the vicinity of an interface between the film substrate and the hard coat layer than the hard coat layer surface.

2. The optical film of claim 1, wherein the film substrate contains acrylic particles, and content ratio by mass of the acrylic particles to total mass of thermoplastic acrylic resin (A) and the cellulose ester resin (B) is in a range of total mass of the acrylic particles/thermoplastic acrylic resin (A) and the cellulose ester resin (B)=0.5/100 to 30/100.

3. The optical film of claim 1, wherein a weight average molecular weight of the thermoplastic acrylic resin contained in the hard coat layer is in a range of 110,000 to 500,000.

4. The optical film of claim 1, wherein the hard coat layer comprises the thermoplastic acrylic resin and a radical polymerization compound, wherein content ratio by mass of the thermoplastic acrylic resin to the radical polymerization compound is in a range of thermoplastic acrylic resin/radical polymerization compound=0.50/100 to 20/100.

5. The optical film of claim 1, wherein the hard coat layer is composed of a multi-layer material, wherein the hard coat layer adjacent to the film substrate comprises the thermoplastic acrylic resin.

6. The optical film of claim 1, further comprising a back coat layer containing a resin, and wherein
a weight average molecular weight of the cellulose ester resin (B) is in a range of 75,000 to 300,000,
the cellulose ester resin (B) has a total substitution degree of an acyl group in a range of 2.0 to 3.0 and a substitution degree of an acyl group having 3 to 7 carbon atoms in a range of 1.2 to 3.0, and
the back coat layer contains cellulose ester resin (C), wherein a weight average molecular weight of the cellulose ester resin (C) is in a range of 10,000 to 200,000.

7. The optical film of claim 6, wherein the cellulose ester resin (C) has a total substitution degree of an acyl group in a range of 2.0 to 3.0 and a substitution degree of an acyl group having 3 to 7 carbon atoms in a range of 0 to 2.2.

8. The optical film of claim 6, wherein the back coat layer comprises the cellulose ester resin (C) and a thermoplastic acrylic resin (D), wherein a weight average molecular weight of the thermoplastic acrylic resin (D) is in a range of 30,000 to 1,000,000, and a content ratio by mass the cellulose ester resin (C) to the thermoplastic acrylic resin (D) is in a range of 95/5 to 50/50.

9. The optical film of claim 1, further comprising a back coat layer containing a resin and acrylic particles in a range of 0.1 to 50% by mass with respect to total mass of the a back coat layer.

10. The optical film of claim 9, wherein an average particle diameter of the acrylic particles contained in the back coat layer is in a range of 0.1 to 1 μm.

11. An anti-reflection film produced by employing the optical film described in claim 1, wherein a low refractive index layer is laminated on the hard coat layer directly or via another layer.

12. The anti-reflection film of claim 11, wherein the low refractive index layer contains a cationic polymerization compound.

13. A polarizing plate employing the optical film described in claim 1.

14. A liquid crystal display device employing the optical film described in claim 1.

15. A polarizing plate employing the anti-reflection film described in claim 11.

16. A liquid crystal display device employing the anti-reflection film described in claim 11.

17. The optical film of claim 1, wherein the film substrate is formed by a solution casting method.

* * * * *